(12) United States Patent
Yu et al.

(10) Patent No.: US 7,106,860 B1
(45) Date of Patent: Sep. 12, 2006

(54) SYSTEM AND METHOD FOR EXECUTING ADVANCED ENCRYPTION STANDARD (AES) ALGORITHM

(75) Inventors: Zhichao Yu, Irvine, CA (US); Willen Lao, Foothill Ranch, CA (US)

(73) Assignee: Conexant, Inc., Red Bank, NJ (US)

( * ) Notice: Subject to any disclaimer, the term of this patent is extended or adjusted under 35 U.S.C. 154(b) by 1003 days.

(21) Appl. No.: 10/068,610

(22) Filed: Feb. 6, 2002

Related U.S. Application Data

(60) Provisional application No. 60/266,788, filed on Feb. 6, 2001.

(51) Int. Cl.
*H04K 1/00* (2006.01)

(52) U.S. Cl. .............................. 380/37; 380/29; 380/51; 380/255; 380/264

(58) Field of Classification Search .................. 380/51, 380/29, 37, 255
See application file for complete search history.

(56) References Cited

U.S. PATENT DOCUMENTS

| | | | | |
|---|---|---|---|---|
| 5,003,597 A * | 3/1991 | Merkle | ......................... | 380/37 |
| 5,956,405 A * | 9/1999 | Yuval | ......................... | 380/29 |
| 6,173,386 B1 * | 1/2001 | Key et al. | ...................... | 712/10 |
| 6,185,304 B1 * | 2/2001 | Coppersmith et al. | ........ | 380/37 |
| 6,185,679 B1 * | 2/2001 | Coppersmith et al. | ...... | 713/150 |
| 6,477,646 B1 * | 11/2002 | Krishna et al. | ............. | 713/189 |
| 6,937,727 B1 * | 8/2005 | Yup et al. | ...................... | 380/37 |
| 2002/0003885 A1 * | 1/2002 | Mead | ......................... | 380/269 |
| 2002/0051534 A1 * | 5/2002 | Matchett et al. | .............. | 380/37 |
| 2002/0191792 A1 * | 12/2002 | Anand | ........................ | 380/255 |
| 2002/0191793 A1 * | 12/2002 | Anand et al. | ............... | 380/255 |
| 2003/0014627 A1 * | 1/2003 | Krishna et al. | ............. | 713/153 |

OTHER PUBLICATIONS

Daemen and Rijmen, "AES Proposal: Rijndael", Mar. 9, 1999, pp. 8 and 10.*
Advanced Encryption Standard (AES) Nov. 26, 2001.
AES Proposal: Rijndael Daemen and Rijmen; Aug. 1998.
Realization of the Round 2 AES Candidates using Altera FPGA Fischer.

* cited by examiner

*Primary Examiner*—Ayaz Sheikh
*Assistant Examiner*—Kerry McKay
(74) *Attorney, Agent, or Firm*—Thomas, Kayden, Horstemeyer & Risley

(57) ABSTRACT

A system and method is presented for enciphering information using the Advanced Encryption Standard (AES) algorithm in which a subprocessor is configured to manipulate data as it is being loaded into the subprocessor memory. Thus, unlike implementations in the prior art, which require complete loading of data into a subsystem memory before data manipulation thereby creating a potential bottleneck in memory, this invention reduces the potential bottleneck in memory.

41 Claims, 61 Drawing Sheets

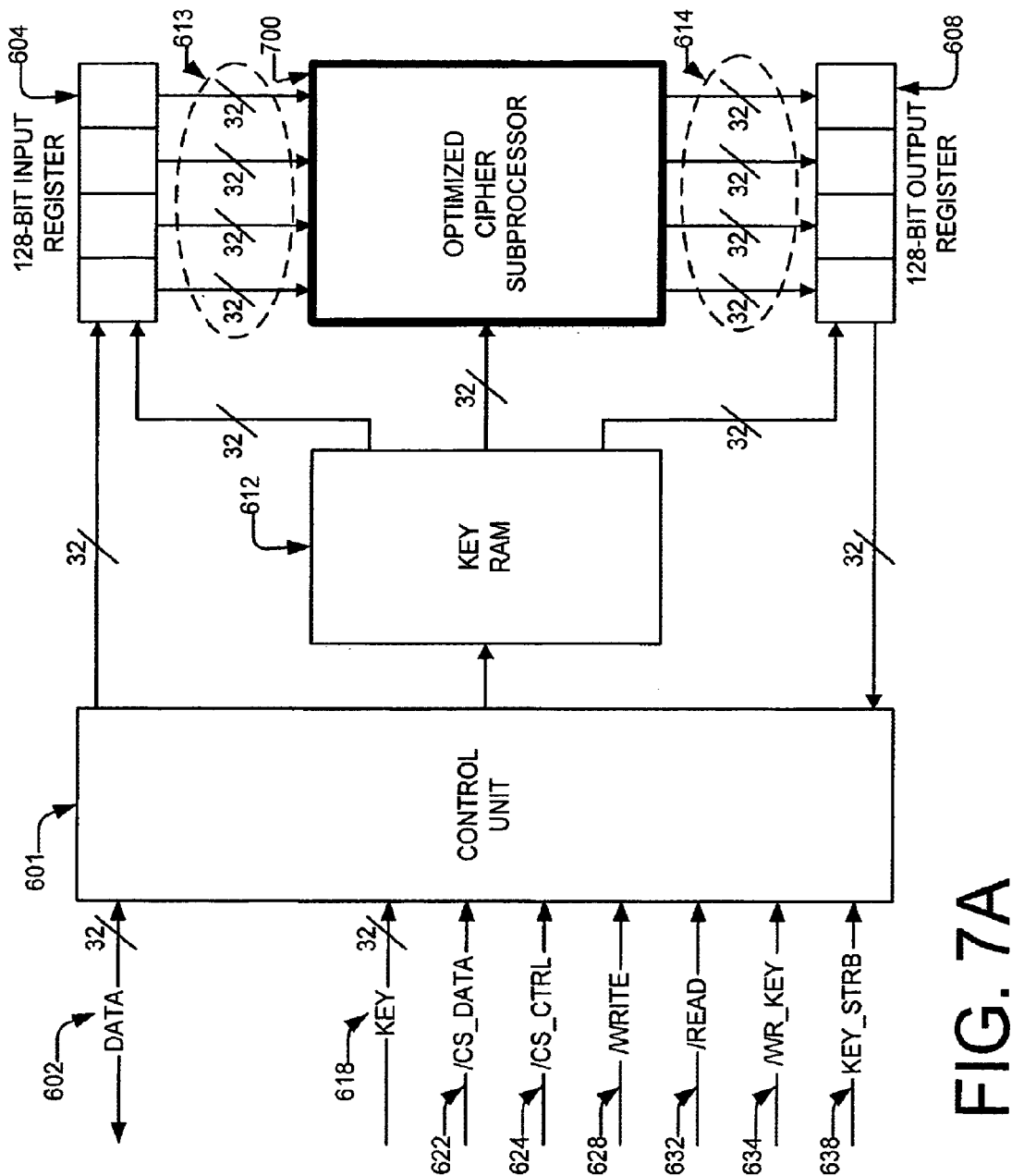

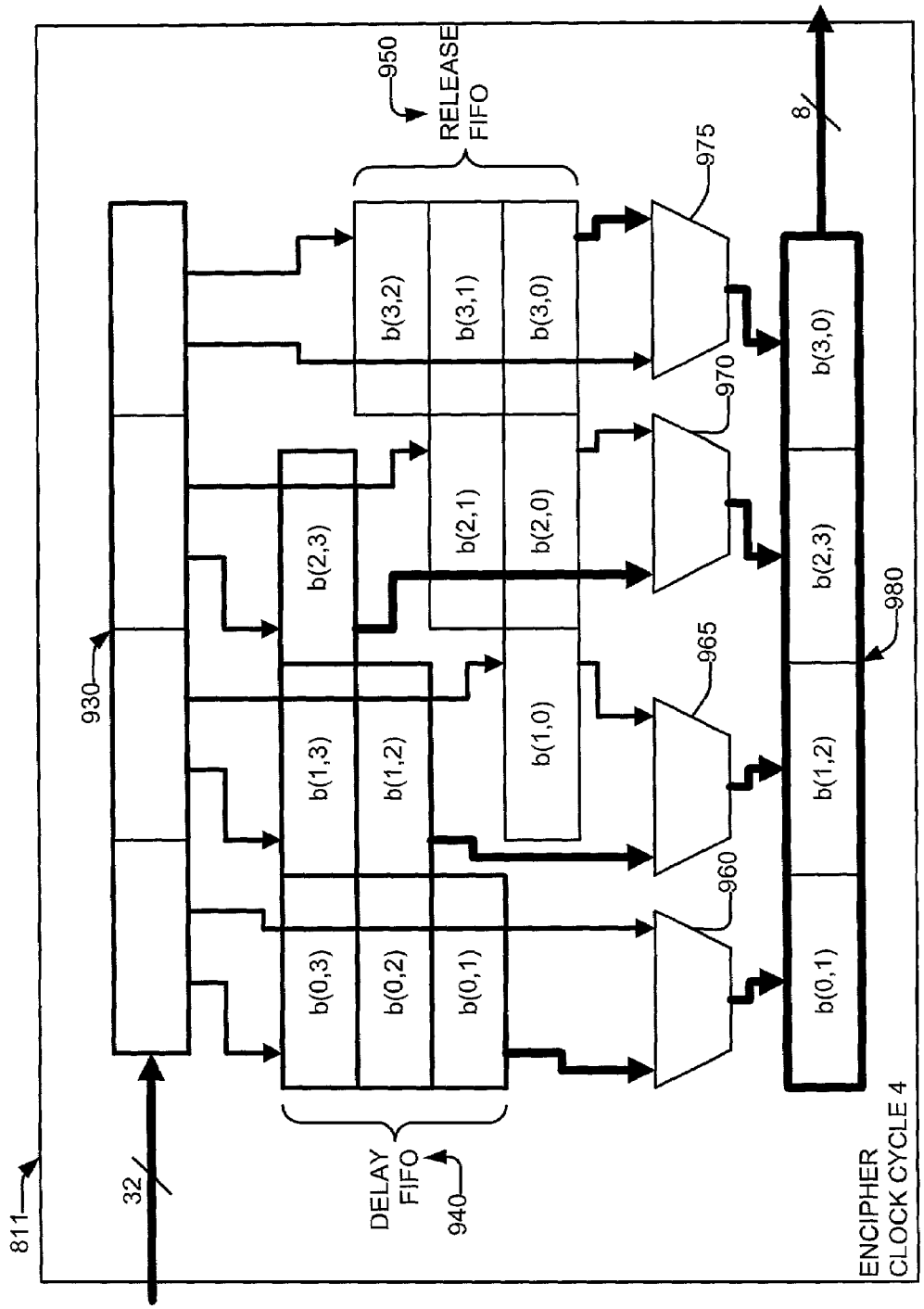

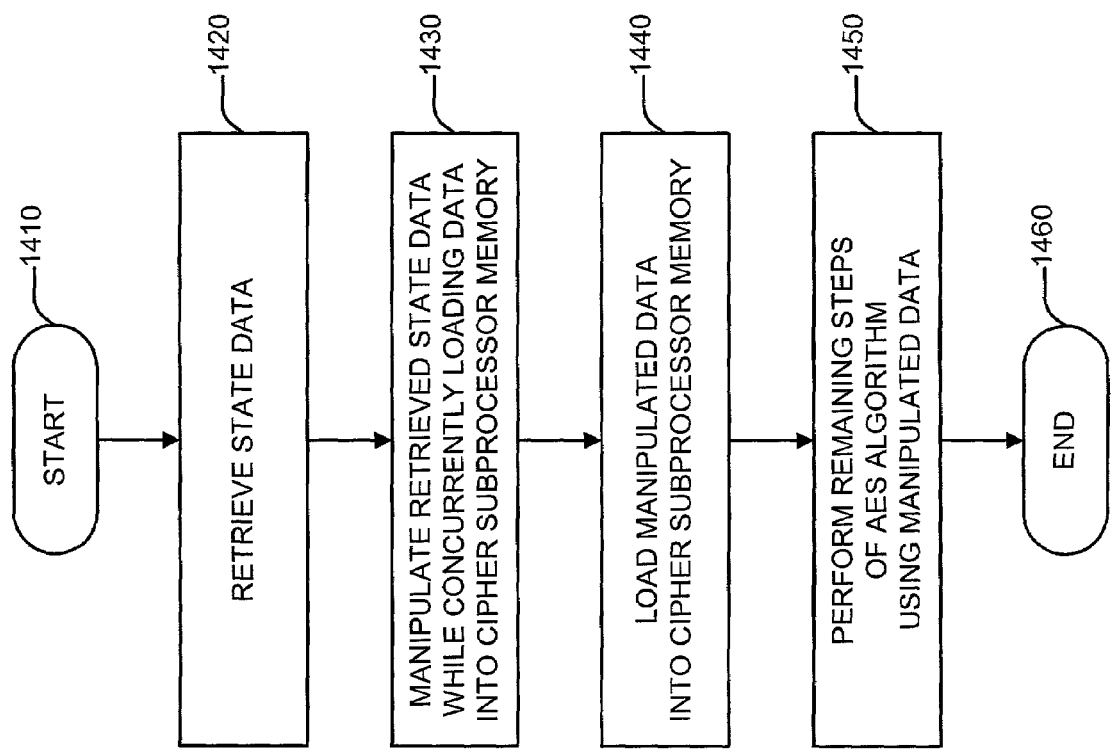

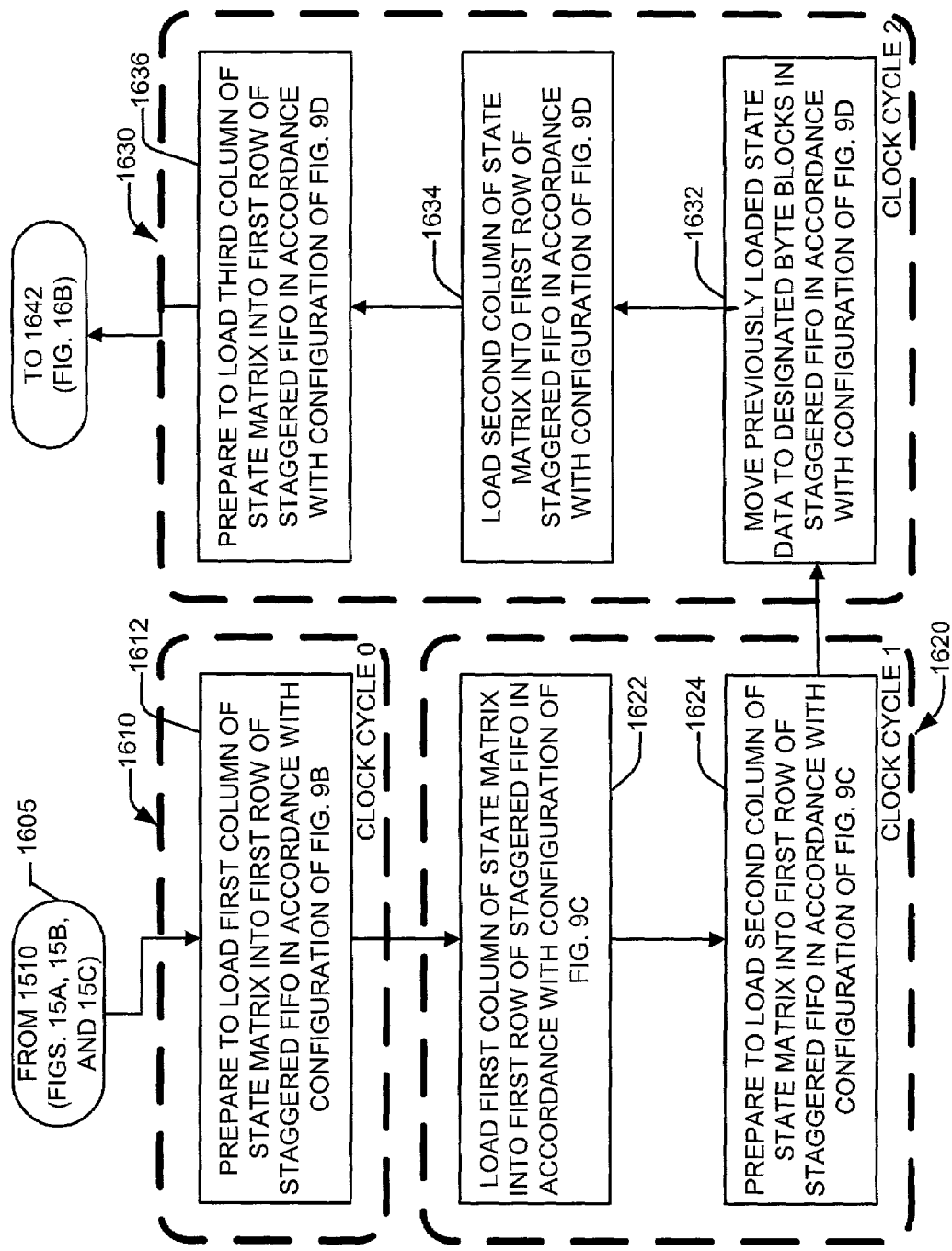

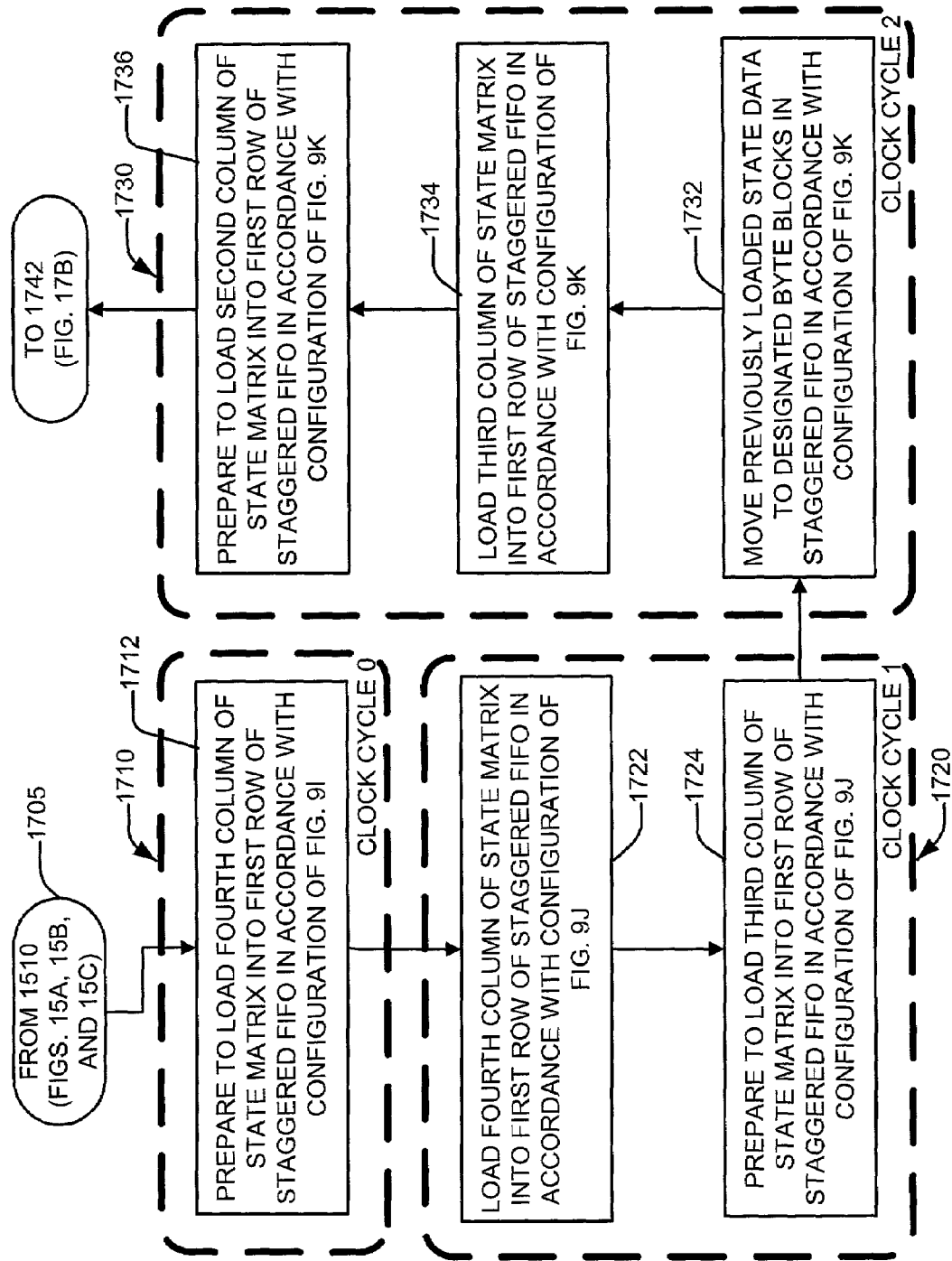

SYSTEM AND METHOD FOR EXECUTING ADVANCED ENCRYPTION STANDARD (AES) ALGORITHM

CROSS REFERENCE TO RELATED APPLICATIONS

This application claims the benefit of U.S. Provisional Patent Application No. 60/266,788, dated Feb. 6, 2001, which is incorporated herein by reference in its entirety.

FIELD OF INVENTION

The present invention generally relates to encryption technology, and more specifically relates to the Advanced Encryption Standard (AES) Algorithm.

BACKGROUND

The Advanced Encryption Standard (AES) Algorithm

Electronic communications media allow for transmission and reception of vast amounts of information in the form of digital data. While much of the communications are rather mundane, there are several instances where sensitive or confidential information is communicated through electronic media. In such instances, it is desirable to encrypt the information such that only authorized persons would have access to the sensitive or confidential information. The Department of Commerce recently accepted the Rijndael algorithm, with very minor modifications, as the official Advanced Encryption Standard (AES).

The Rijndael algorithm, which was developed by Joan Daemen and Vincent Rijmen, is described in detail in their proposal "The Rijndael Block Cipher—AES Proposal: Rijndael" (hereinafter referred to as the "Rijndael proposal" or the "AES proposal") to the National Institute of Standards and Technology (NIST). While not all of the details are provided herein, the following provides the relevant portions of the AES algorithm.

The AES algorithm is an iterative algorithm, meaning that the cipher as a whole involves multiple encryption iterations (or rounds) of certain encryption operations. Each of the rounds produces an encrypted state that is further encrypted in subsequent rounds. In the AES algorithm, the number of rounds is defined by a combination of a block size (i.e., the size of the data block to be encrypted) and the key size (i.e., the size of the encryption key). Each of the rounds, with the exception of the last round, includes four steps, and a "state" is produced at the end of each round. This is shown in FIG. 1.

FIG. 1 is a diagram showing a general overview of the steps involved in the AES algorithm. Prior to actually encrypting any data, the system has knowledge of the block size Nb, the key size Nk, and the number of rounds Nr (which is a function of the block size and the key size such that Nr=f(Nb,Nk)). Since this aspect are described in detail in the AES proposal, and since this aspect is only peripherally related to the invention, it will not be further discussed herein. As shown in FIG. 1, the process may be seen as having Nr−1 normal rounds 115 and one final round 150. The steps in each normal round 115 are a "ByteSub" 120 step, a "ShiftRow" 125 step, a "MixColumn" 130 step, and a "AddRoundKey" 135 step, which are described in greater detail with reference to FIGS. 2 through 5. The MixColumn 130 step is removed in the final round 150, thereby making it a three-step round having the ByteSub 120 step, ShiftRow 125 step, and AddRoundKey 135 step.

FIG. 2 shows the ByteSub 120 step in greater detail. The ByteSub 120 step of the AES algorithm is a non-linear byte substitution, which operates independently on each byte of an input state matrix 210. The substitution table 220 (hereinafter referred to as "S-box" 220) is invertible and is constructed by the composition of two transformations, which are described in detail in the AES proposal. The S-box 220 transformation produces a byte-substituted matrix 230 that is the same size as the input state matrix 210, but with byte values that are defined by the S-box 220. Further details regarding this aspect of the AES algorithm may be found in the AES proposal. However, it is worthwhile to note that, using hardware configurations in the prior art, the S-Box 220 and the raw data (e.g., the input state matrix 210) are moved from a main memory location to a cipher memory location before performing the ByteSub 120 step (or any other data manipulation). The significance of this will become clearer with reference to an example hardware configuration of the prior art, as shown in FIG. 6.

FIG. 3 shows the ShiftRow 125 step in greater detail. In the ShiftRow 125 step, the rows 232, 234, 236, 238 of the byte-substituted matrix 230 are cyclically shifted over different offsets to produce a row-shifted matrix 330 having shifted rows 332, 334, 336, 338. These offsets are described in greater detail in the AES proposal, and, thus, only a truncated discussion is presented here. However, it is worthwhile to mention again that, in prior art systems, the entire data set is moved from the main memory to the cipher memory prior to any data manipulation.

FIG. 4 shows the MixColumn 130 step in greater detail. In the MixColum 130 step, every column 342, 344, 346, 348 of the row-shifted matrix 330 is transformed by multiplying each column 342, 344, 346, 348 of the row-shifted matrix 330 with a specific multiplication polynomial, c(x) 420. This multiplication operation produces a mixed-column matrix 430 having columns 442, 444, 446, 448 that are each a function of their respective row-shifted matrix 330 columns 342, 344, 346, 348. Since this operation is only peripherally related to this invention, and, also, since details related to this operation may also be found in the AES proposal, the MixColumn 130 step will not be further discussed.

FIG. 5 shows the AddRoundKey 135 step in greater detail. In the AddRoundKey 135 step, a bit-wise XOR (logical exclusive OR) operation 510 is performed between the mixed-column matrix 430 and a round key 520 (which has been derived from a cipher key). The derivation of the cipher key and the round key are only peripherally related to this invention, and are described in detail in the AES proposal. Thus, the AddRoundKey 135 step will not be further discussed.

Since the current hardware configurations move the raw data and byte-substitution table from the main memory to the cipher memory prior to performing any data manipulation, inefficiencies may arise due to memory access and byte manipulation. Additionally, since the operation involves shifting bytes across entire words (i.e., byte-shifting across four bytes) as shown in FIG. 3, straightforward implementation of the cipher subsystem is not efficient. These are shown in detail with reference to FIGS. 6A, 6B, and FIG. 13, which show a hardware configuration and a method of the prior art.

Prior Art Hardware Configuration for Executing the AES Algorithm

FIG. 6A is a hardware configuration of the prior art that may be used in the execution of the AES algorithm. As shown in FIG. 6A, data 602 and a key 618 are input to a control unit 601 by way of 32-bit interfaces. The data 602 is stored in a 128-bit input register 604, which, in subsequent rounds of the AES algorithm, is used to store intermediate state cipher text. The data 602 stored in the 128-bit input register 604 is input to the cipher subsystem 600 via 32-bit data buses 613 in a sequential manner. The encryption (or decryption) begins automatically after reception of the fourth 32-bit data (i.e., encryption or decryption is "triggered" upon complete loading of the 128 bits). Once encryption or decryption is complete, the cipher text is written to a 128-bit output register 608 via 32-bit data buses 614 in a sequential manner. The cipher is managed using a control register containing an encryption/decryption flag (not shown), run flag (not shown), and a reset bit (not shown). Data and control registers are accessible using /CS_DATA 622 and /CS_CTRL 624 signals. Read and write are realized at the rising edge of /READ 632 and /WRITE 628 signals, respectively. Key memory is organized in 256 32-bit words, and pre-calculated sub-keys can be entered to the cipher via a separated 32-bit local interface that can be connected, for example, to the local memory. New sub-keys are written to the internal memory at the rising edge of a KEY_STRB 638 signal when /WR_KEY 634 is low. As seen from FIG. 6A, the cipher subsystem 600 may be inefficient because all of the data is moved from main memory to the cipher subsystem 600 memory prior to execution of the AES algorithm steps. This is shown in greater detail in FIG. 6B.

FIG. 6B is a block diagram illustrating a prior art cipher subsystem 600. The cipher subsystem 600 comprises a memory access unit 620 having a host direct memory access (DMA) unit 611 and a cipher DMA 621. The host DMA 611 of the memory access unit 620 is configured to access a main data memory 851 to retrieve plain text in a sequential manner using a 32-bit data bus 613. In the first round of the AES algorithm, the retrieved data cascades through a first multiplexer (MUX) 630, which sends the data to a first cipher data memory bank 650 (hereinafter referred to as memory bank 0 650) or a second cipher data memory bank 660 (hereinafter referred to as memory bank 1 660). The data in bank 0 650 and bank 1 660 is then sent to a second MUX 670 using 32-bit data buses 653, 663. The second MUX 670 selectively transmits the data from one of the cipher data memory banks 650, 660 to a register file 680, which then sends the selected data to an arithmetic logic unit (ALU) 690, which produces a cipher text. The ALU 690 performs the ShiftRow, ByteSub, MixColumm, and AddRoundKey steps in the cipher subsystem 600 of the prior art, thereby producing the cipher text (or state matrices). This cipher text is relayed back to a third MUX 640 and a fourth MUX 676 for the second iteration (or round) of the AES algorithm. The data is then cascaded through third MUX 640, fourth MUX 676, bank 0 650, bank 1 660, second MUX 670, register file 680, and ALU 690, which produces the next state matrix for the third iteration. This system repeats this procedure until the initially input data has been enciphered using the AES algorithm.

The inefficiency associated with this system arises from the fact that the host DMA 611 and the cipher DMA 621 are nothing more than data pass-through devices that retrieve the data for processing. In this respect, data is retrieved from main data memory 851 and completely loaded into memory before any calculation is performed on the data. This, in turn, results in a potential bottleneck at memory access and byte manipulation. This is shown using the flow chart of FIG. 13.

FIG. 13 is a flow chart showing method steps associated with the execution of the AES algorithm as it is performed in the prior art. In step 1320, the cipher subsystem 600 (FIG. 6B) loads the state data (e.g., plain text) into the cipher subsystem memory, and, in step 1330, the cipher subsystem 600 (FIG. 6B) manipulates the loaded state data after it has been completely loaded into cipher subsystem memory. Thus, since the cipher subsystem 600 (FIG. 6B) waits for complete loading of the data into the cipher subsystem memory, a potential bottleneck is created at memory access and byte manipulation.

Accordingly, a heretofore unaddressed need exists in the industry to improve cipher performance.

SUMMARY OF THE INVENTION

The present invention provides a system and method for executing the Advanced Encryption Standard (AES) algorithm, or any other cipher utilizing a byte-shifting operation.

Briefly described, in architecture, one embodiment of the system comprises a processor configured to manipulate data as the data is being loaded into processor memory. By doing so, the processor executes several steps of an algorithm prior to completely loading the processor memory with the data. In this sense, the processor no longer waits for the data to completely load into memory before executing the steps of the algorithm, thereby improving performance in executing the algorithm.

The present invention can also be viewed as a method for executing an algorithm. In this regard, one embodiment of such a method can be broadly summarized as loading a processor memory with data, and, as the data is being loaded into the processor memory, concurrently manipulating the data.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7A is a block diagram showing an example hardware configuration of the system of the invention having an optimized cipher subprocessor.

FIGS. 8B through 8I are diagrams showing the relevant components and data flow as the AES algorithm is executed in the subprocessor of FIG. 8A.

FIGS. 9B through 9H are diagrams illustrating the ShiftRow step during enciphering.

FIGS. 9I through 9O are diagrams illustrating the ShiftRow step during deciphering.

FIG. 14 is a flowchart illustrating the method steps as performed in one embodiment of the invention.

FIGS. 16A and 16B are flowcharts showing the ShiftRow step during enciphering as performed in one embodiment of the invention.

FIGS. 17A and 17B are flowcharts showing the ShiftRow step during deciphering as performed in one embodiment of the invention.

DETAILED DESCRIPTION OF THE INVENTION

Figure 7B:
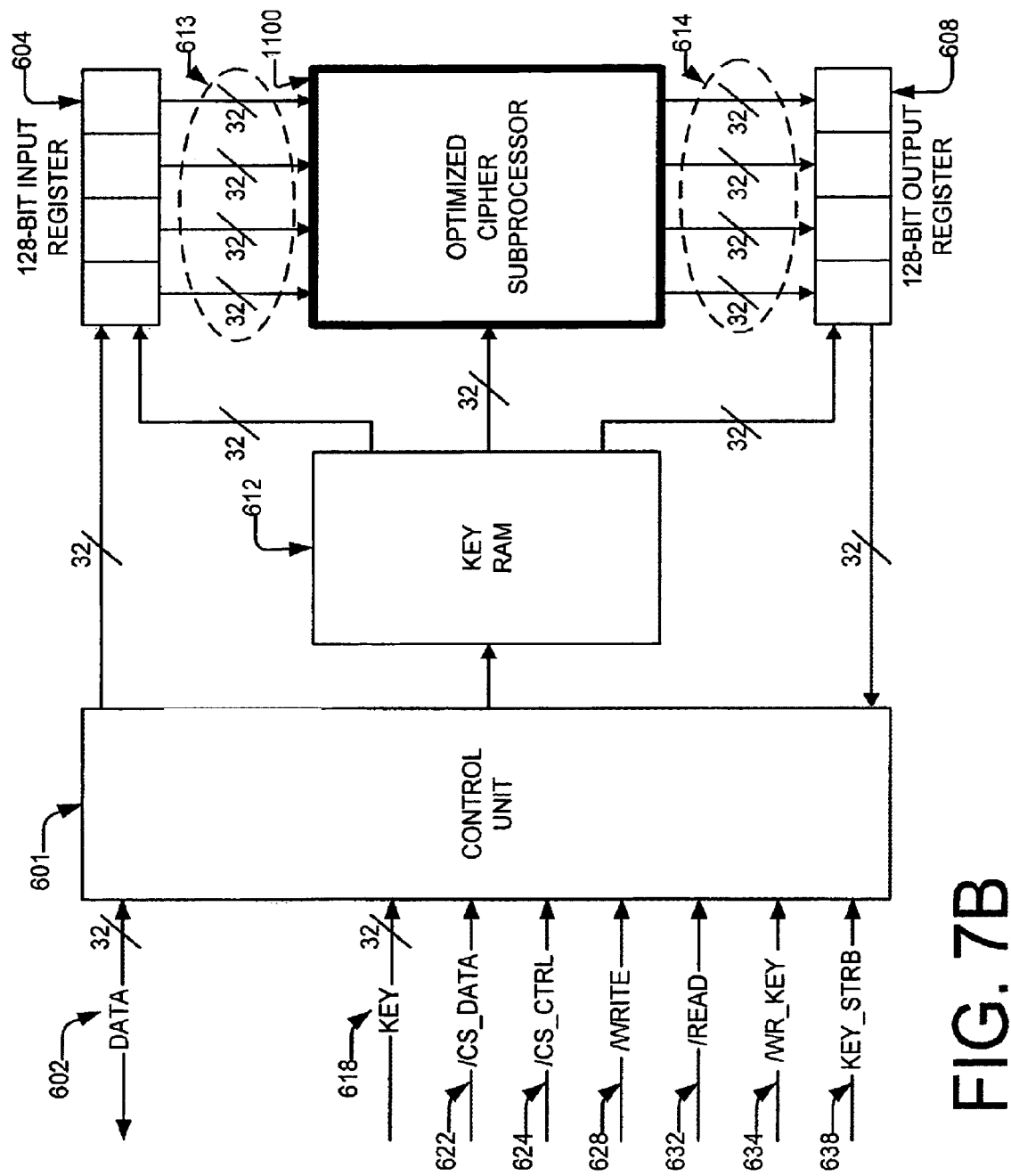
FIG. 7B is a block diagram showing an example hardware configuration of the system of the invention having an optimized cipher subprocessor.
Figure 7C:
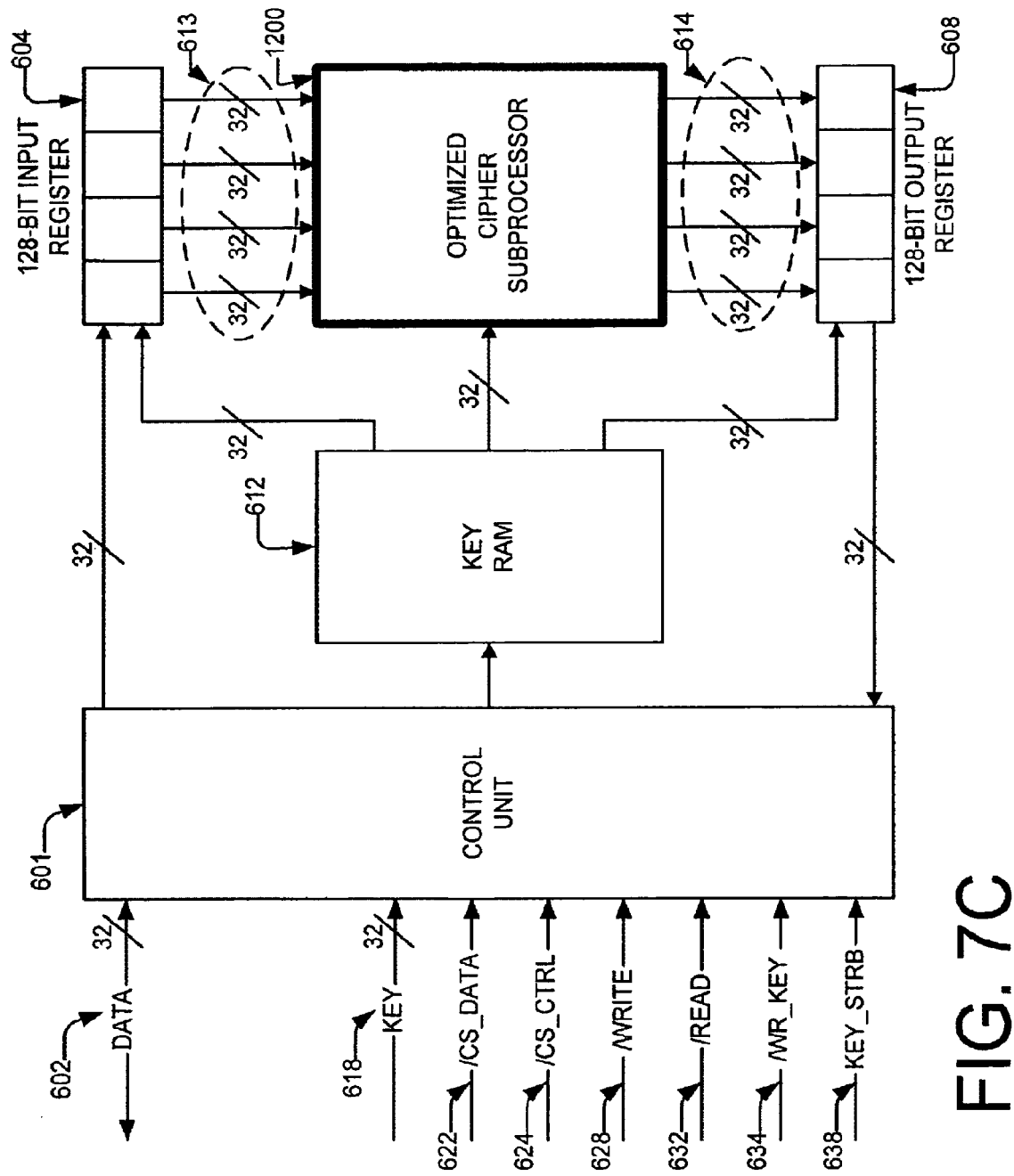
FIG. 7C is a block diagram showing an example hardware configuration of the system of the invention having an optimized cipher subprocessor.

FIGS. 7A, 7B, and 7C depict block diagrams showing an example hardware configuration of the system of the invention having an optimized cipher subprocessor 700, 1100, 1200. As shown in FIGS. 7A, 7B, and 7C, data 602 and a key 618 may be input to a control unit 601 by way of 32-bit interfaces. The data 602 may be stored in a 128-bit input register 604, which, in subsequent rounds of the AES algorithm, may be used to store intermediate states or intermediate cipher texts. For convenience, the initial plain text and the intermediate cipher text will be referred to herein as "intermediate states," "state data," or simply "states." The state, which is stored in the 128-bit input register 604, may be input to an optimized cipher subprocessor (or cipher core or cipher subsystem) 700, 1100, 1200 via 32-bit data buses 613 in a sequential manner. The encryption (or decryption) process takes place simultaneously as the states are being loaded into the optimized cipher subprocessor 700, 1100, 1200. In other words, unlike the system of the prior art, it is no longer necessary to wait for complete loading of the state before manipulating the state. The optimized cipher subprocessor 700, 1100, 1200 may also be configured to improve performance with respect to the ByteSub step of the AES algorithm. This aspect of the optimized cipher subprocessor will be discussed in greater detail below. Once encryption or decryption is complete, the cipher text may be written to a 128-bit output register 608 via 32-bit data buses 614 in a sequential manner. In one non-limiting embodiment of the invention, the cipher may be managed using a control register containing an encryption/decryption flag (not shown), run flag (not shown), and a reset bit (not shown). In such a non-limiting environment, data and control registers may be accessible using /CS_DATA 622 and /CS_CTRL 624 signals, and read and write may be realized at the rising edge of /READ 632 and /WRITE 628 signals, respectively. Key memory may be organized in 256 32-bit words, and pre-calculated sub-keys may be entered to the cipher via a separated 32-bit local interface that can be connected, for example, to the local memory. Furthermore, as shown in FIGS. 7A, 7B, and 7C, new sub-keys may be written to the internal memory at the rising edge of a KEY_STRB 638 signal when /WR_KEY 634 is low. As seen from FIGS. 7A, 7B, and 7C, the cipher subprocessor 700, 1100, 1200 increases efficiency by allowing state data manipulation as the state data is moved from main memory to the cipher subprocessor 700, 1100, 1200 memory. This is shown in greater detail in FIGS. 8A through 8I.

Figure 8A:
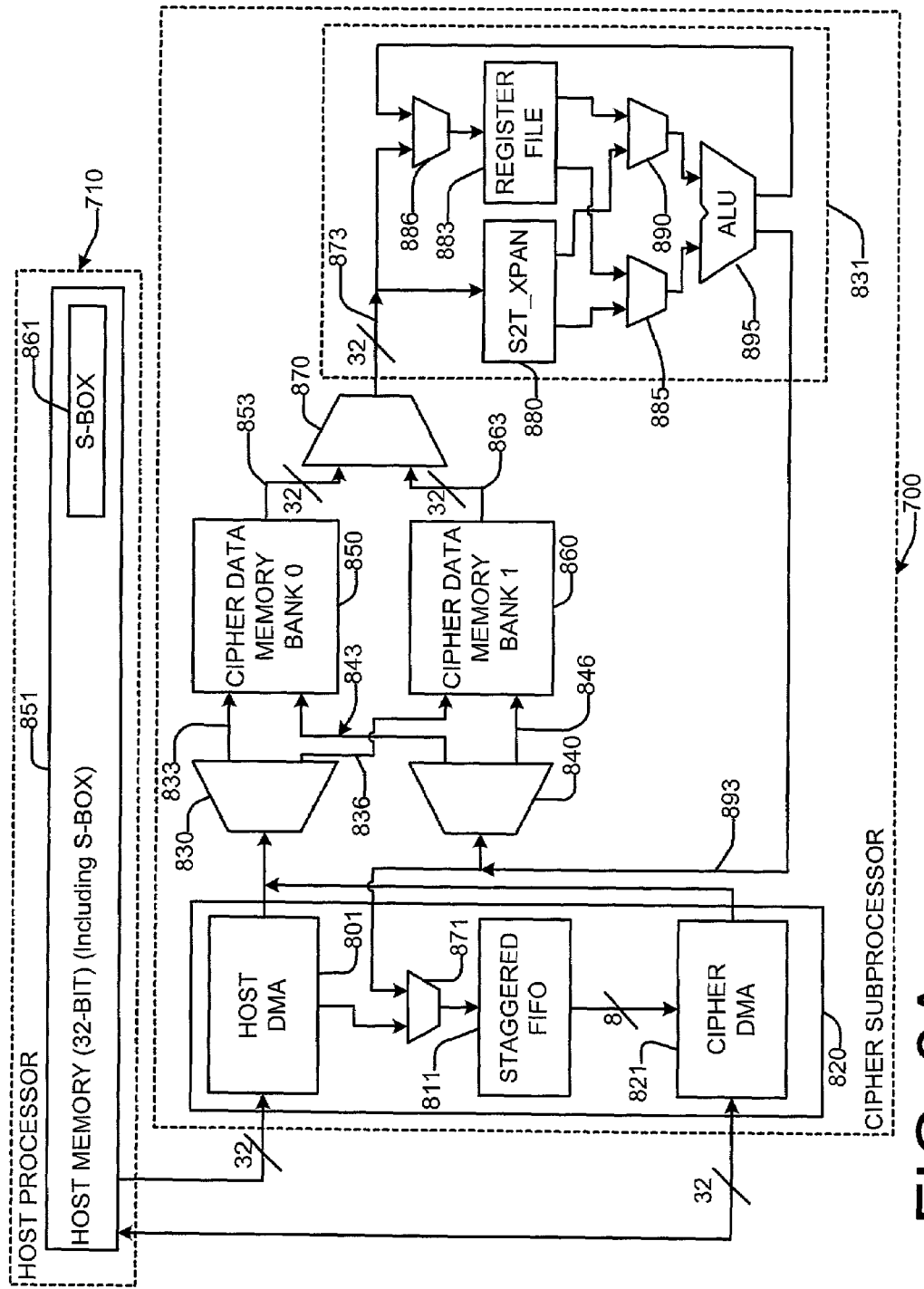
FIG. 8A is a block diagram showing one embodiment of the system of the invention having a memory access unit with a staggered FIFO and an S-box expansion unit.

FIG. 8A is a block diagram showing one embodiment of an optimized cipher subprocessor 700 having an S-box expansion unit 880 and a memory access unit 820 with a staggered FIFO. In the embodiment of FIG. 8A, the cipher subprocessor 700 comprises a memory access unit 820 having a host direct memory access (DMA) unit 801, a cipher DMA 821, a memory access multiplexer (MUX) 871 and a staggered FIFO 811. While the detailed structure and operation of the staggered FIFO 811 will be discussed below with reference to FIGS. 9A through 9H, it is worthwhile to note, at this time, that the staggered FIFO 811 allows the cipher subprocessor 700 to perform the ShiftRow step of the AES algorithm on a given data set as the data set is being loaded into memory. Furthermore, while the S-box lookup of the AES algorithm will be discussed in greater detail with reference to FIGS. 8B through 8I, it is worthwhile to note here that the memory access unit 820 in this embodiment of the invention also performs the S-box lookup in the ByteSub step of the AES algorithm. The cipher subprocessor 700, in addition to the memory access unit 820, further comprises a first multiplexer (MNX) 830, a first data memory bank (hereinafter also referred to as cipher data memory bank 0, or, simply, bank 0) 850, a second data memory bank (hereinafter also referred to as cipher data memory bank 1, or, simply, bank 1) 860, a second MUX 870, a set of processing circuitry 831, and a third MUX 840. While the exact mechanism of the processing circuitry 831 is described in detail below, it is worthwhile to note that these components of the cipher subprocessor 700 are configured to perform the ByteSub step, the ShiftRow step, the MixColumn step, and the AddRoundKey step of the AES algorithm.

In operation the first MUX 830 is configured to receive byte-substituted, row-shifted data from the memory access unit 820 once the data has been accessed and row-shifted by the memory access unit 820, and send the data to bank 0 850 or bank 1 860. The reason for having two memory banks (i.e., bank 0 850 and bank 1 860) is that such a configuration allows for processing of data in one bank while the other bank is concurrently being loaded with data. In this sense, the processor may concurrently perform several operations (e.g., loading data and processing data), rather than sequentially performing these operations. Thus, the first MUX 830 selectively sends the data to bank 0 850 or bank 1 860, depending on which memory bank 850, 860 is being accessed for data manipulation by the cipher subprocessor 700.

The stored data in bank 0 850 and bank 1 860 is then relayed to a second MUX 870, which is configured to select one of the data sets and send the data to processing components 831 for execution of the MixColumn step and the AddRoundKey step of the AES algorithm. The processed state data is then relayed back to the memory access unit 820, which performs the ShiftRow step on the state data using the staggered FIFO 811 to produce row-shifted state data. This row-shifted state data is then sent to cipher DMA 821 to perform the ByteSub step, and then to the first MUX 830, which selectively relays the data to bank 0 850 or bank 1 860, depending on which bank 850, 860 is available for data storage. As can be seen from this architecture, while one data memory bank (i.e., either bank 0 850 or bank 1 860) is being loaded with data, the data from the other data memory bank (i.e., either bank 1 860 or bank 0 850) is accessed for data processing. This allows the cipher subprocessor to concurrently perform several functions (e.g., data loading and data processing), rather than sequentially performing these functions, thereby increasing efficiency in data processing.

The processing components 831, which receive the row-shifted and byte-substituted data from the second MUX 870, comprise an expansion unit (hereinafter referred to as S2T_XPAN) 880, a fourth MUX 886, a register file 883, a fifth MUX 885, a sixth MUX 890, and an arithmetic logic unit (ALU) 895. The S2T_XPAN 880 is configured to receive the selected data from the second MUX 870 and execute the T-table expansion of the AES algorithm on the received data. This aspect of S2T_XPAN 880 will be discussed in greater detail with reference to FIG. 10. The data from the second MUX 870 is also relayed to the fourth MUX 886, which will be discussed below in relation to the ALU 895. The S2T_XPAN 880 performs the T-table expansion operation of the AES algorithm and outputs the manipulated data to the fifth MUX 885 and the sixth MUX 890. These two MUXs 885, 890 are configured to selectively output its contents to the ALU 895, which is configured to perform the MixColumn step and the AddRoundKey step of the AES algorithm. The output of the ALU 895 is sent to the third MUX 840, as described above, as well as to the fourth MUX 886 of the processing components 831. As mentioned previously, the fourth MUX 886 is configured to receive the row-shifted and byte-substituted data from the second MUX 870 in addition to the output from the ALU 895. The fourth MUX 886 selects one of the two inputs to store in the register file 883. In this sense, the register file 883 is configured to store the intermediate results that have been outputted by the ALU 895. These intermediate results are relayed to the fifth MUX 885 and the sixth MUX 890, along with the outputs from the S2T_XPAN 880, and the fifth MUX 886 and sixth MUX 890 select the appropriate input for processing by the ALU 895, thereby repeating the process described above. By arranging the processing components 831 as shown in FIG. 8A, the cipher subprocessor 700 may perform the T-table expansion while concurrently performing several of the other operations related to the AES algorithm. This type of concurrent data processing, again, allows for increased efficiency.

Figure 8B:
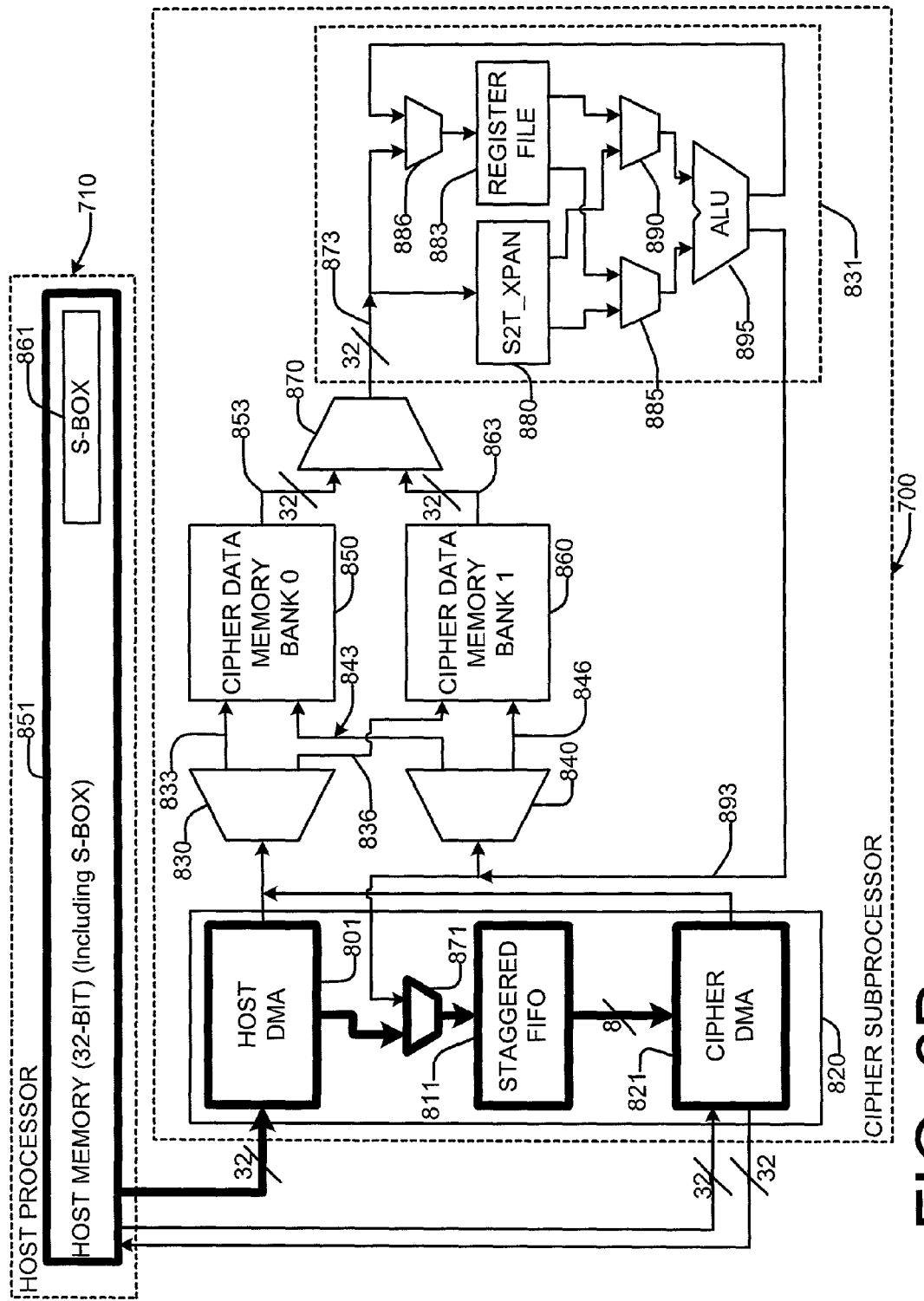
Figure 8C:
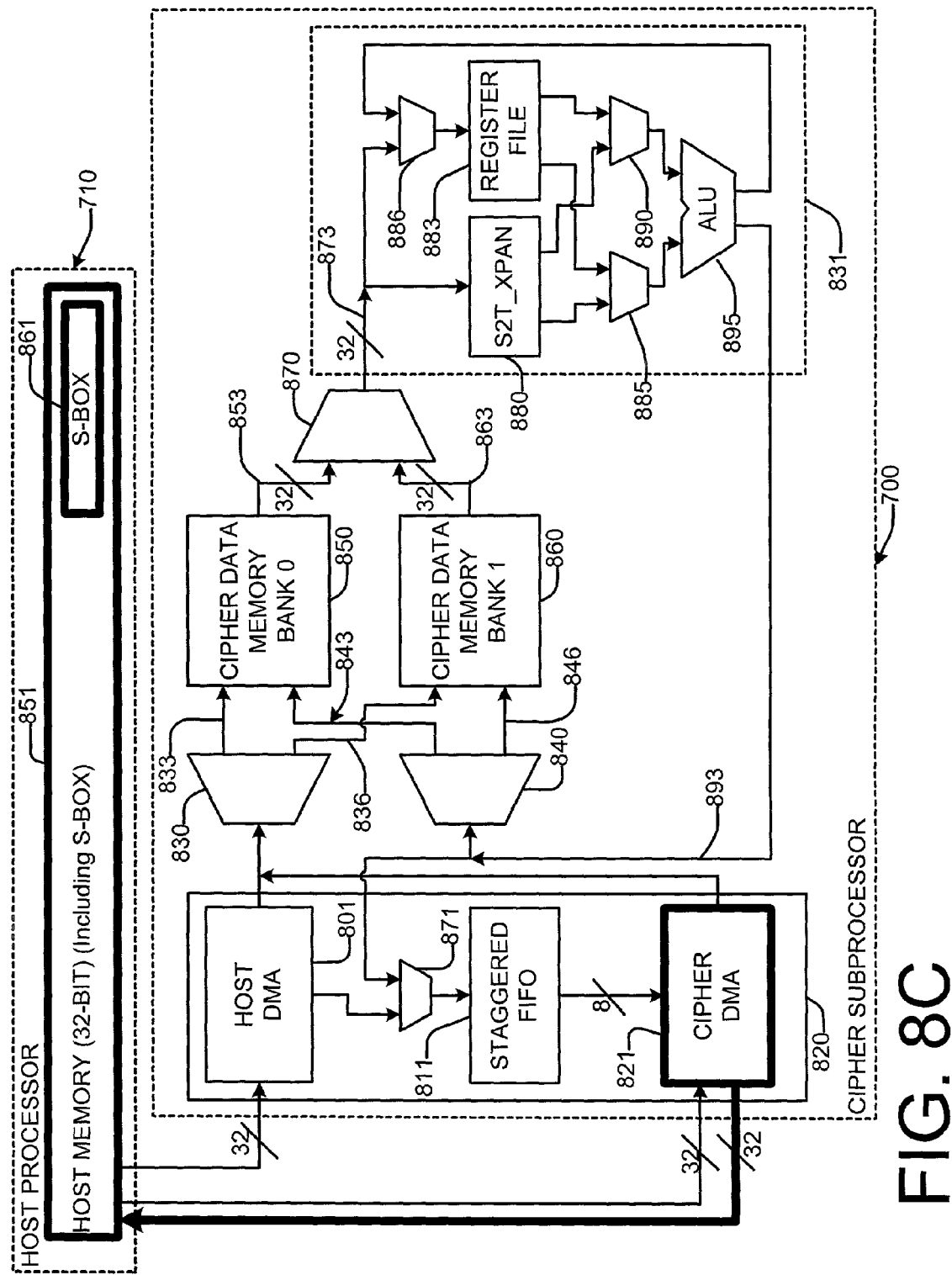
Figure 8D:
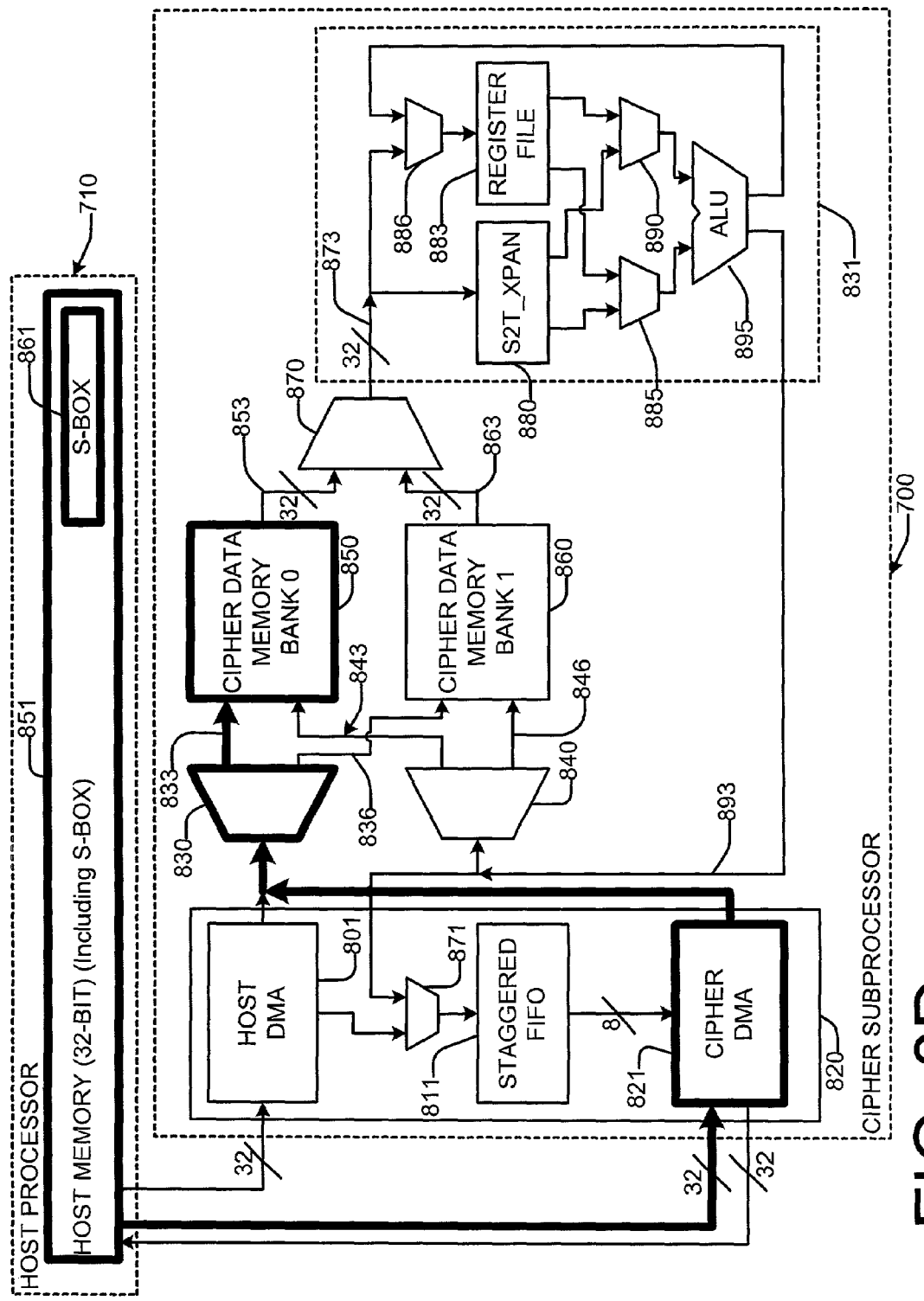
Figure 8E:
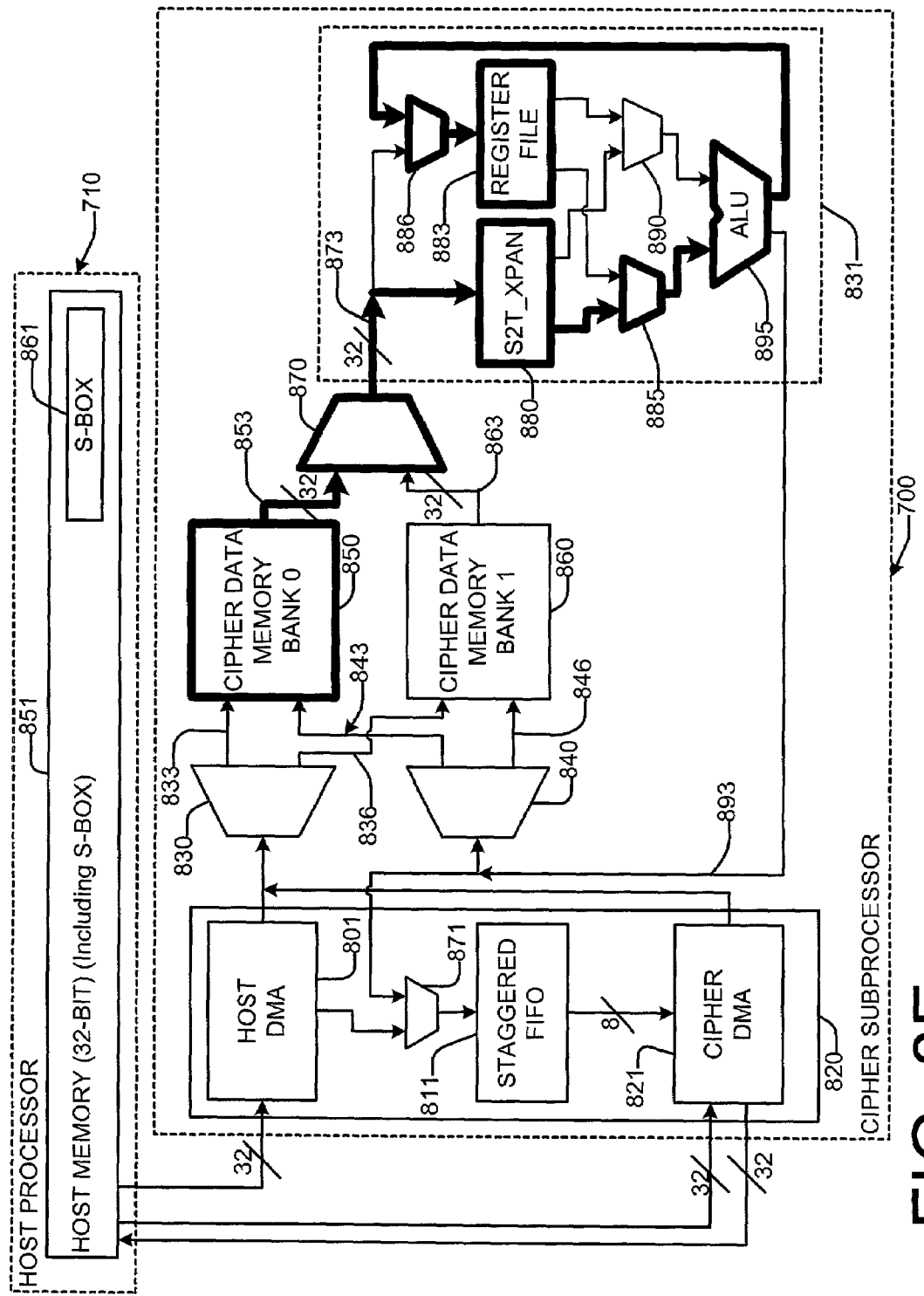
Figure 8F:
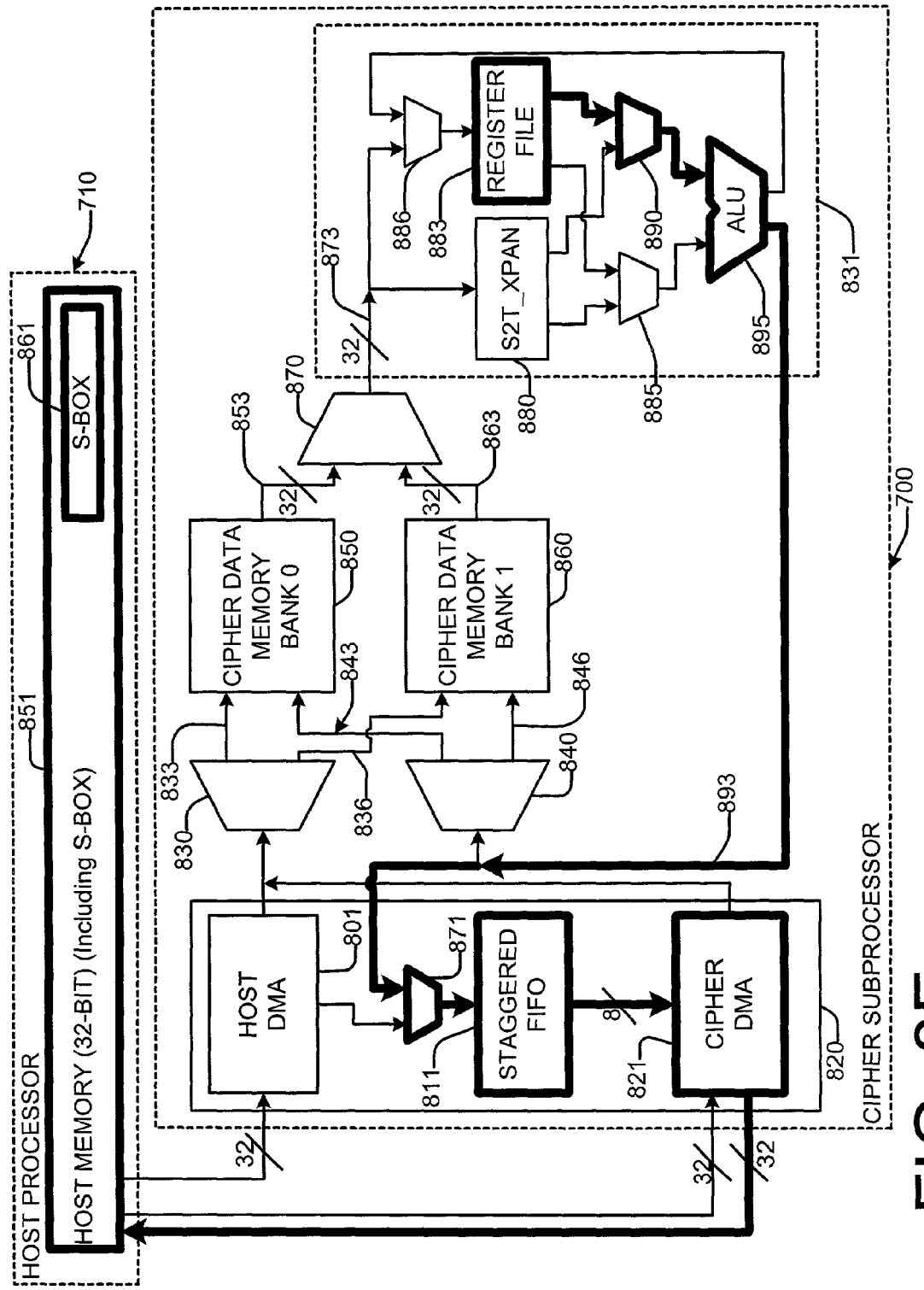
Figure 8G:
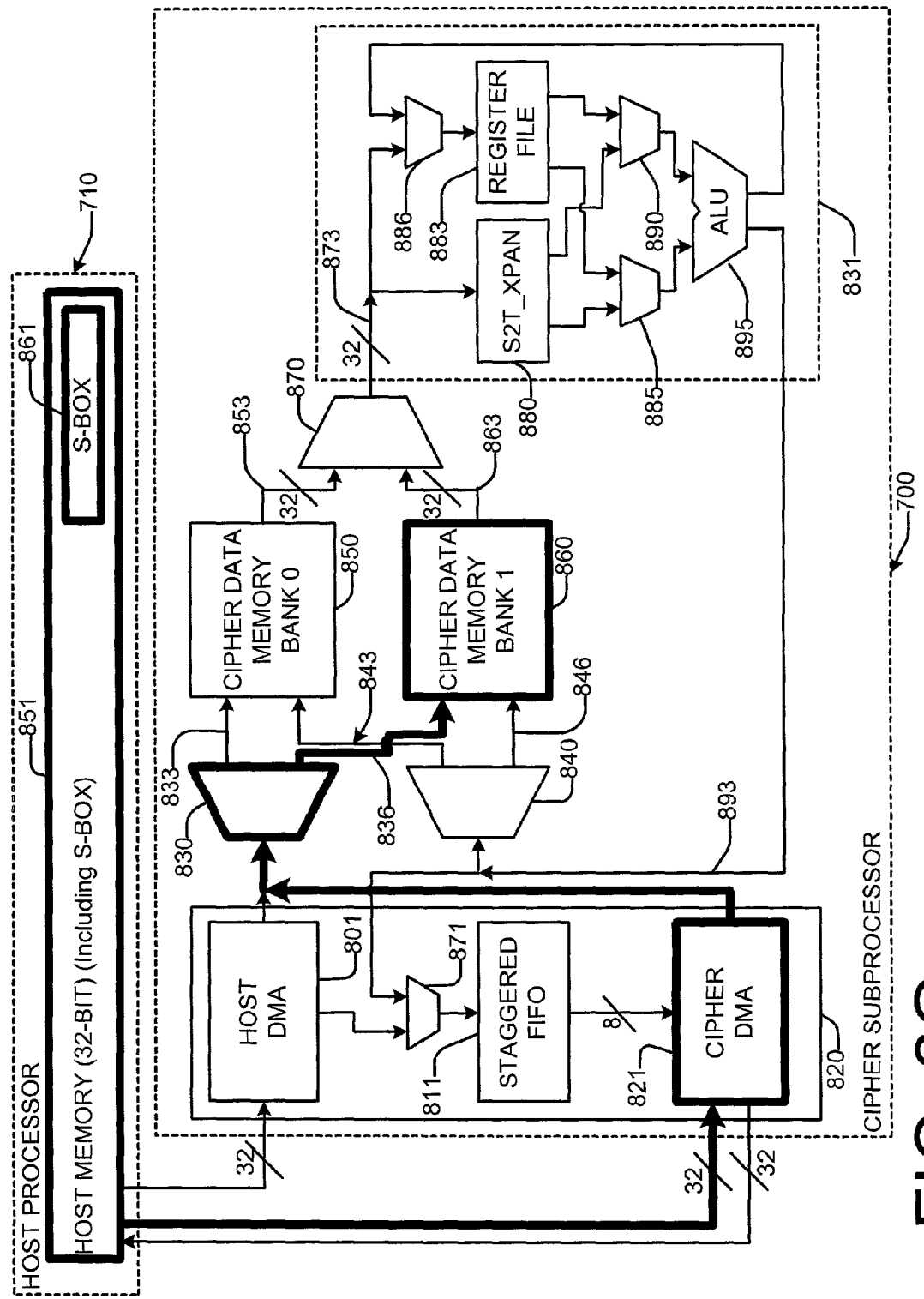
Figure 8H:
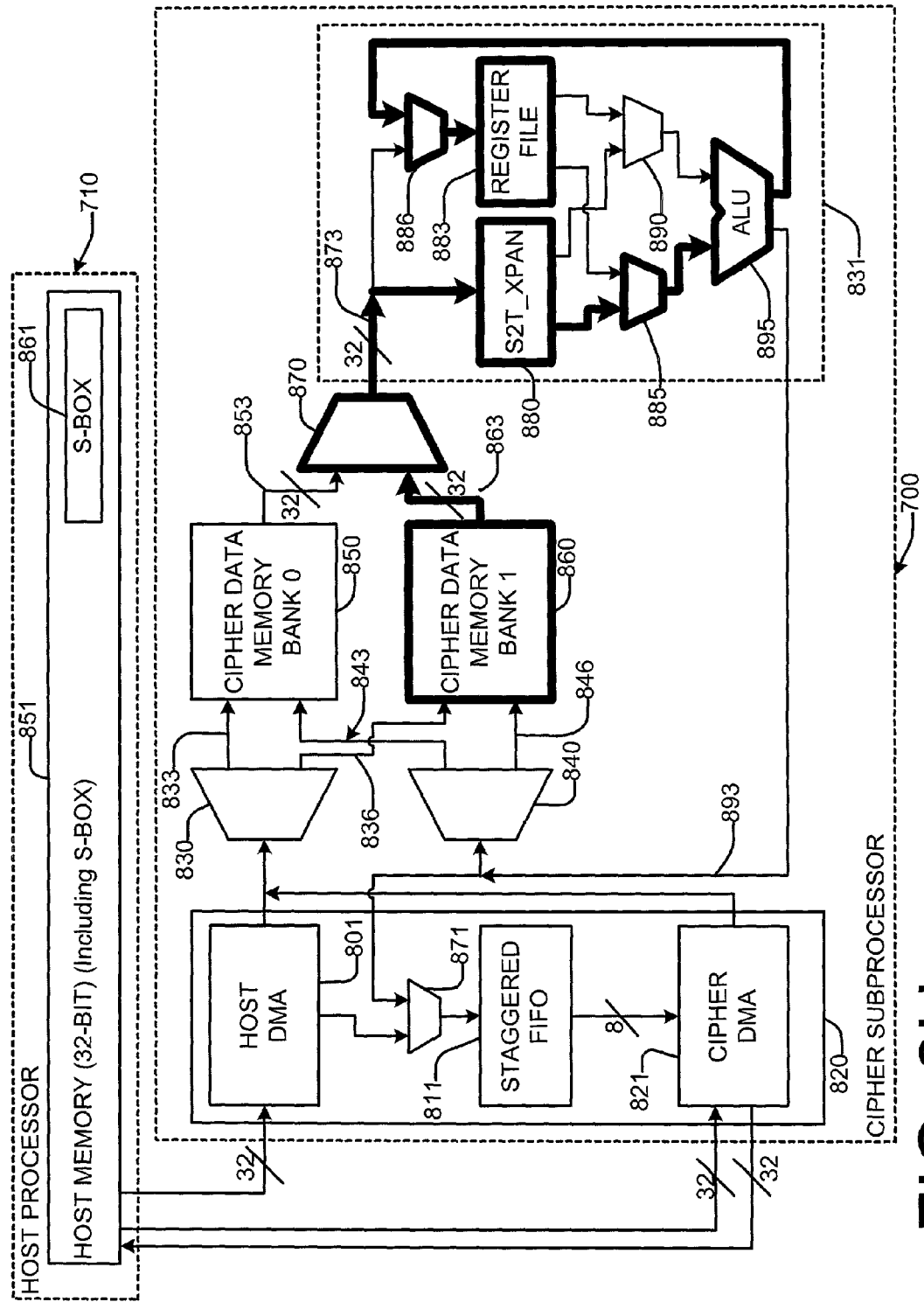
Figure 81:
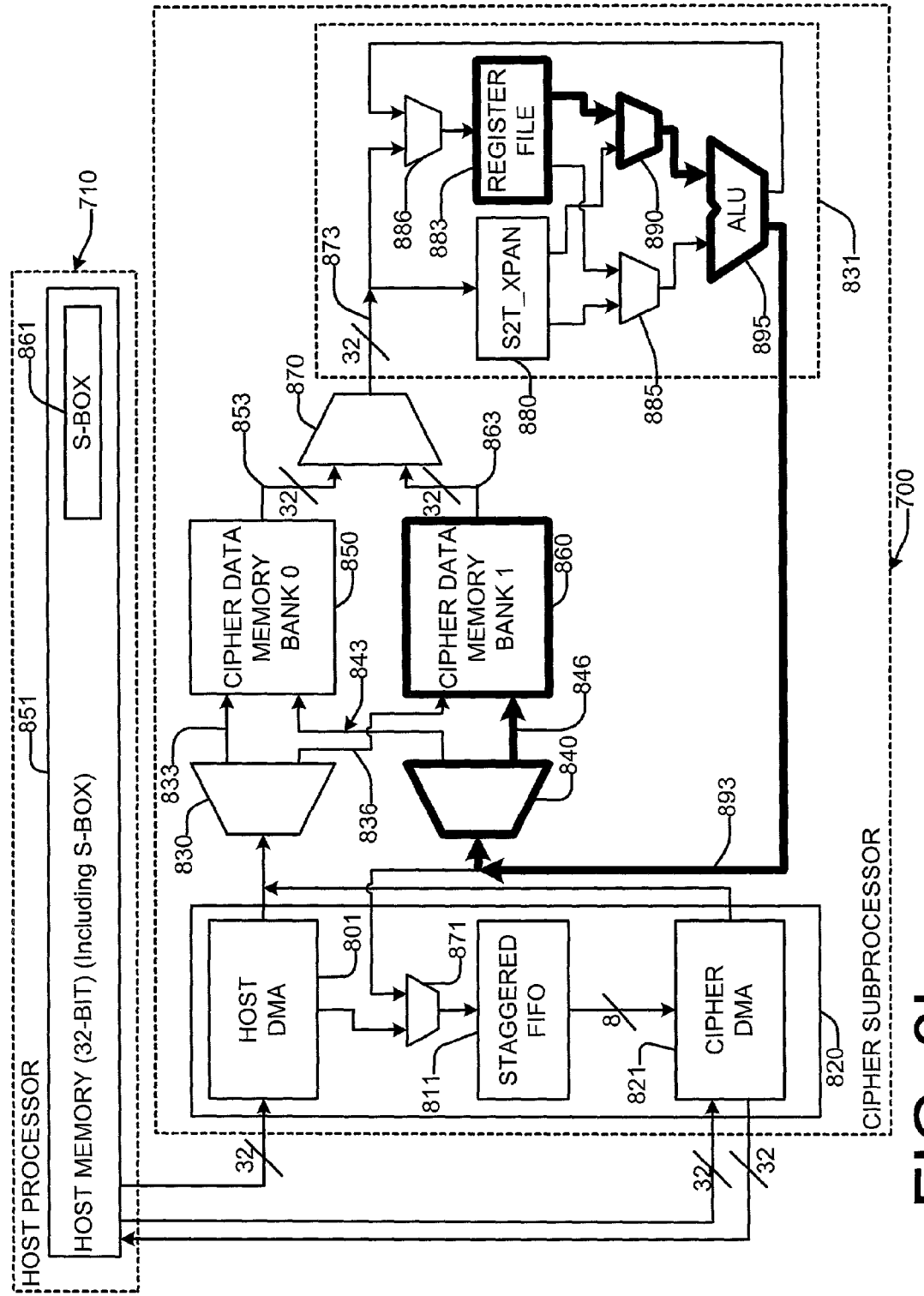

FIGS. 8B through 8I are diagrams showing the data flow between the several components of FIG. 8A as the AES algorithm is executed in the cipher subprocessor 700. For simplicity, FIGS. 8B through 8I may be seen as comprising two distinct segments: (1) a segment associated with the host processor 710; and (2) a segment associated with the cipher subprocessor 700. As shown in FIG. 8B, the system is configured so that the plain text, which is stored in the memory 851 of the host processor 710 is retrieved by the memory access unit 820, which is in the cipher subprocessor 700. Specifically, the host DMA 801 that is within the memory access unit 820 retrieves plain text from the host processor 710 through a 32-bit host data bus. While the preferred embodiment describes data exchange through a 32-bit data bus, it will be clear to one of ordinary skill in the art that the data exchange may take place through other types of buses (e.g., 8-bit buses, 16-bit buses, 64-bit buses, 128-bit buses, etc.) without significantly impacting the invention. The data is then directed through a MUX 871, and, subsequently, cascaded through the staggered FIFO 811, which is configured to perform the ShiftRow step of the AES algorithm and produce row-shifted data. The row-shifted data is shifted out of the staggered FIFO 811 on a byte-by-byte basis, and the outputted bytes are received by a cipher DMA 821, which is configured to perform the S-box lookup operation of the AES algorithm using the output bytes of the staggered FIFO 811. In the non-limiting example of FIGS. 8A through 8I, the S-box 861 is located in a portion of memory in the host random access memory (RAM) 851. Thus, as shown in FIG. 8C, the cipher DMA 821 accesses the host RAM 851 to perform the S-box lookup operation. The execution of the AES algorithm then continues using the highlighted segments of FIG. 8D. Once S-box lookup is finished, the ShiftRow step and the ByteSub step of the AES algorithm are complete, and the data is then relayed to first MUX 830, which subsequently relays the data to one of the cipher data memory banks, either bank 0 850 or bank 1 860. For purposes of illustration, bank 0 850 is chosen in FIG. 8D for storing data for further processing. This data is then retrieved to the S2T_XPAN 880 via MUX 870, as shown in FIG. 8E. The S2T_XPAN 880 performs the T-table expansion (a portion of the MixColumn step of the AES algorithm) from the retrieved data, and the rest of the MixColumn step and the AddRoundKey step of the AES algorithm will then be performed by MUXs 885, 890, arithmetic logic unit (ALU) 895, register file 883, and MUX 886, thereby producing an intermediate state data after the first round of the AES algorithm. This intermediate state data is then sent to the memory access unit 820, as shown in FIG. 8F, to perform the ShiftRow step and the ByteSub step of the AES algorithm in the next round. The resulting state matrix will be stored in another bank (specifically, bank 1 860 in the example of FIG. 8G), thereby resulting in a "ping-pong" type of memory access. This data is subsequently accessed by the register file 883 and the ALU 895 in order to finish the MixColumn step and the AddRoundKey step of the AES algorithm on the state data, as shown in FIGS. 8H and 8I. It is worthwhile to note here, since there are two memory blocks that allow for a "ping pong" type memory access, that the above steps of performing the MixColumn step and the AddRoundKey step of a current state matrix occur substantially concurrently as the ByteSub step and the ShiftRow step of the next state matrix. In other words, while previously manipulated data are going through subsequent steps of the AES algorithm, the subprocessor is concurrently manipulating data for future MixColumn and AddRound-Key steps. Stated differently, while the process described in FIGS. 8E through 8I are taking place on state data for one round of the AES algorithm, the process described in FIGS. 8B through 8D are taking place on state data for a subsequent round of the AES algorithm.

Thus, as shown using the highlighted portions of FIGS. 8A through 8I, the ShiftRow step and the ByteSub step of the AES algorithm are executed fully as the data is loaded into the cipher subprocessor memory. While one embodiment of the detailed operation has been shown with reference to the enciphering process, it will be clear to one of ordinary skill in the art that the above-described components may be used in a similar manner in the AES deciphering process. Also, while the specific context of the above non-limiting example illustrates the operation of the ShiftRow step of the AES algorithm, a similar system may be implemented to perform any type of byte-shifting operation as data is loaded into memory.

Figure 1:
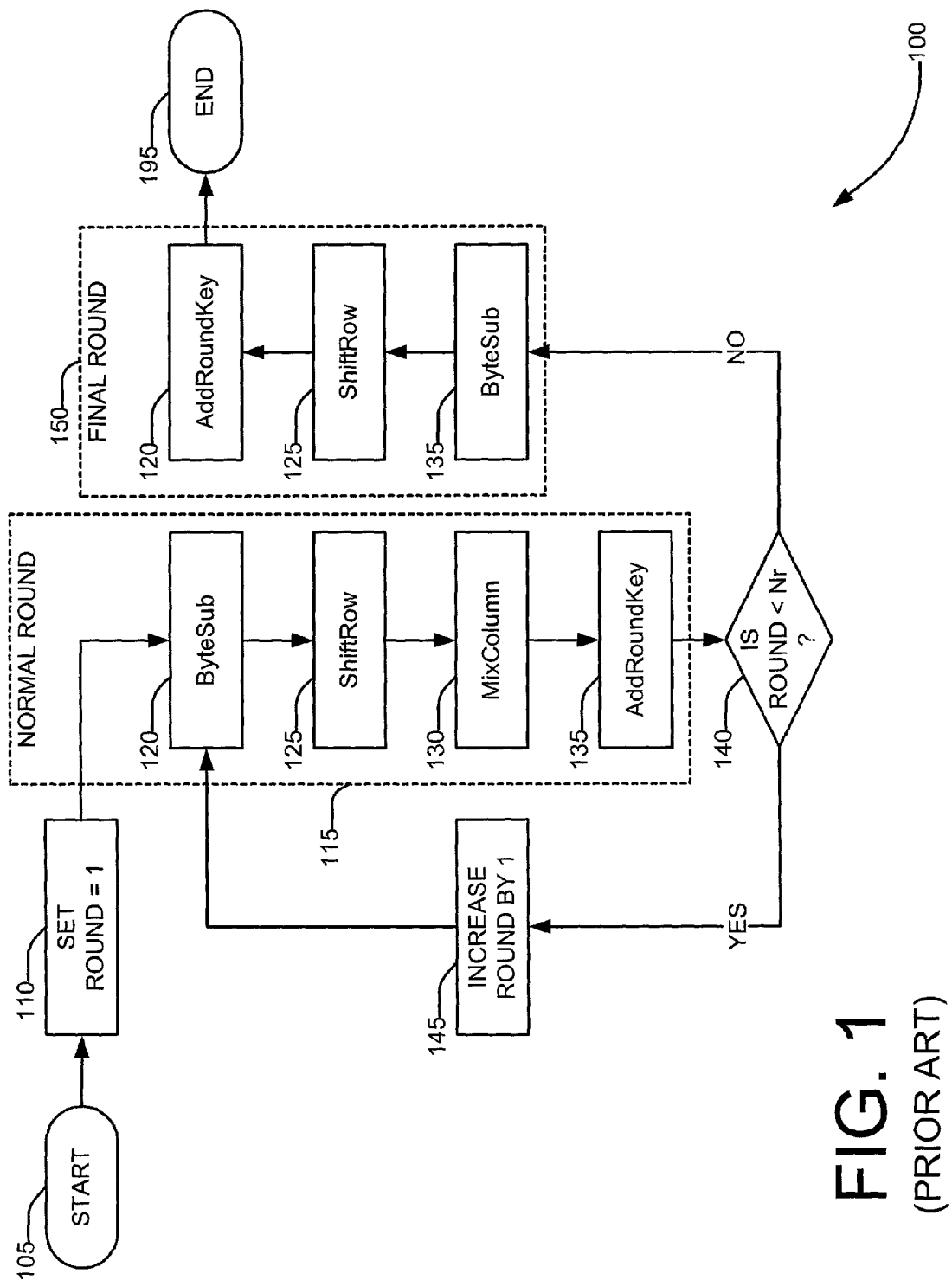
FIG. 1 is a diagram showing a general overview of the steps involved in the Advanced Encryption Standard (AES) algorithm.
Figure 2:
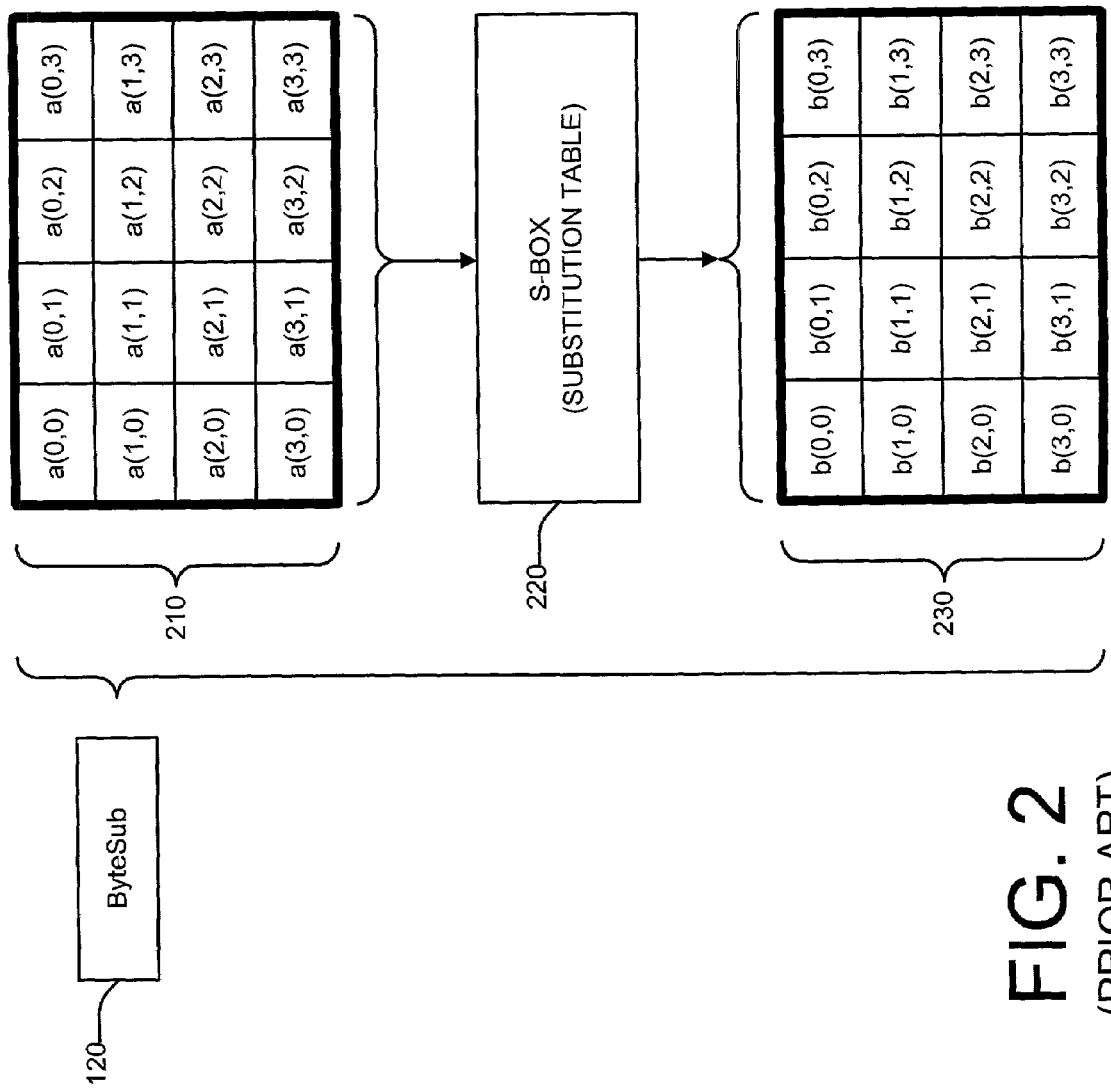
FIG. 2 is a diagram showing the ByteSub step of FIG. 1 in greater detail.
Figure 3:
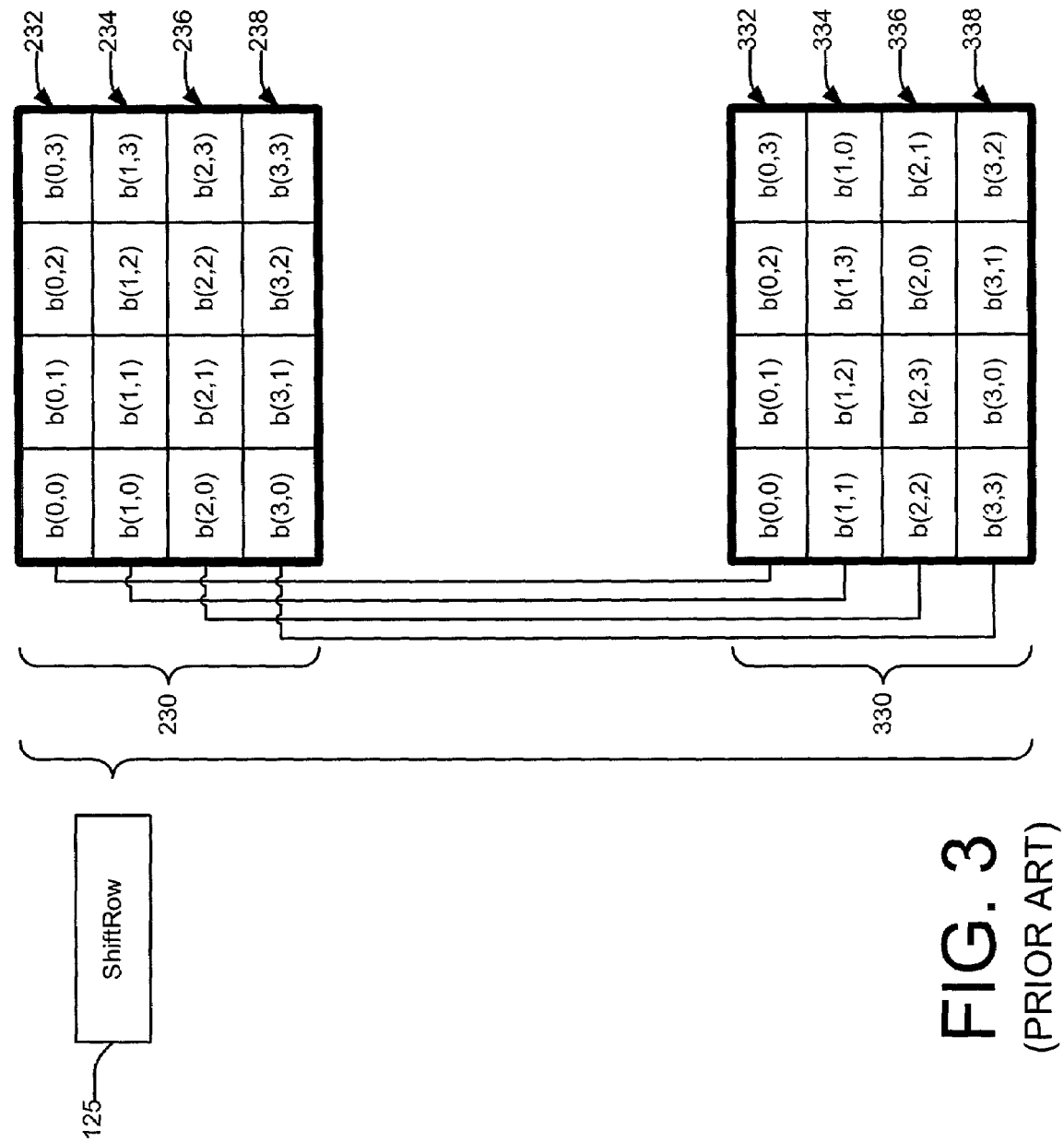
FIG. 3 is a diagram showing the ShiftRow step of FIG. 1 in greater detail.
Figure 4:
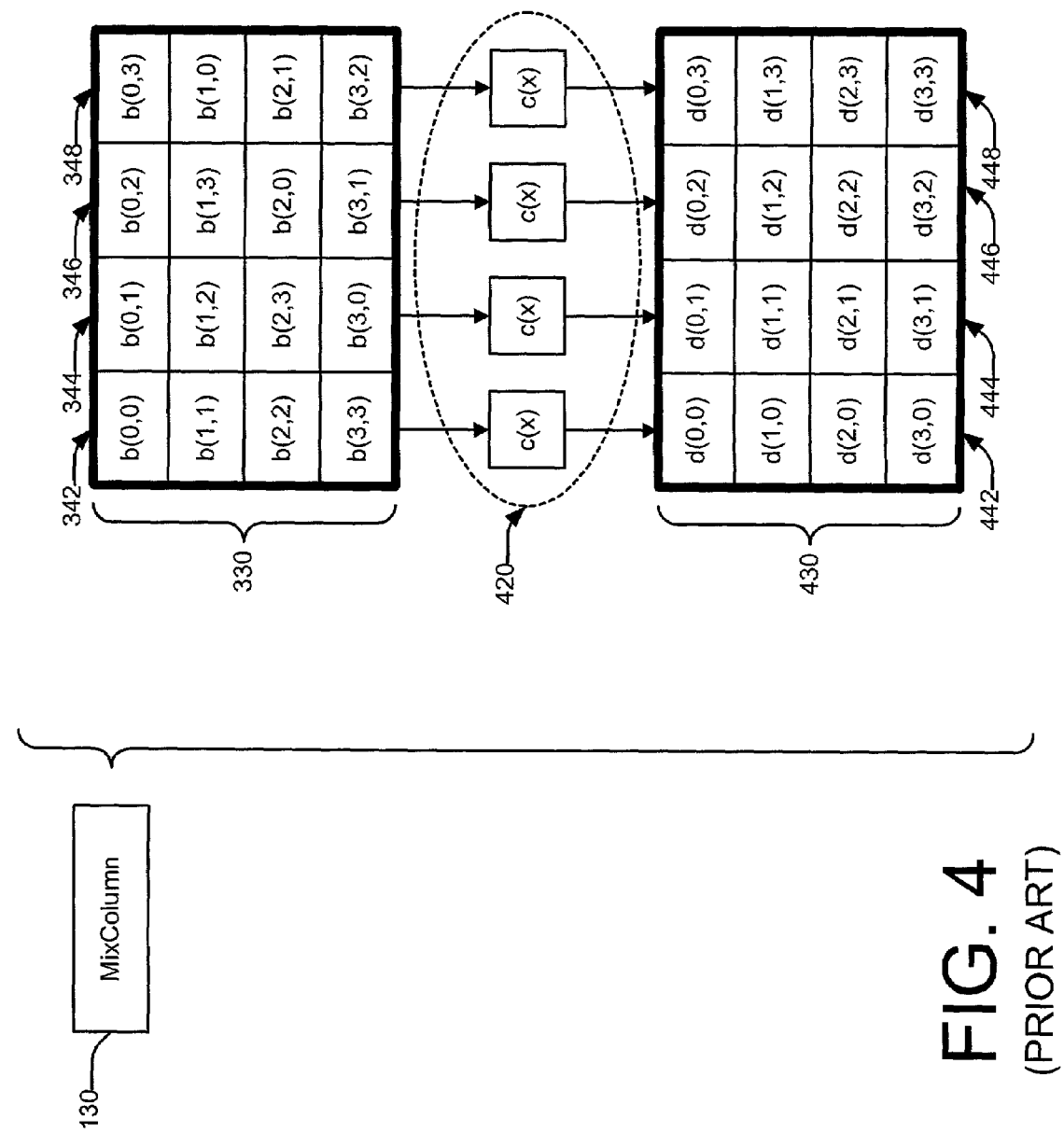
FIG. 4 is a diagram showing the MixColumn step of FIG. 1 in greater detail.
Figure 5:
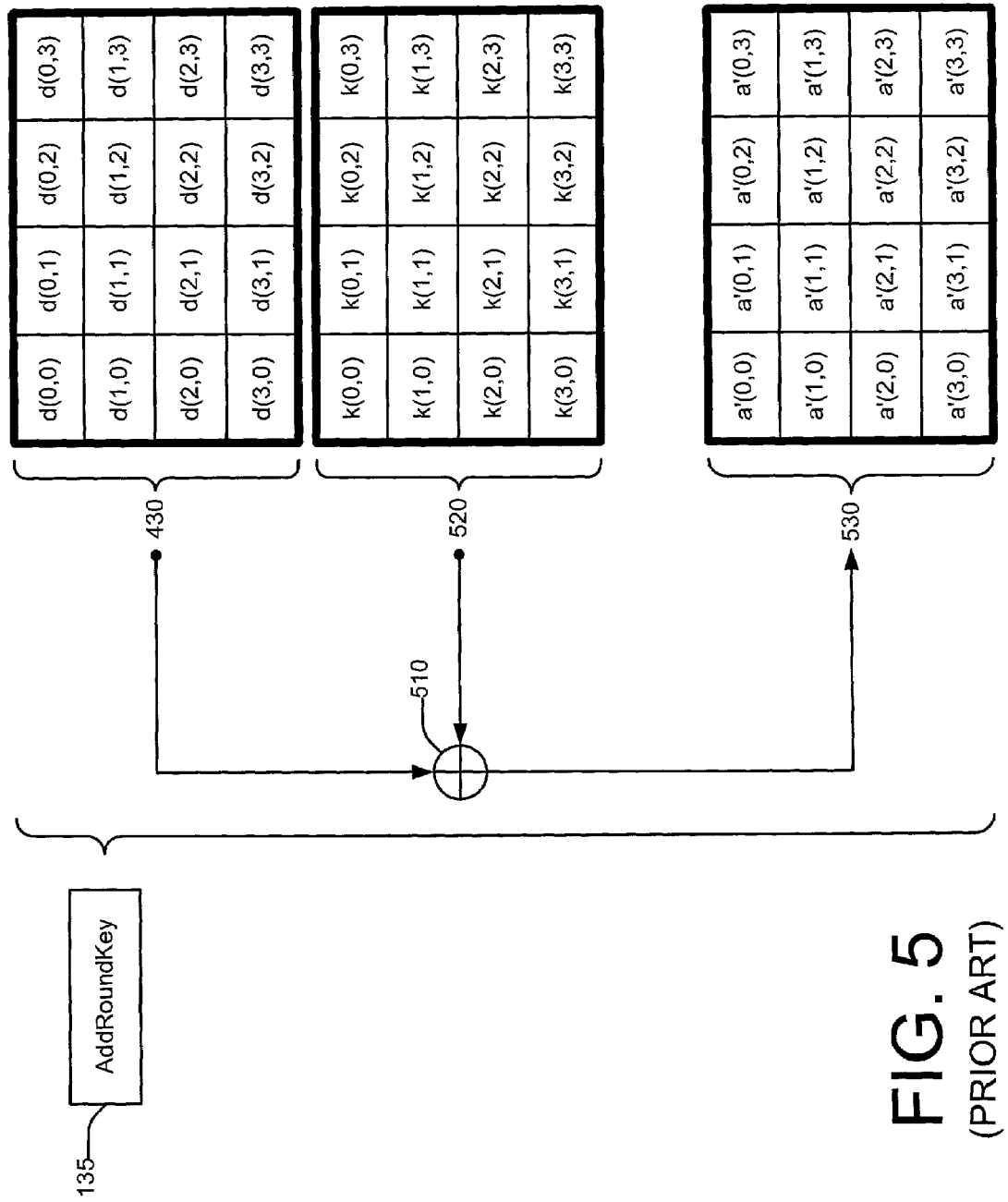
FIG. 5 is a diagram showing the AddRoundkey step of FIG. 1 in greater detail.
Figure 6A:
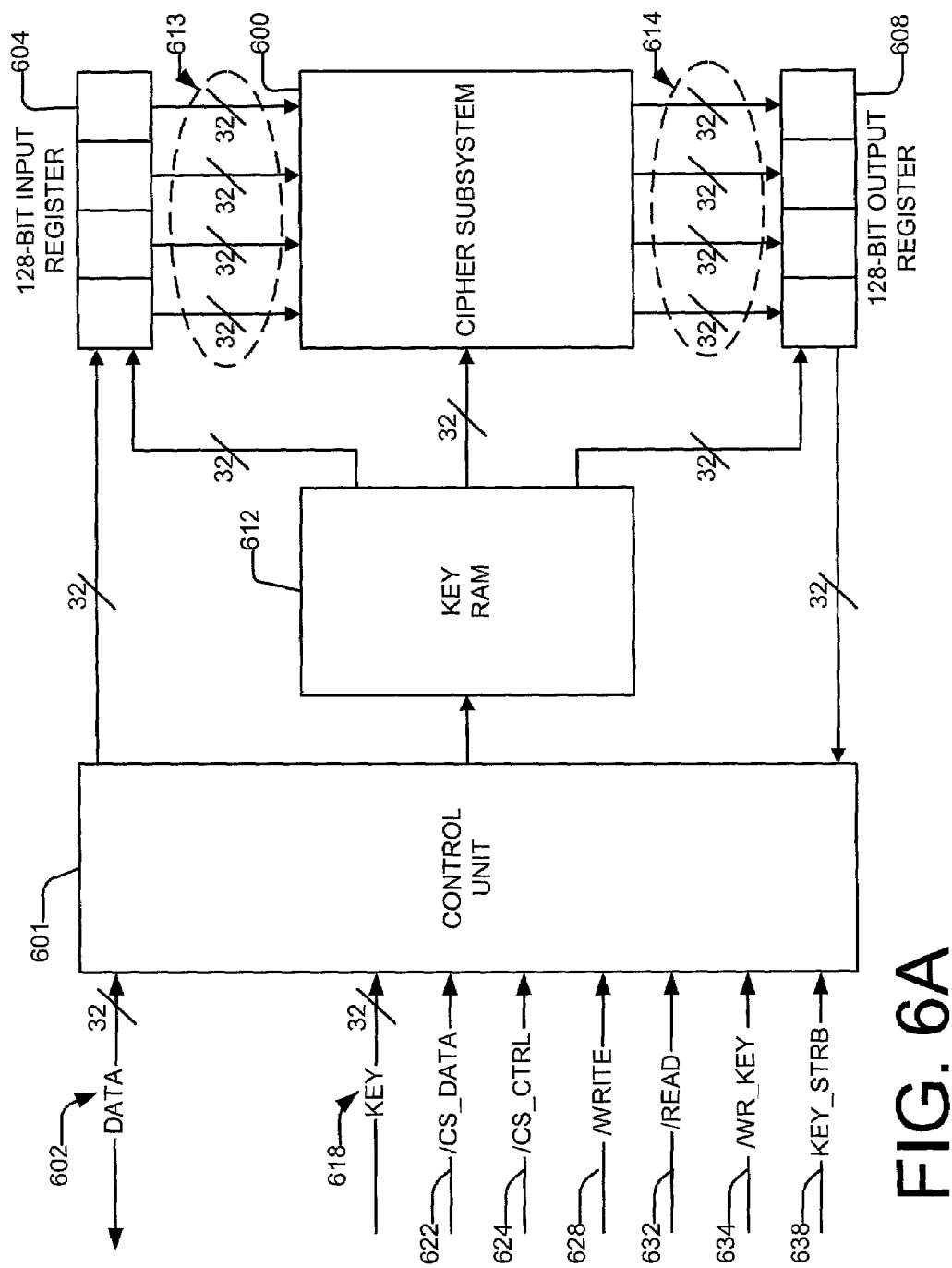
FIG. 6A is a block diagram showing an example hardware configuration of the prior art that may be used in the execution of the AES algorithm of FIG. 1.
Figure 6B:
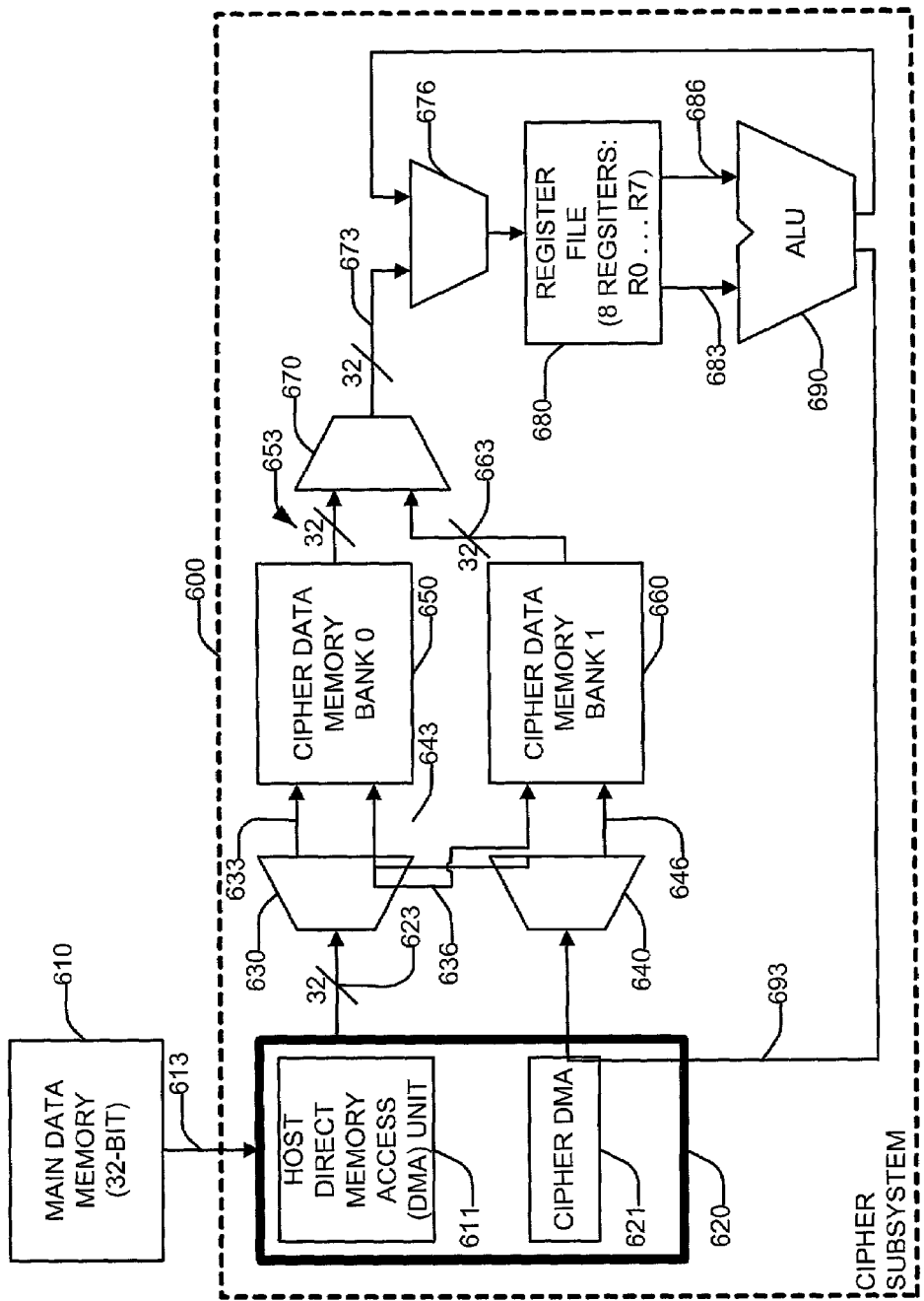
FIG. 6B is a block diagram showing, in greater detail, an example cipher subprocessor of the configuration in FIG. 6A.
Figure 9A:
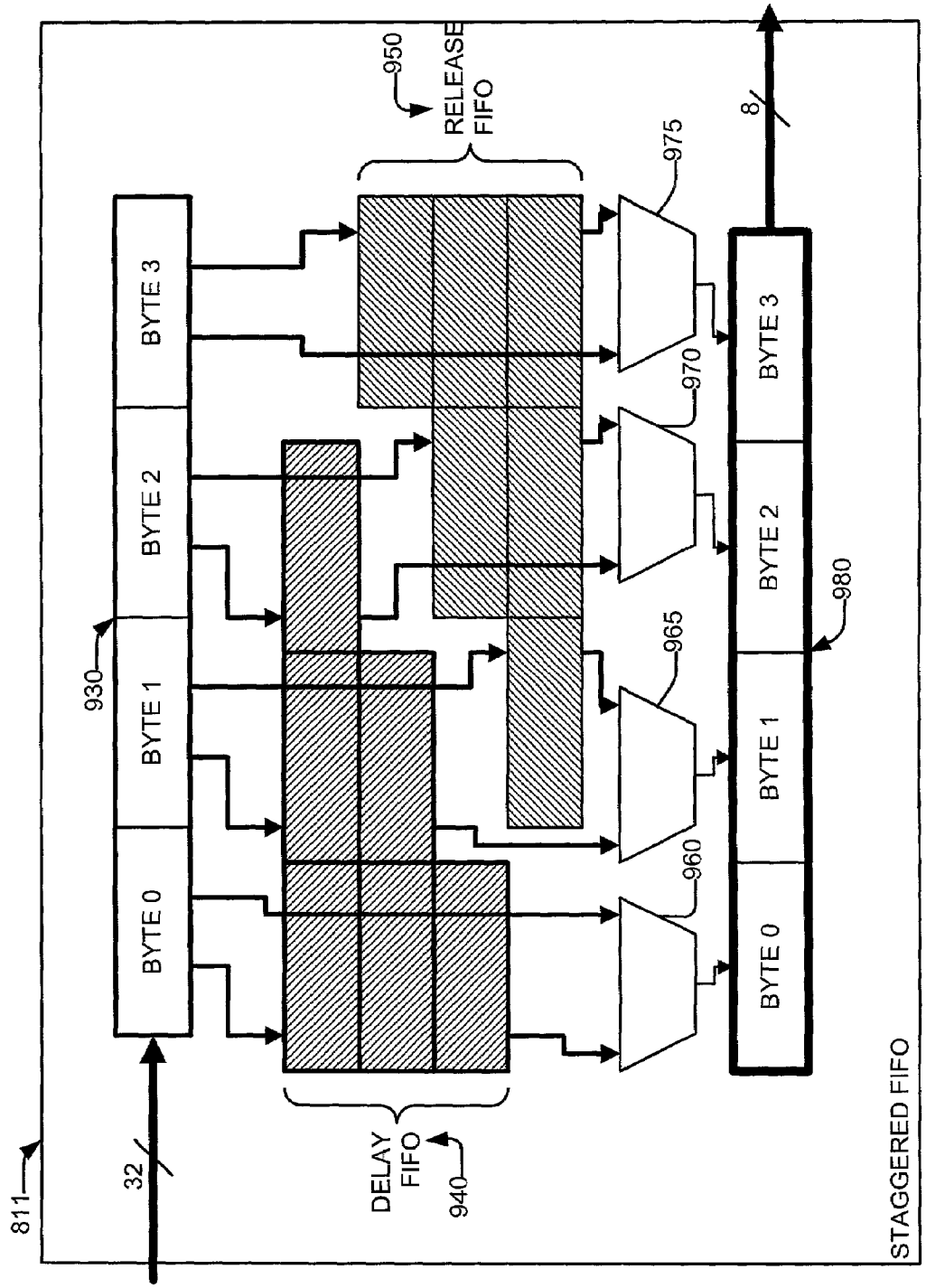
FIG. 9A shows the host DMA with the staggered FIFO of FIG. 8A in greater detail.

As described with reference to FIGS. 8A through 8I, the staggered FIFO 811 is configured to perform the ShiftRow step of the AES algorithm, thereby producing a row-shifted data set for further processing. An example architecture of the staggered FIFO is shown in FIG. 9A. In architecture, the staggered FIFO 811 comprises a 32-bit input register 930 configured to receive the 32-bit (or 4-byte) input from the cipher DMA 801. Additionally, the staggered FIFO 811 comprises two sets of variable-layer FIFOs 940, 950, each having a plurality of FIFO layers. These two sets of variable-layer FIFOs 940, 950 are referred to herein as a delay FIFO 940 (for the first set of variable-layer FIFOs) and a release FIFO 950 (for the second set of variable-layer FIFOs). As shown in FIG. 9A, the delay FIFO 940 is configured to receive a portion of the 4-byte input from the input register 930, and sequentially cascade the bytes through the plurality of FIFO layers in the delay FIFO 940. The output of the delay FIFO 940 is selectively relayed to either the release FIFO 950 or a set of MUXs 960, 965, 970, 975, depending on the byte position of the output. The release FIFO 950 is configured to selectively receive either the output bytes of the release FIFO 940 or a byte from the 4-byte input register 930, depending on the byte position. The received bytes are cascaded through the release FIFO 950 and, after being buffered for one clock cycle, released to the set of MUXs 960, 965, 970, 975. The set of MUXs 960, 965, 970, 975 receives bytes and outputs a selected byte from each MUX 960, 965, 970, 975 to a 4-byte output register 980. This data is then shifted out of the 4-byte output register 980 to the cipher DMA 821 as shown in FIGS. 8A through 8I. In order to better illustrate the operation of the staggered FIFO 811, the ShiftRow step of the AES algorithm is shown during a non-limiting example of enciphering (FIGS. 9B through 9H) and a non-limiting example of a deciphering (FIGS. 9I through 9O). In the following examples, the data matrix 230 of FIG. 3 is used for purposes of clarity. However, it will be clear to one of ordinary skill in the art that any matrix may be row-shifted using a staggered FIFO 811 of appropriate size and dimension.

Figure 9B:
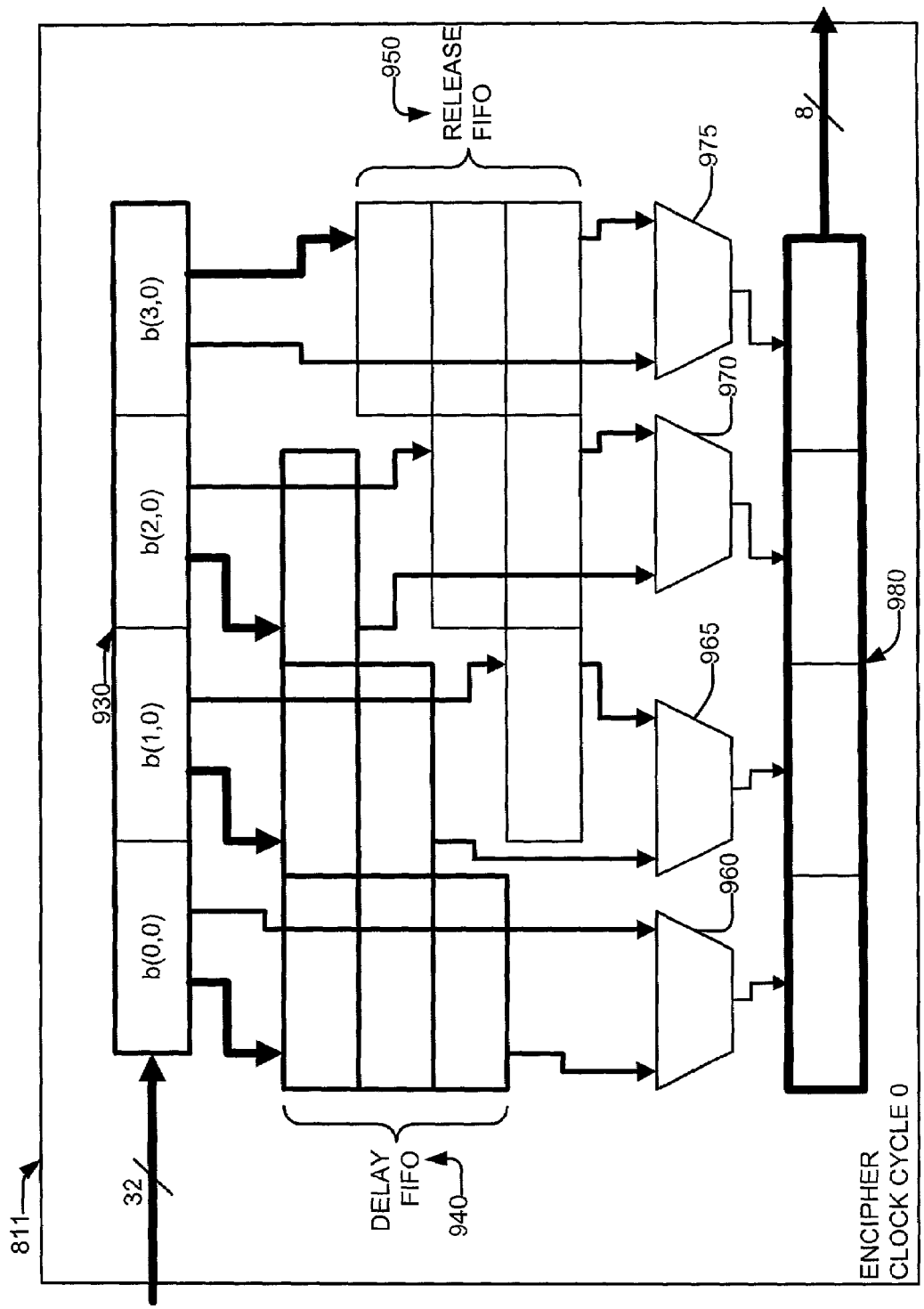

FIGS. 9B through 9H are diagrams illustrating the ShiftRow step during enciphering. As shown in FIG. 9B, the ShiftRow step during enciphering begins at a designated clock cycle (hereinafter referred to as encipher clock cycle 0). At this point, the four bytes in the first column (i.e., b(0,0), b(1,0), b(2,0), and b(3,0)) of the data matrix 230 are prepared for input from the 4-byte input register 930 to the delay FIFO 940 and the release FIFO 950.

Figure 9C:
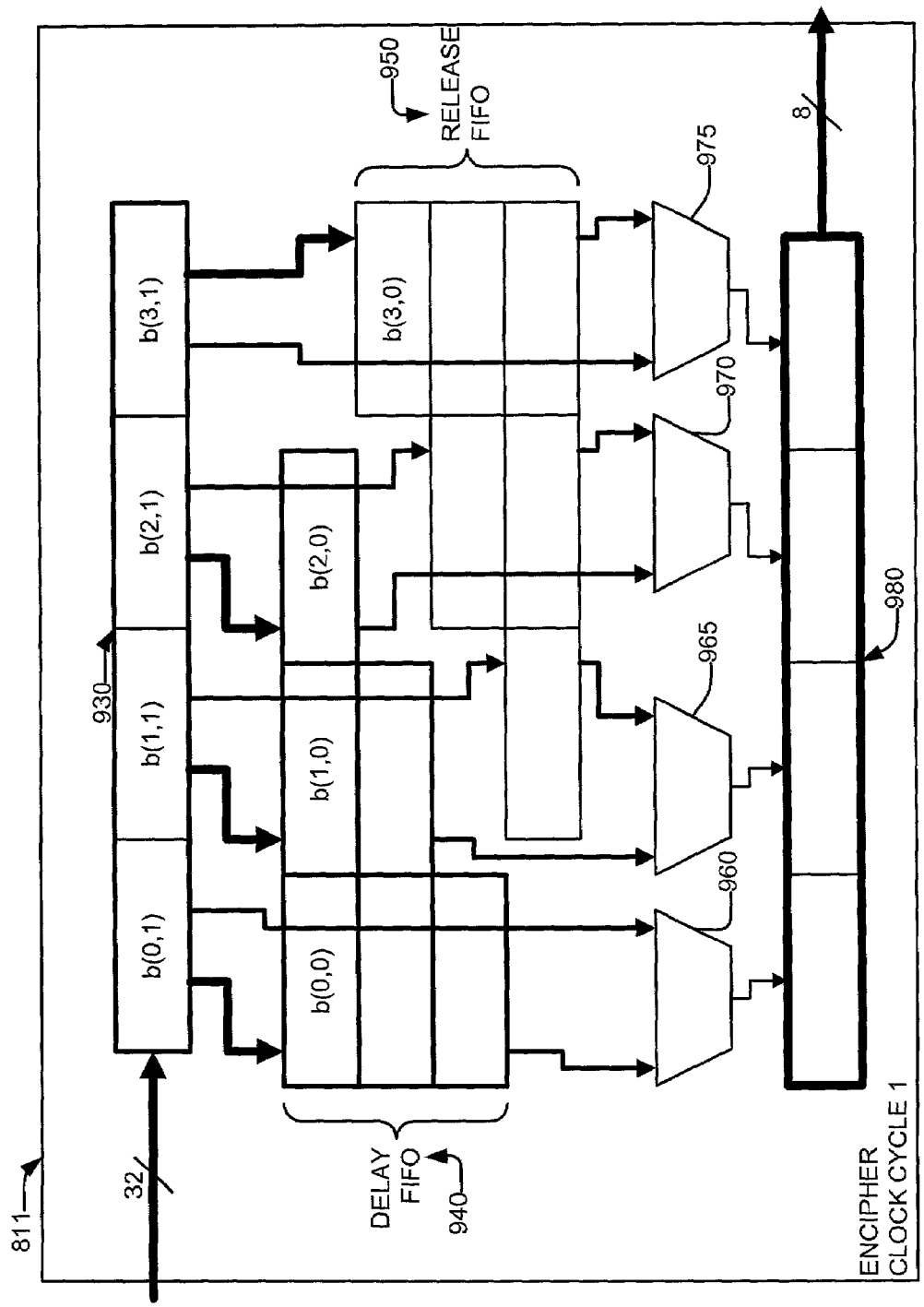

As shown in FIG. 9C, at encipher clock cycle 1, the first three bytes (i.e., b(0,0), b(1,0), and b(2,0)) from the 4-byte input register 930 are loaded into the first layer of the delay FIFO 940; the last one byte (i.e., b(3,0)) from the 4-byte input register 930 is loaded into the first layer of the release FIFO 950; and the four bytes from the second column (i.e., b(0,1), b(1,1), b(2,1), and b(3,1)) of the data matrix 230 are loaded to the 4-byte input register 930 for encipher clock cycle 2.

Figure 9D:
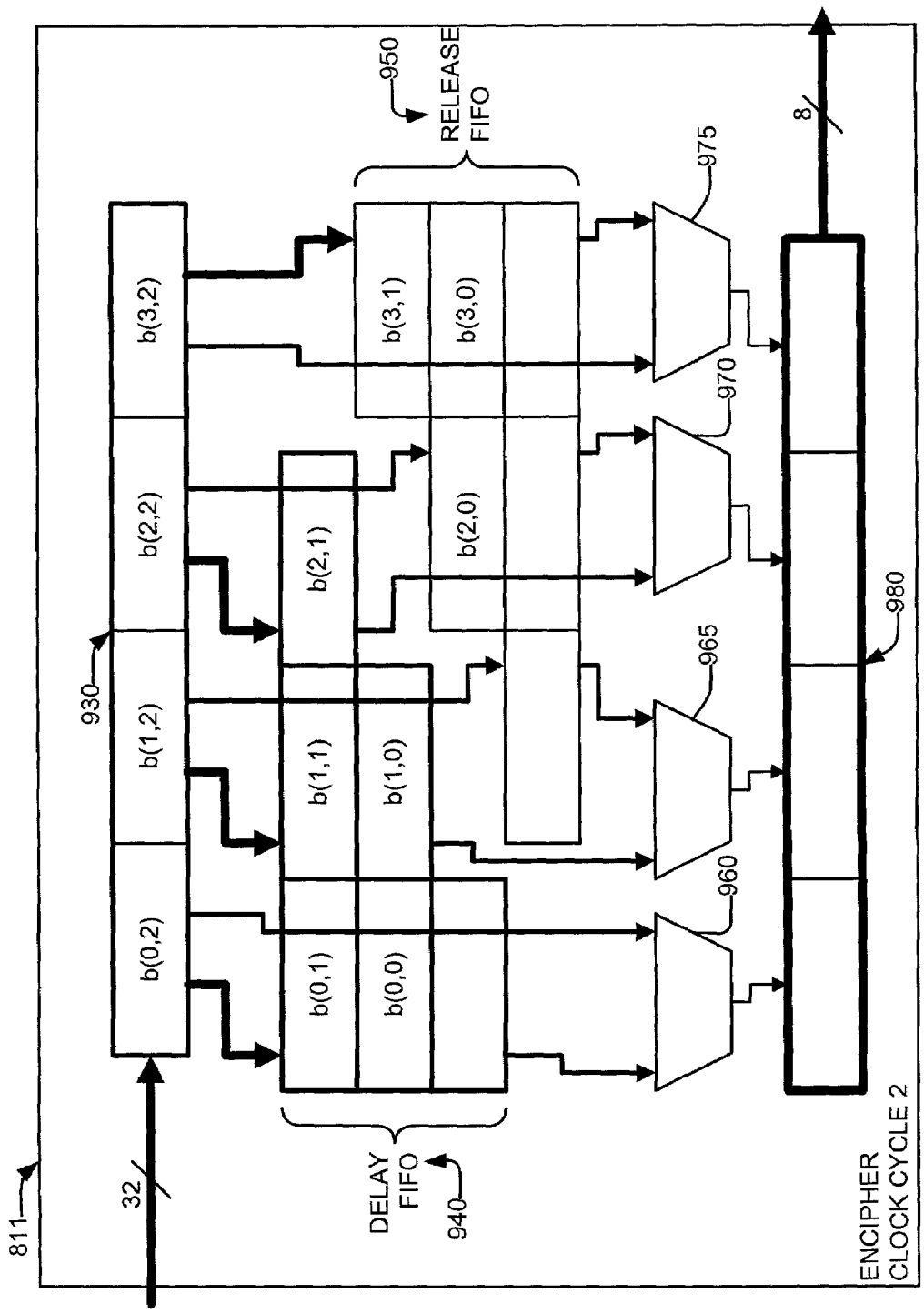

During encipher clock cycle 2, as shown in FIG. 9D, the first two bytes (i.e., b(0,0) and b(1,0)) from the first row of the delay FIFO 940 are loaded into the second layer of the delay FIFO 940; the third byte (i.e., b(2,0)) from the first layer of the delay FIFO 940 is loaded into the first byte-position in the second layer of the release FIFO 950; the one byte (i.e., b(3,0)) from the first layer of the release FIFO 950 is loaded into the last byte-position of the second layer of the release FIFO 950; and the four bytes in the third column (i.e., b(0,2), b(1,2), b(2,2), and b(3,2)) of the data matrix 230 are loaded to the 4-byte input register 930.

Figure 9E:
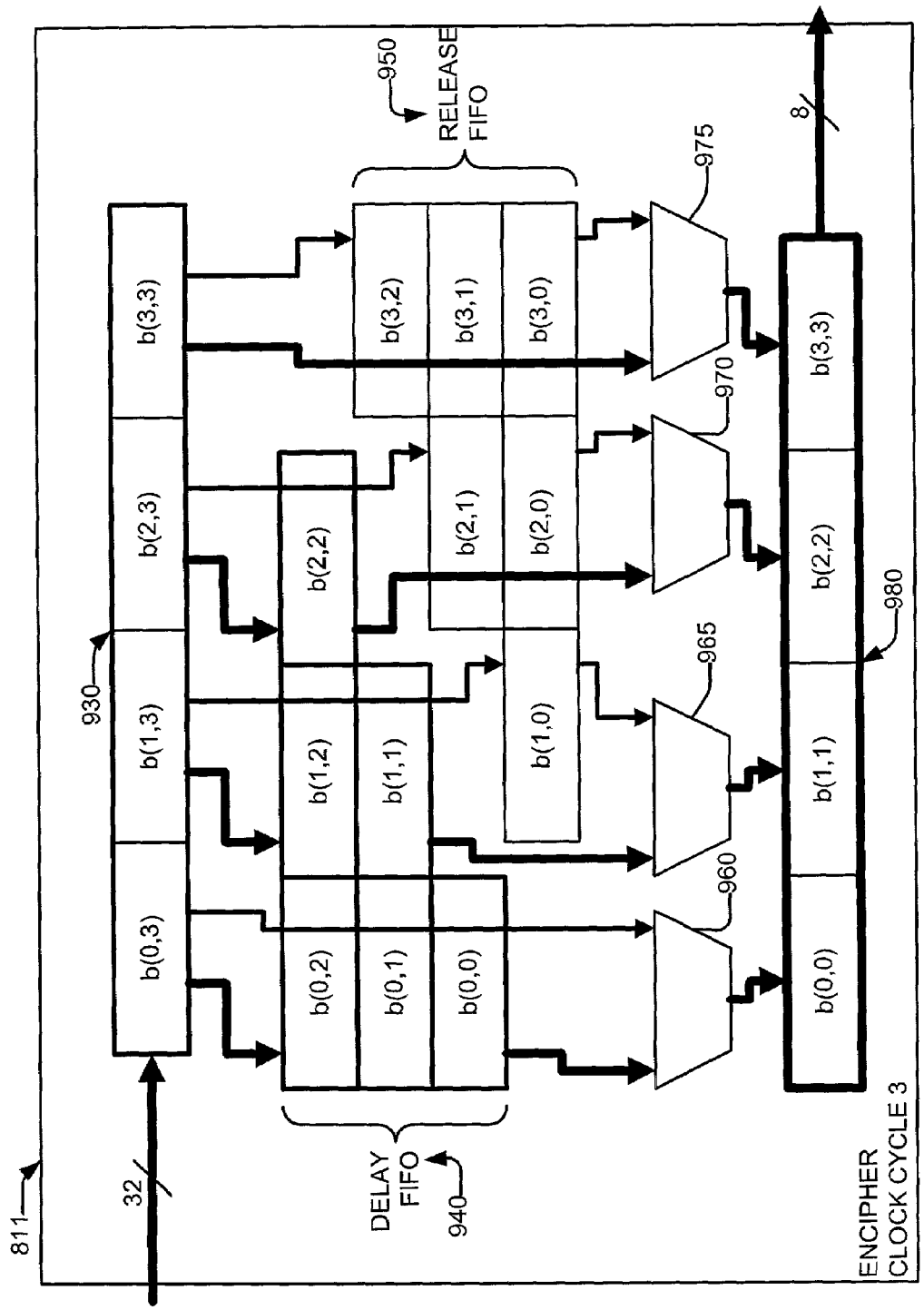

In encipher clock cycle 3, as shown in FIG. 9E, the first byte (i.e., b(0,0)) from the second layer of the delay FIFO 940 is loaded into the last layer of the delay FIFO 940 and output to the first byte-position in the 4-byte output register 980; the second byte (i.e., b(1,0)) from the second layer of the delay FIFO 940 is loaded into the first byte-position in the last layer of the release FIFO 950; the third byte (i.e., b(2,1)) from the third byte-position in the first layer of the delay FIFO 940 is loaded into the first byte-position in the second layer of the release FIFO 950; the bytes (i.e., b(2,0) and b(3,0)) of the second layer of the release FIFO 950 are loaded into the last two byte-positions of the last layer of the release FIFO 950; the first layer of the release FIFO 950 is loaded to the last byte-position in the second layer of the release FIFO 950; and the four bytes of the last column (i.e., b(0,3), b(1,3), b(2,3), and b(3,3)) of the data matrix 230 are loaded to the 4-byte input register 930 while the last byte (i.e., b(3,3)) is output to the 4-byte output register 980. Thus, by the end of encipher clock cycle 3, the first four bytes of the row-shifted data are output from the staggered FIFO as b(0,0), b(1,1), b(2,2), and b(3,3). Also, it is worthwhile to note that contents of the release FIFO 950 are buffered (i.e., unchanged) during encipher clock cycle 3.

In encipher clock cycle 4, as shown in FIG. 9F, the process repeats itself and the bytes from the second column of the data matrix 230 replace the bytes from the first column of the data matrix 230; the bytes from the third column of the data matrix 230 replace the bytes from the second column of the data matrix 230; and the bytes from the last column of the data matrix replace the bytes from the third column of the data matrix. Additionally, since no additional matrix elements (i.e., bytes) exist for the data matrix, no data is loaded to the 4-byte input register 930. Rather, the data currently loaded in the delay FIFO 940 and the release FIFO 950 are cascaded to the 4-byte output register 980. Thus, the output at the end of encipher clock cycle 4 are, sequentially, bytes b(0,1), b(1,2), b(2,3), and b(3,0).

Figure 9G:
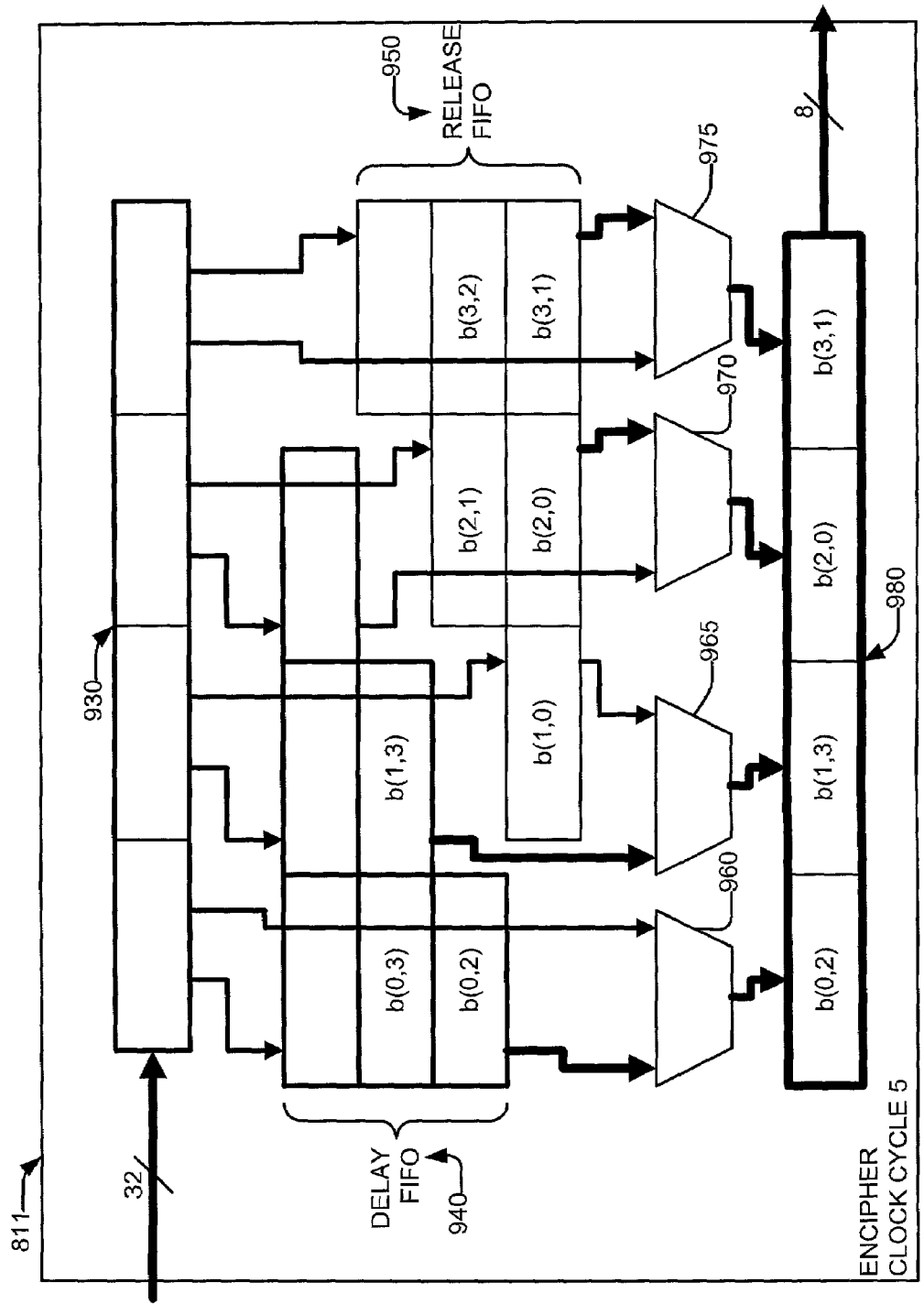

Similarly, as shown in FIG. 9G, the data bytes continue to cascade through the delay FIFO 940 and the release FIFO 950, in encipher clock cycle 5, to produce the sequential bytes b(0,2), b(1,3), b(2,0), and b(3,1).

Figure 9H:
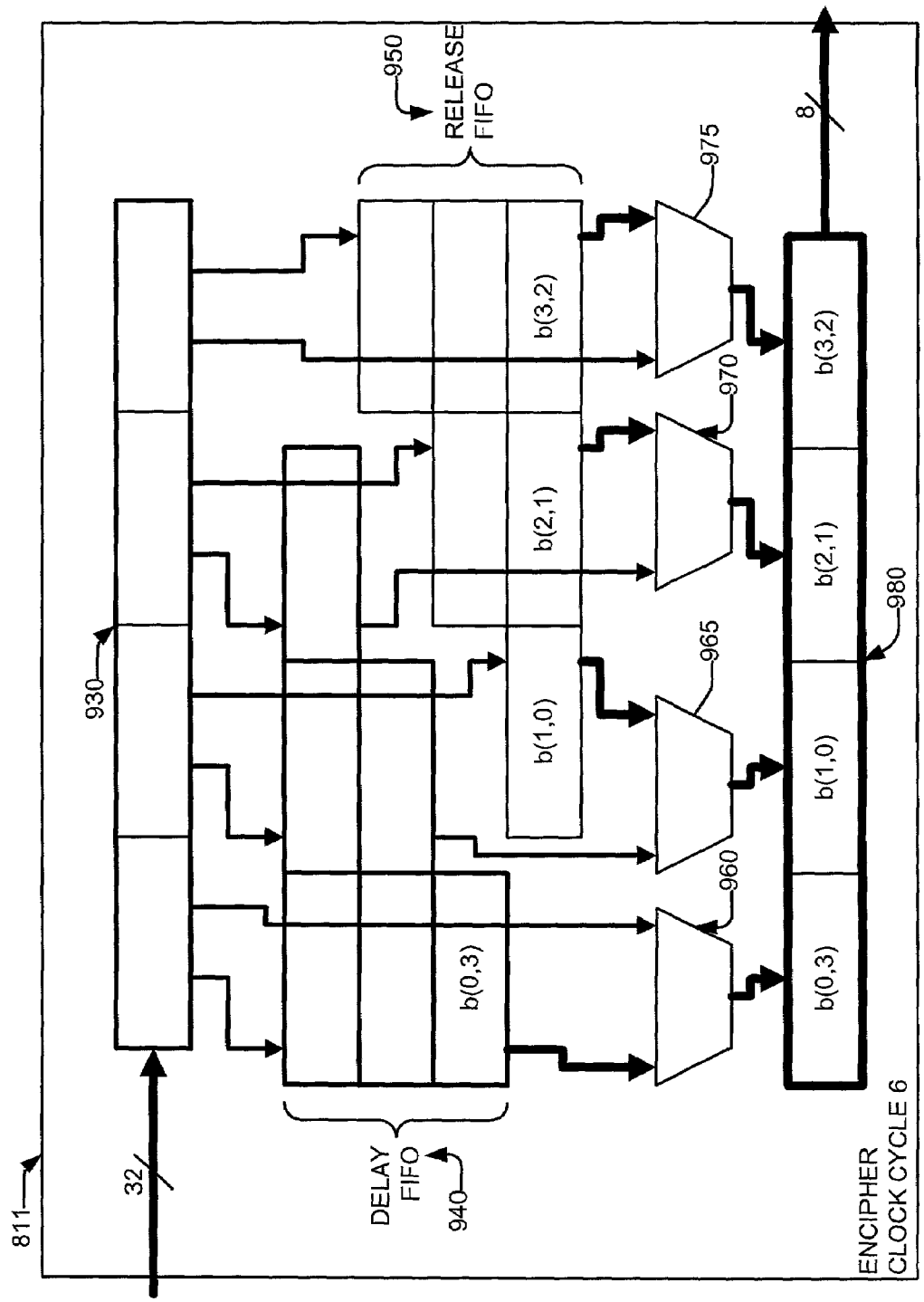
Figure 9I:
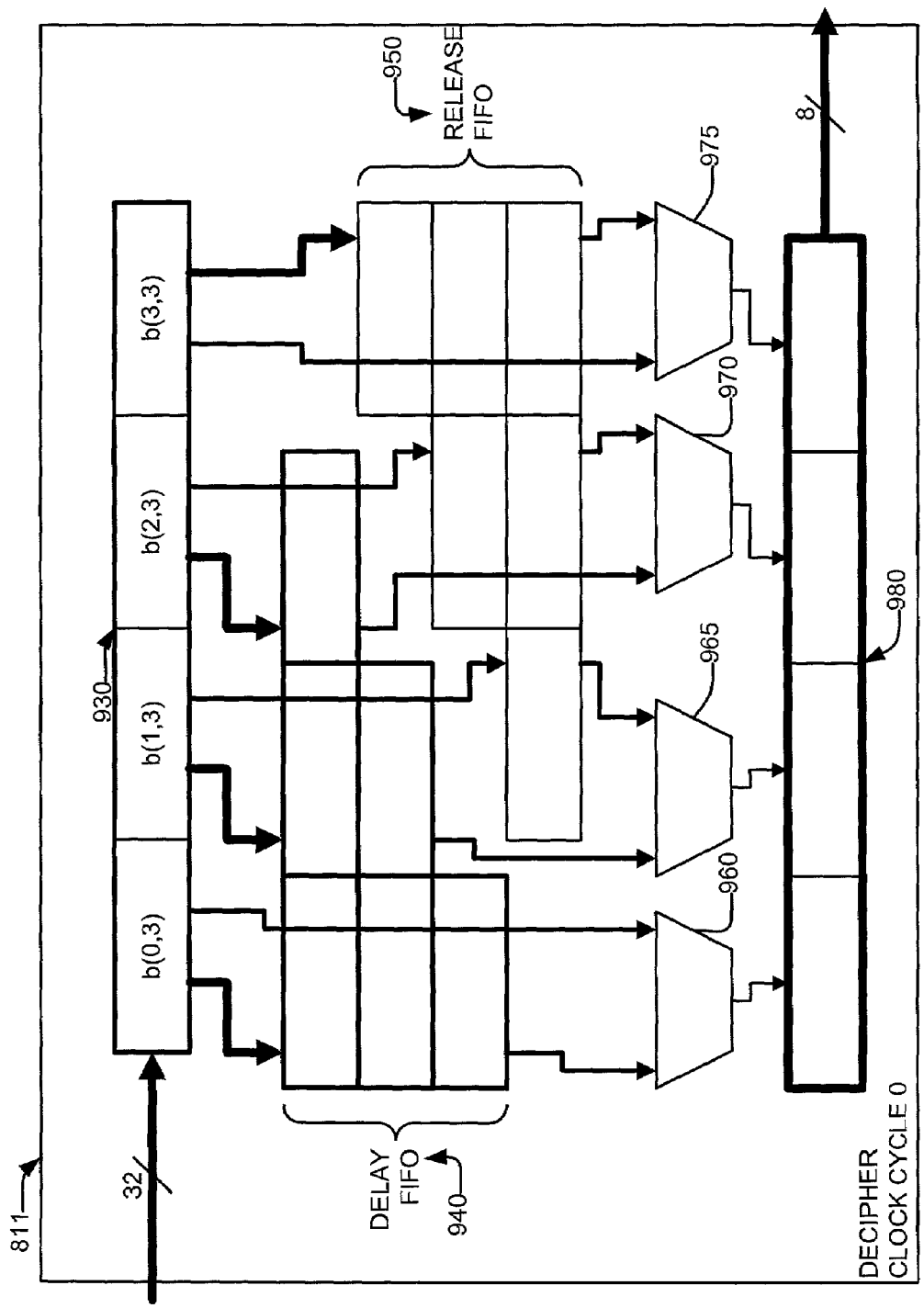
Figure 9J:
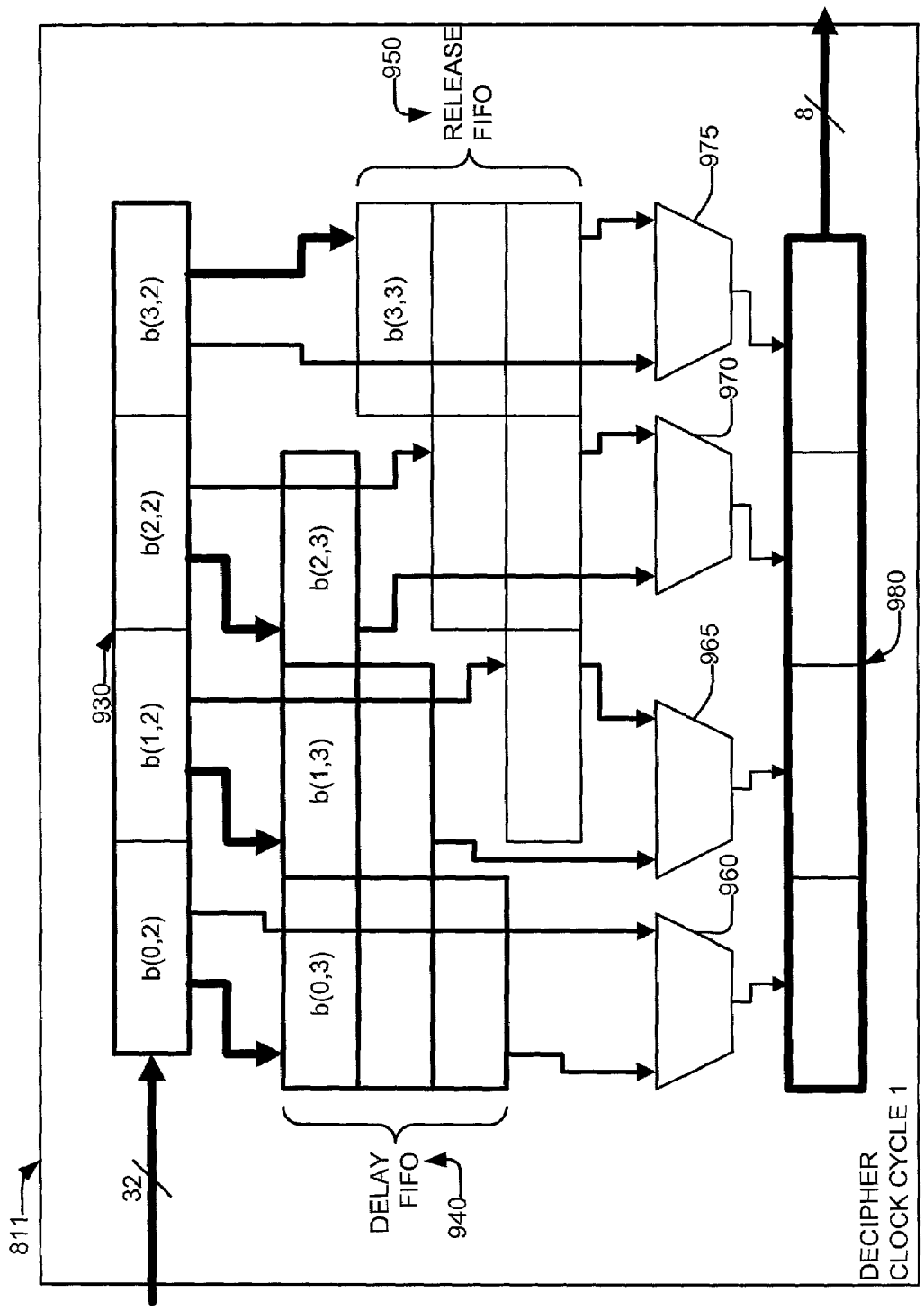
Figure 9K:
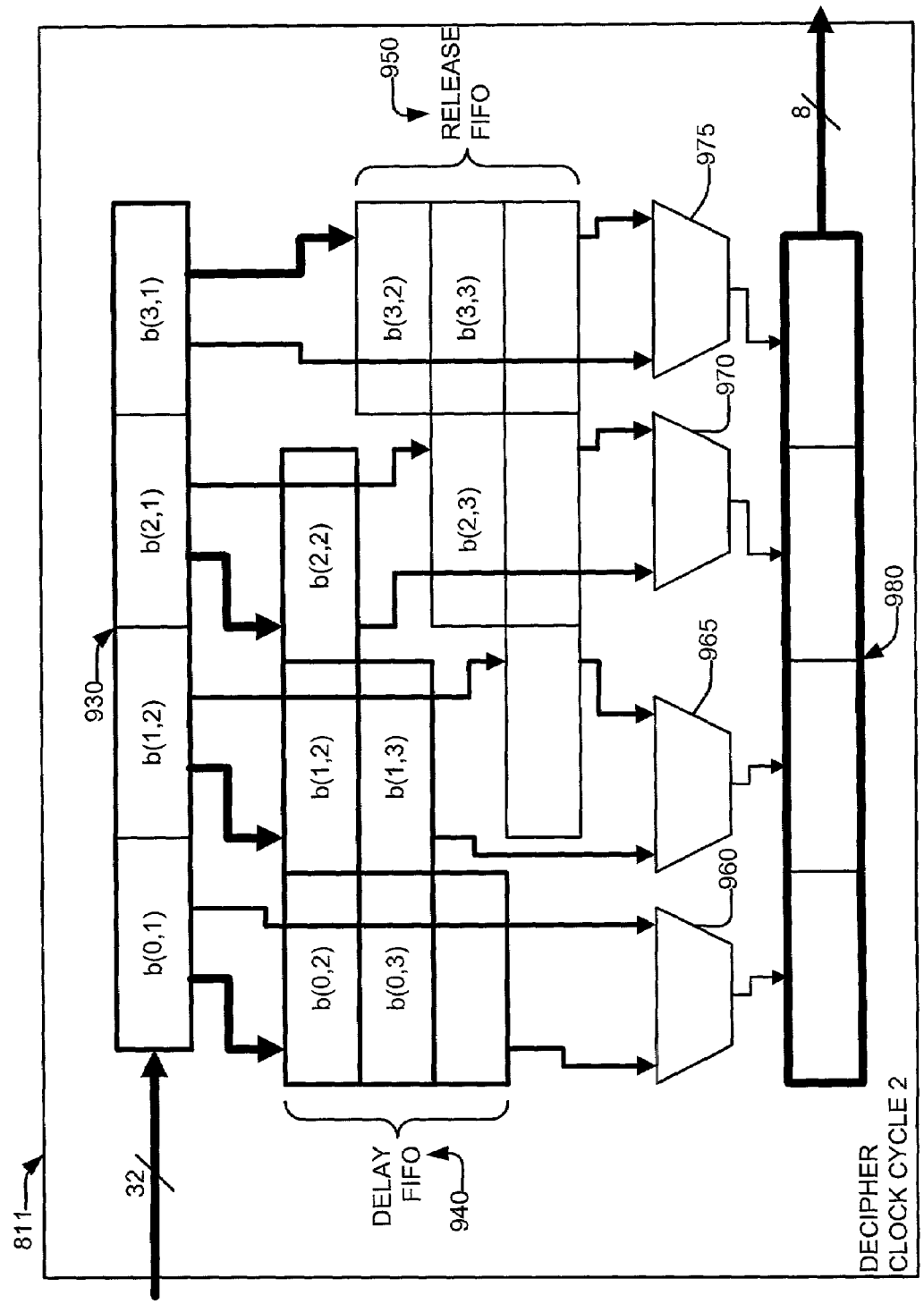
Figure 9L:
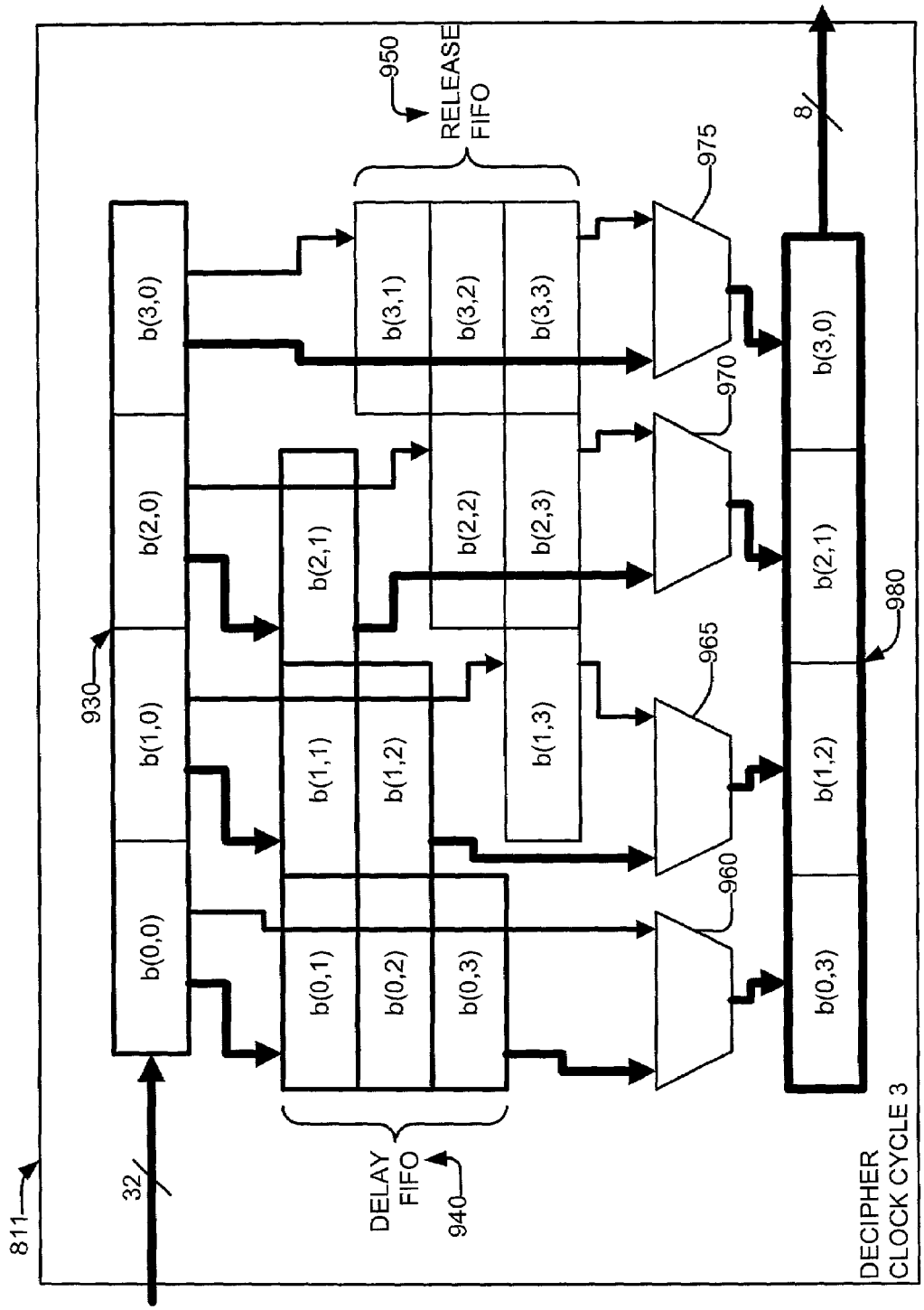
Figure 9M:
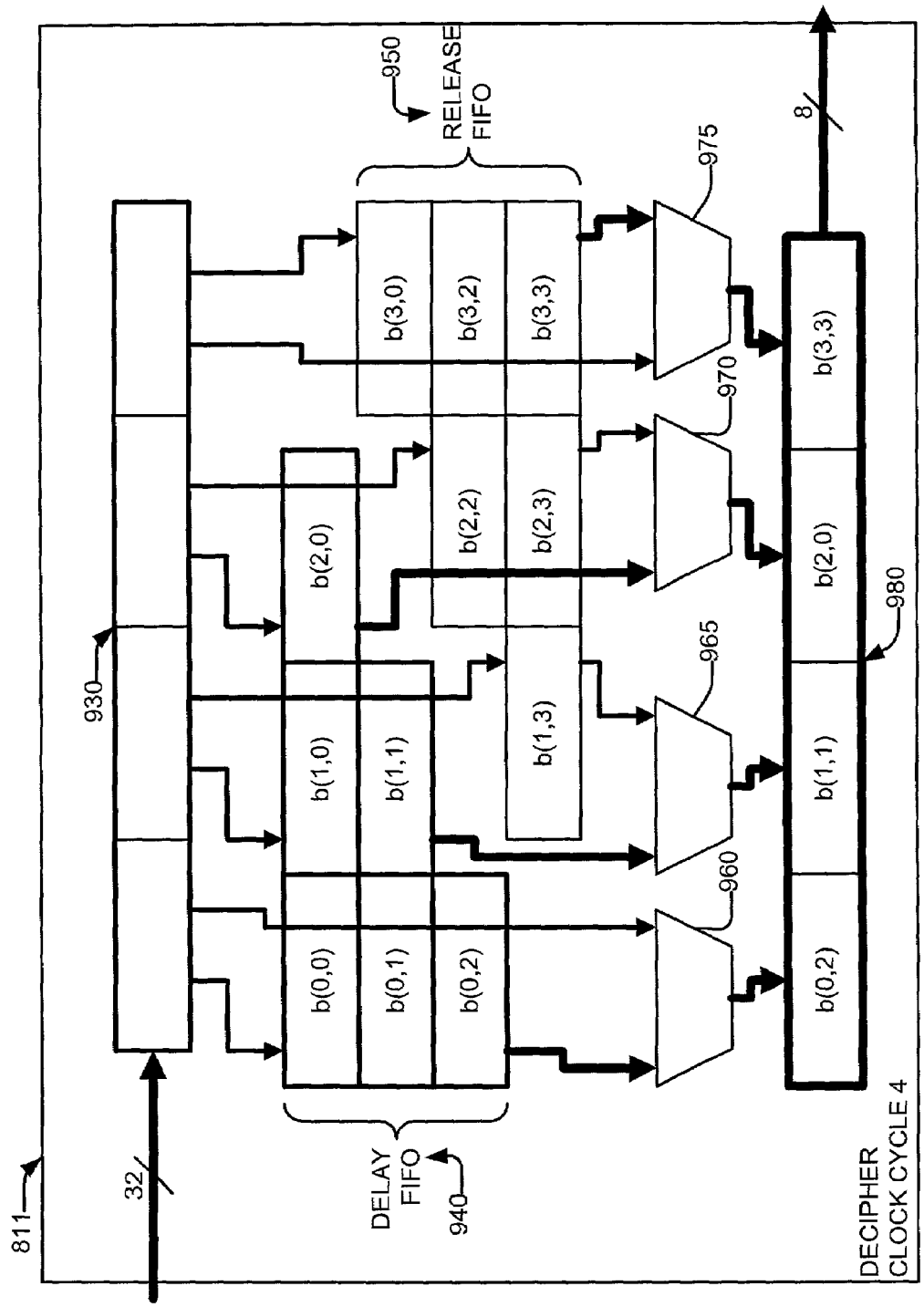
Figure 9N:
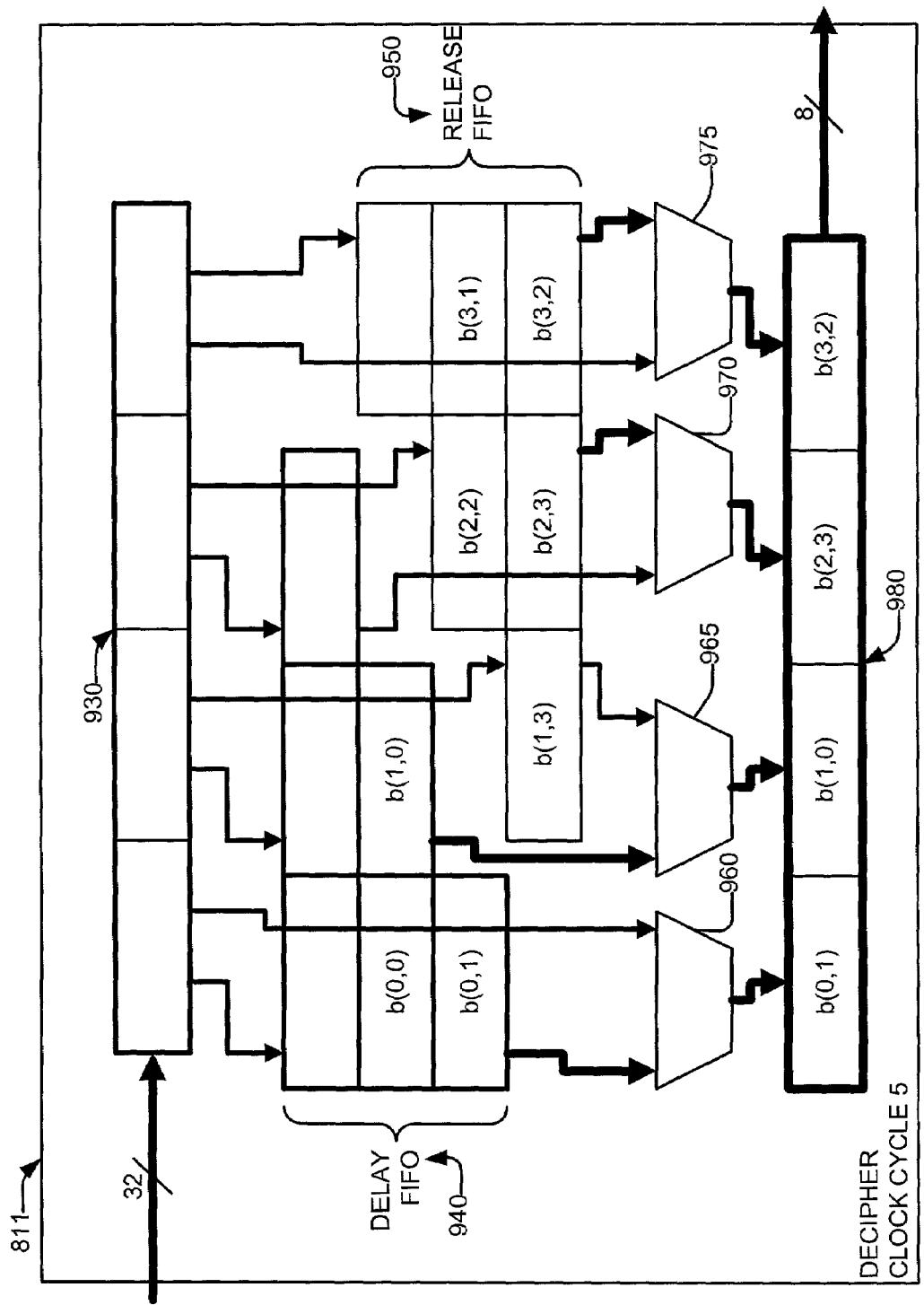
Figure 90:
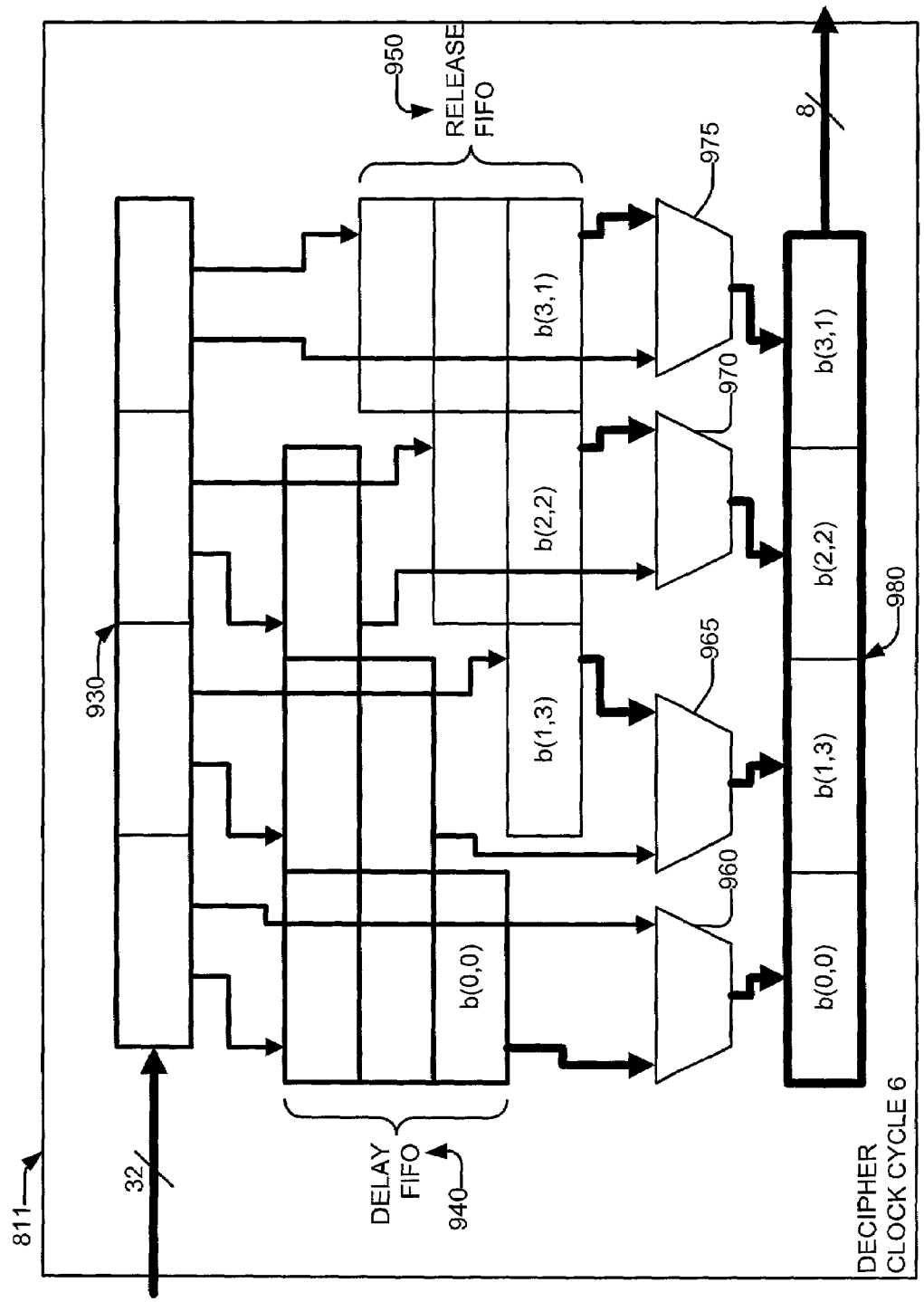

Finally, as shown in FIG. 9H, after encipher clock cycle 6, the last four bytes of the row-shifted data is output as b(0,3), b(1,0), b(2,1), and b(3,2). In this sense, the original data matrix 230 is row-shifted by the staggered FIFO 811 to produce a row-shifted data set 330.

FIGS. 9I through 9O are diagrams illustrating the ShiftRow step during deciphering. The ShiftRow step for deciphering, as shown in FIGS. 9I through 9O, is identical to the ShiftRow step for enciphering, as shown in FIGS. 9B through 9H, except for the fact that the data matrix 230 is sequentially input in order of last column, third column, second column, and then the first column. This is due to the functioning of the ALU 895 (FIG. 8A) during the deciphering process, which is unrelated to this invention. Since there is much similarity in the deciphering operation as there is in the enciphering operation, the details relating to FIGS. 9I through 9O are not discussed herein, and the reader is referred to FIGS. 9I through 9O to discern how the bytes are cascaded through the staggered FIFO 811 during deciphering. It is, however, worthwhile to note that by changing the input order of the byte-columns in the data matrix 230, it is possible to either "left-shift" or "right-shift" the rows of data, depending on the desired application.

Figure 10:
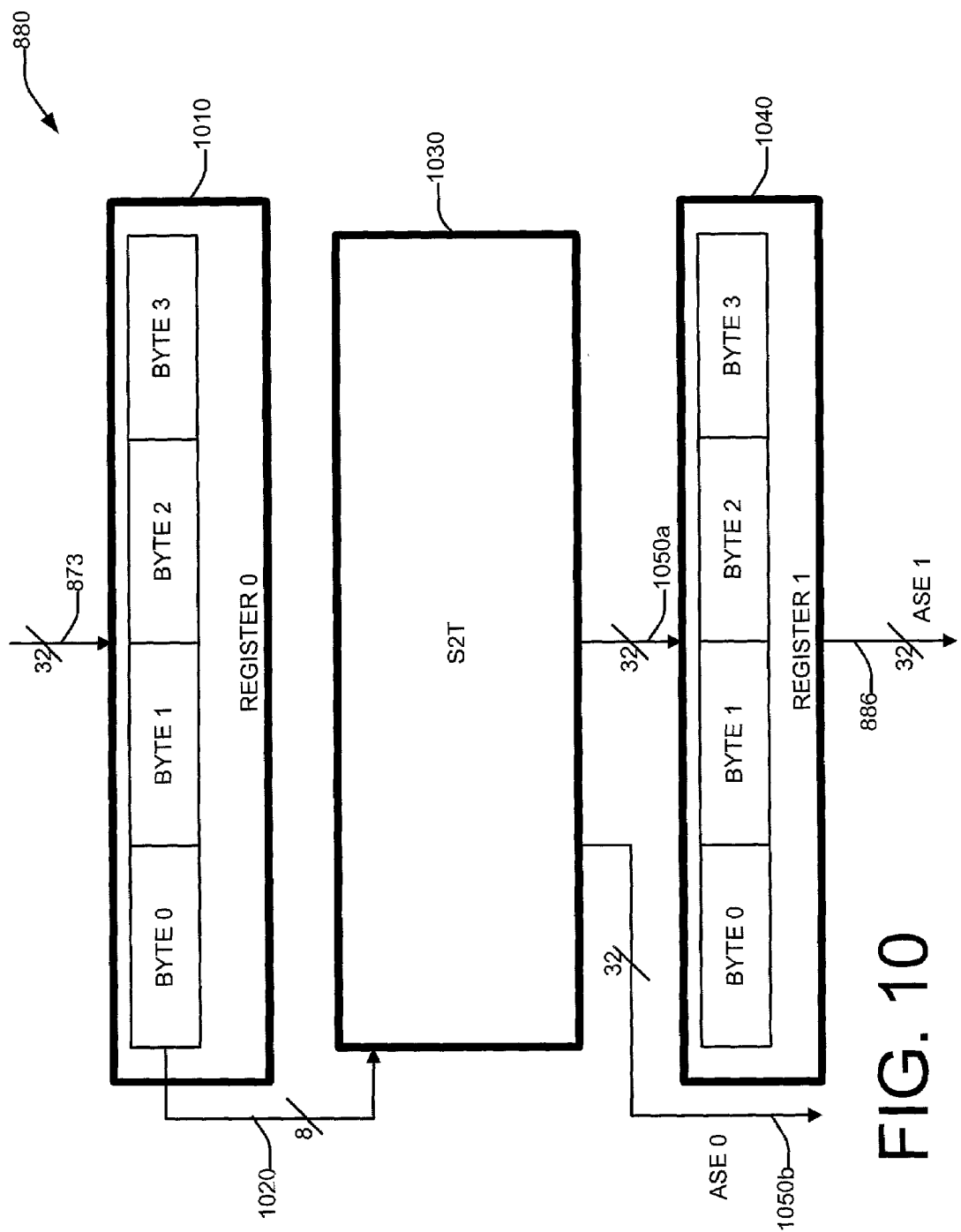
FIG. 10 shows the S-box expansion unit of FIG. 8A in greater detail.

FIG. 10 shows the S-box expansion unit, S2T_XPAN 880, of FIG. 8A in greater detail. S2T_XPAN 880 comprises a first register (hereinafter also referred to as register 0) 1010, a second register (hereinafter also referred to as register 1) 1040, and a logic block (hereinafter also referred to as S2T) 1030 configured to perform byte expansion according to AES specifications. As described in the AES proposal, each enciphering and deciphering round comprises a round transformation, and each round transformation requires up to four T-tables. For enciphering, the T-tables are:

$$T_0[a] = \begin{bmatrix} s[a] \cdot 02 \\ S[a] \\ S[a] \\ s[a] \cdot 03 \end{bmatrix};$$ [Eq. 1]

$$T_1[a] = \begin{bmatrix} S[a] \cdot 03 \\ S[a] \cdot 02 \\ S[a] \\ S[a] \end{bmatrix};$$ [Eq. 2]

$$T_2[a] = \begin{bmatrix} S[a] \\ S[a] \cdot 03 \\ S[a] \cdot 03 \\ S[a] \end{bmatrix}; \text{ and}$$ [Eq. 3]

$$T_3[a] = \begin{bmatrix} S[a] \\ S[a] \\ S[a] \cdot 03 \\ S[a] \cdot 02 \end{bmatrix},$$ [Eq. 4]

wherein $T_i[a]$ represents the T-table, $S[a]$ represents the S-box, and "·" represents a polynomial multiplication operation as described in the AES proposal. Similarly, for deciphering, the inverse-T-tables are:

$$T_0^{-1}[a] = \begin{bmatrix} S[a] \cdot 0B \\ S[a] \cdot 0D \\ S[a] \cdot 09 \\ S[a] \cdot 0E \end{bmatrix};$$ [Eq. 5]

$$T_1^{-1}[a] = \begin{bmatrix} S[a] \cdot 0E \\ S[a] \cdot 0B \\ S[a] \cdot 0D \\ S[a] \cdot 09 \end{bmatrix};$$ [Eq. 6]

$$T_2^{-1}[a] = \begin{bmatrix} S[a] \cdot 09 \\ S[a] \cdot 0E \\ S[a] \cdot 0B \\ S[a] \cdot 0D \end{bmatrix}; \text{ and}$$ [Eq. 7]

$$T_3^{-1}[a] = \begin{bmatrix} S[a] \cdot 0D \\ S[a] \cdot 09 \\ S[a] \cdot 0E \\ S[a] \cdot 0B \end{bmatrix}.$$ [Eq. 8]

Thus, it is possible that, in a very cumbersome system, a total of up to eight tables (i.e., four for enciphering and four for deciphering) may exist in memory. Since each table occupies 1 kb of memory, the eight tables may occupy up to 8 kb of memory. However, as shown in Eqs. 1 through 8, each T-table and inverse-T-table may be represented as a function of the previous T-table and inverse-T-table, respectively, according to:

$$T_i[a]=RotByte(T_{i-1}[a])$$ [Eq. 9];

and $$T_i^{-1}[a]=RotByte(T_{i-1}^{-1}[a])$$ [Eq. 10].

Thus, it is possible to further reduce the memory requirement to a single T-table (or inverse-T-table) for each round transformation, and derive the subsequent T-tables (or inverse-T-tables) from the first T-table (or inverse-T-table). Additionally, since the respective functions within the T-table (or inverse-T-table) is defined as:

$$S[X] \cdot 02 = $$ [Eq. 11]
$$((S_7 X^7 \otimes S_6 X^6 \otimes S_5 X^5 \otimes S_4 X^4 \otimes S_3 X^3 \otimes $$
$$S_2 X^2 \otimes S_1 X^1 \otimes S_0 \cdot X) \cdot) modulo\ m(x) = $$
$$S_6 X^7 \otimes $$
$$S_5 X^6 \otimes $$
$$S_4 X^5 \otimes $$
$$(S_7 \otimes S_3) X^4 \otimes $$
$$(S_7 \otimes S_2) X^3 \otimes $$
$$(S_7 \otimes S_1) X^2 \otimes $$
$$(S_7 \otimes S_0) X^1 \otimes $$
$$S^7;$$

$$S[X] \cdot 03 $$ [Eq. 12]
$$= S[X] \otimes S[X] \cdot 02 = $$
$$(S_7 \otimes S_6) X^7 \otimes $$
$$(S_6 \otimes S_5) X^6 \otimes $$
$$(S_5 \otimes S_4) X^5 \otimes $$
$$(S_4 \otimes S_7 \otimes S_3) X^4 \otimes $$
$$(S_3 \otimes S_7 \otimes S_2) X^3 \otimes $$
$$(S_2 \otimes S_7 \otimes S_1) X^2 \otimes $$
$$(S_1 \otimes S_7 \otimes S_0)) X \otimes $$
$$(S_7 \otimes S0);$$

-continued $$S[X] \cdot 0B = \quad [Eq.\ 13]$$
$$(S_4 \otimes S_6 \otimes S_7)X^7 \otimes$$
$$(S_3 \otimes S_5 \otimes S_6 \otimes S_7)X^6 \otimes$$
$$(S_2 \otimes S_4 \otimes S_5 \otimes S_6 \otimes S_7)X^5 \otimes$$
$$(S_1 \otimes S_3 \otimes S_4 \otimes S_5 \otimes S_6)X^4 \otimes$$
$$(S_0 \otimes S_2 \otimes S_3 \otimes S_5)X^3 \otimes$$
$$(S_6 \otimes S_1 \otimes S_2)X^2 \otimes$$
$$(S_6 \otimes S_5 \otimes S_7 \otimes S_0 \otimes S_1)X$$
$$(S_0 \otimes S_5 \otimes S_7);$$

$$S[X] \cdot 0D = \quad [Eq.\ 14]$$
$$(S_4 \otimes S_5 \otimes S_7)X^7 \otimes$$
$$(S_3 \otimes S_4 \otimes S_6 \otimes S_7)X^6 \otimes$$
$$(S_2 \otimes S_3 \otimes S_5 \otimes S_6)X^5 \otimes$$
$$(S_1 \otimes S_2 \otimes S_4 \otimes S_5)X^4 \otimes$$
$$(S_0 \otimes S_1 \otimes S_3 \otimes S_5 \otimes S_6)X^3 \otimes$$
$$(S_6 \otimes S_0 \otimes S_2)X^2 \otimes$$
$$(S_1 \otimes S_5 \otimes S_7)X$$
$$(S_0 \otimes S_5 \otimes S_6);$$

$$S[X] \cdot 09 = \quad [Eq.\ 15]$$
$$(S_4 \otimes S_7)X^7 \otimes$$
$$(S_3 \otimes S_6 \otimes S_7)X^6 \otimes$$
$$(S_2 \otimes S_5 \otimes S_6 \otimes S_7)X^5 \otimes$$
$$(S_1 \otimes S_4 \otimes S_5 \otimes S_6 \otimes S_7)X^4 \otimes$$
$$(S_0 \otimes S_7 \otimes S_3 \otimes S_5)X^3 \otimes$$
$$(S_6 \otimes S_7 \otimes S_2)X^2 \otimes$$
$$(S_6 \otimes S_5 \otimes S_1)X$$
$$(S_0 \otimes S_5); \text{ and}$$

$$S[X] \cdot 0E = \quad [Eq.\ 16]$$
$$(S_4 \otimes S_5 \otimes S_6)X^7 \otimes$$
$$(S_3 \otimes S_4 \otimes S_5 \otimes S_7)X^6 \otimes$$
$$(S_2 \otimes S_3 \otimes S_4 \otimes S_6)X^5 \otimes$$
$$(S_1 \otimes S_2 \otimes S_3 \otimes S_5 \otimes S_7)X^4 \otimes$$
$$(S_0 \otimes S_1 \otimes S_2 \otimes S_5 \otimes S_6 \otimes S_7)X^3 \otimes$$
$$(S_0 \otimes S_1 \otimes S_6 \otimes S_7)X^2 \otimes$$
$$(S_0 \otimes S_5)X$$
$$(S_5 \otimes S_6 \otimes S_7),$$

wherein the primitive polynomial m(x) is given as $X^8 \otimes X^4 \otimes X^3 \otimes X \otimes 1$, and "$\otimes$" denotes the logical exclusive-OR (XOR) function.

Since the T-tables (and inverse-T-tables) may be defined using the S-box, the system may be configured to store only the S-box, which is 256 bytes, rather than a plurality of T-tables, or even one T-table. Additionally, because the relationship of the S-box to the T-tables is known, according to Eqs. 11 through 16, the byte-expansion may be implemented using a plurality of XOR (exclusive OR) logic gates. Since the implementation of XOR gates to achieve Eqs. 11 through 16 are known in the art, further discussion of this procedure is omitted. However, it is noted here that by having a hardware S2T unit 1030, the cipher subprocessor 700, 1100, 1200 reduces the memory requirement by performing the T-table expansion "on the fly" for each byte of the S-box.

Figure 11A:
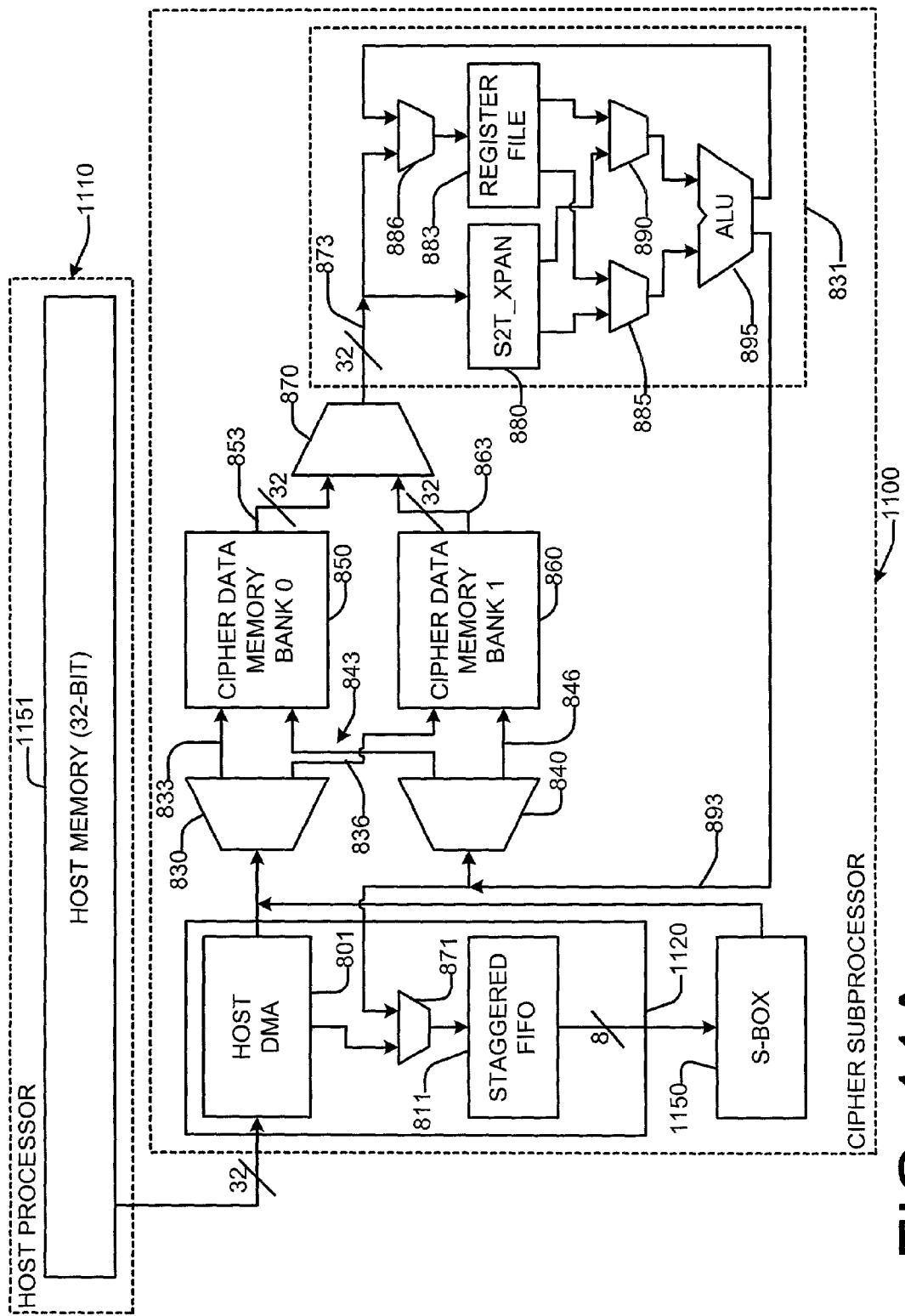
FIGS. 11B through 11H are diagrams showing the relevant components and data flow as the AES algorithm is executed in the cipher subprocessor of FIG. 11A.
Figure 12A:
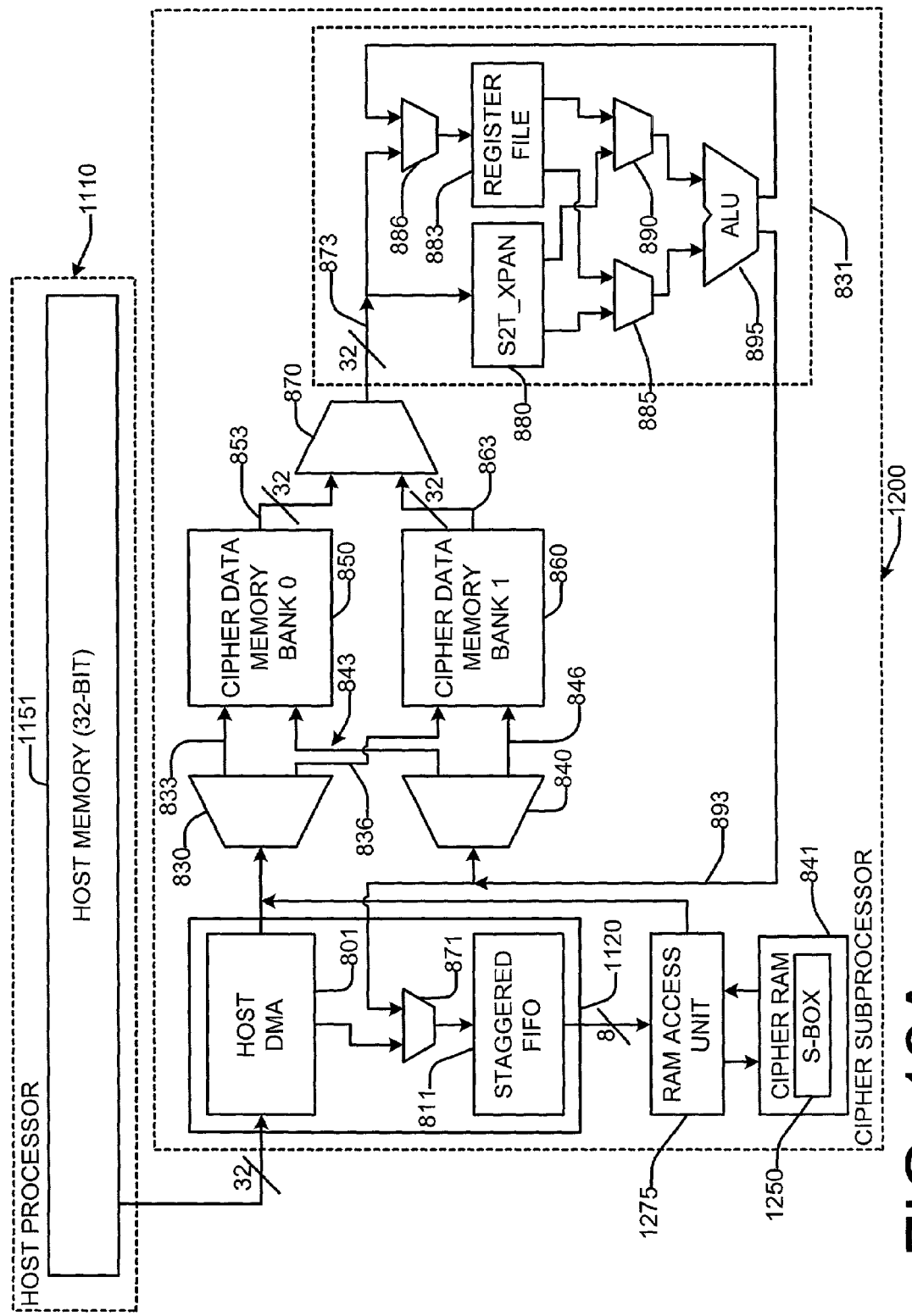
FIG. 12A is a diagram showing another embodiment of the system of the invention having an S-box located in a designated portion of memory in the cipher subprocessor of FIG. 7C.

In addition to the S2T unit 1030, the S2T_XPAN 880 comprises register 0 1010 and register 1 1040. Register 0 1010 is a 32-bit register that is configured as a byte-wise shifter. As such, register 0 1010 is configured to shift out one byte of the S-box to the S2T unit 1030, thereby allowing the S2T unit 1030 to expand the out-shifted byte from register 0 1010. Register 1 1040 is configured as a 32-bit register that buffers previous T-table values for retrieval and manipulation by the ALU 895 (FIG. 8A), 1195 (FIGS. 11A and 12A). Thus, the S2T_XPAN 880 reduces the memory requirement from approximately 8 kb (at worst) to only 256 bytes, which is the size of the S-box. This reduction in bandwidth further helps to prevent bottlenecking during memory access.

FIG. 11A is a diagram showing another embodiment of the system of the invention having a hardwired S-box 1150 within the cipher subprocessor 1100 of FIG. 7B. In the embodiment of FIG. 11A, the cipher subprocessor 1100 comprises a memory access unit 1120 having a host direct memory access (DMA) unit 801 and a staggered FIFO 811. Unlike the embodiment of FIG. 8A, the cipher subprocessor 1100 here does not have a cipher DMA in the memory access unit 1120. Since the detailed structure and operation of the staggered FIFO 811 have been discussed above with reference to FIGS. 9A through 9H, they will not be discussed here. It is, however, worthwhile to note again that the staggered FIFO 811 allows the cipher subprocessor 1100 to perform the ShiftRow step of the AES algorithm on a given data set as the data set is being loaded into memory. The cipher subprocessor 1100 further comprises a hardwired S-box 1150, a first multiplexer (MUX) 830, a first data memory bank (hereinafter also referred to as cipher data memory bank 0, or, simply, bank 0) 850, a second data memory bank (hereinafter also referred to as cipher data memory bank 1, or, simply, bank 1) 860, a second MUX 870, a set of processing circuitry 831, and a third MUX 840. Similar to the configuration of FIG. 8A, the processing circuitry 831 of the cipher subprocessor 1100 is configured to perform the ByteSub step, the ShiftRow step, the Mix-Column step, and the AddRoundKey step of the AES algorithm.

In the embodiment as shown in FIG. 11A, the hardwired S-box 1150 is configured to receive the row-shifted data from the memory access unit 1120, and send the data to the first MUX 830. Unlike FIG. 8A, since the S-box 1150 is hardwired into the cipher subprocessor 1100, the memory access unit 1120 does not access the host memory for S-box operations. Since all other aspects of the embodiment of FIG. 11A are the same as the configuration of FIG. 8A, no further description of the circuit components is discussed. Rather, attention is turned to FIGS. 11B through 11H, which show the operation of the cipher subprocessor 1100 as shown in FIG. 11A.

Figure 11B:
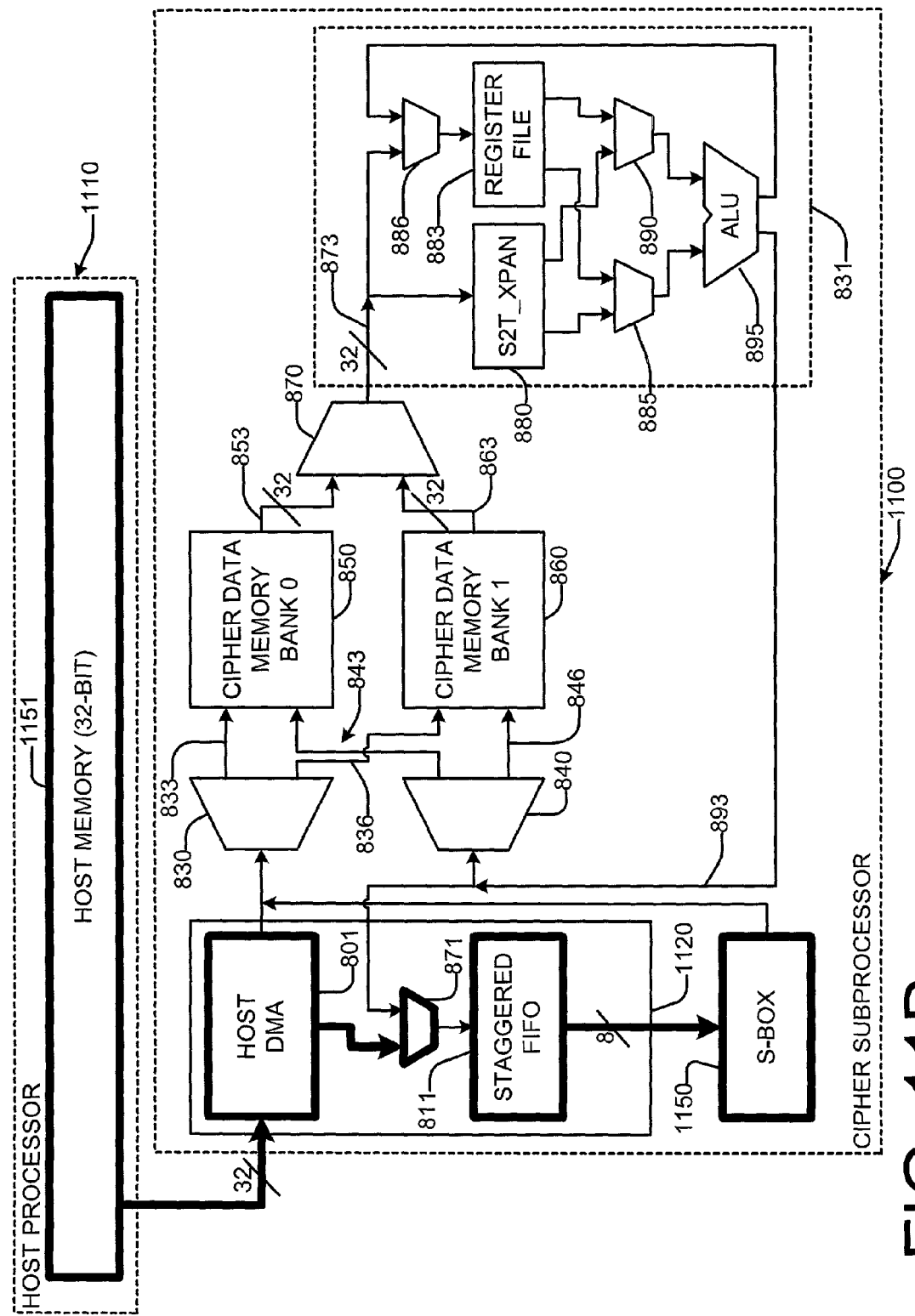
Figure 11C:
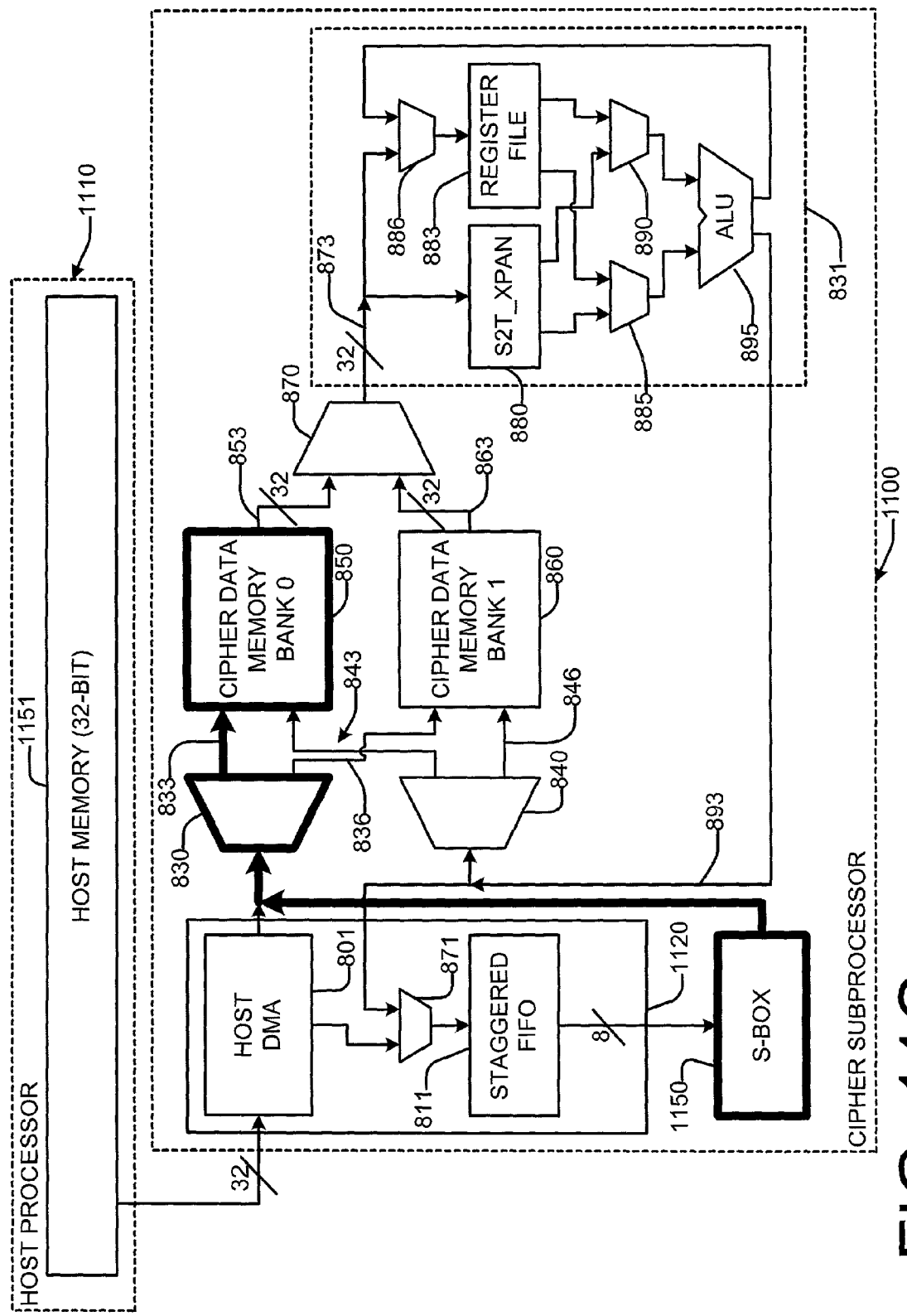
Figure 11D:
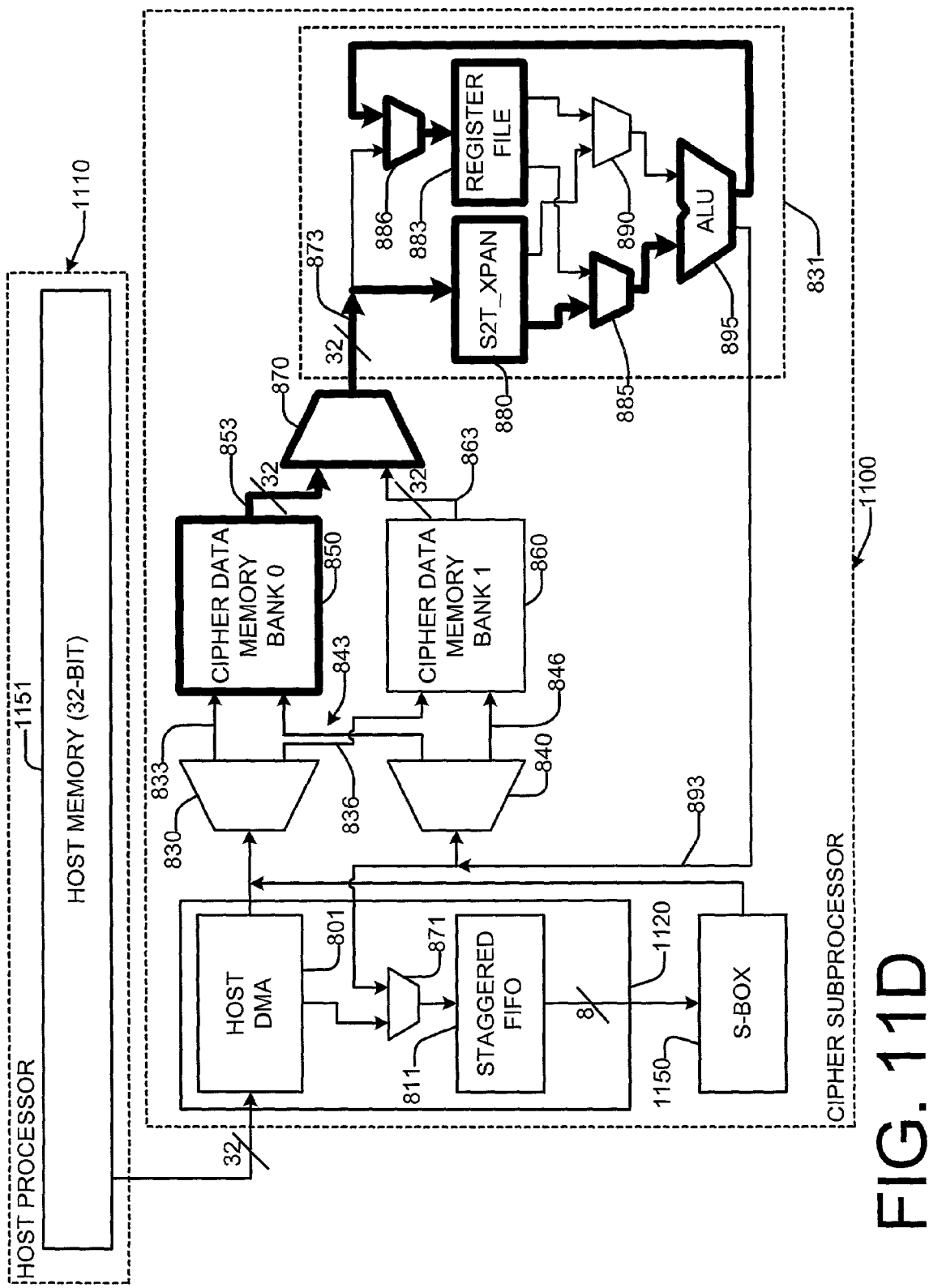
Figure 11E:
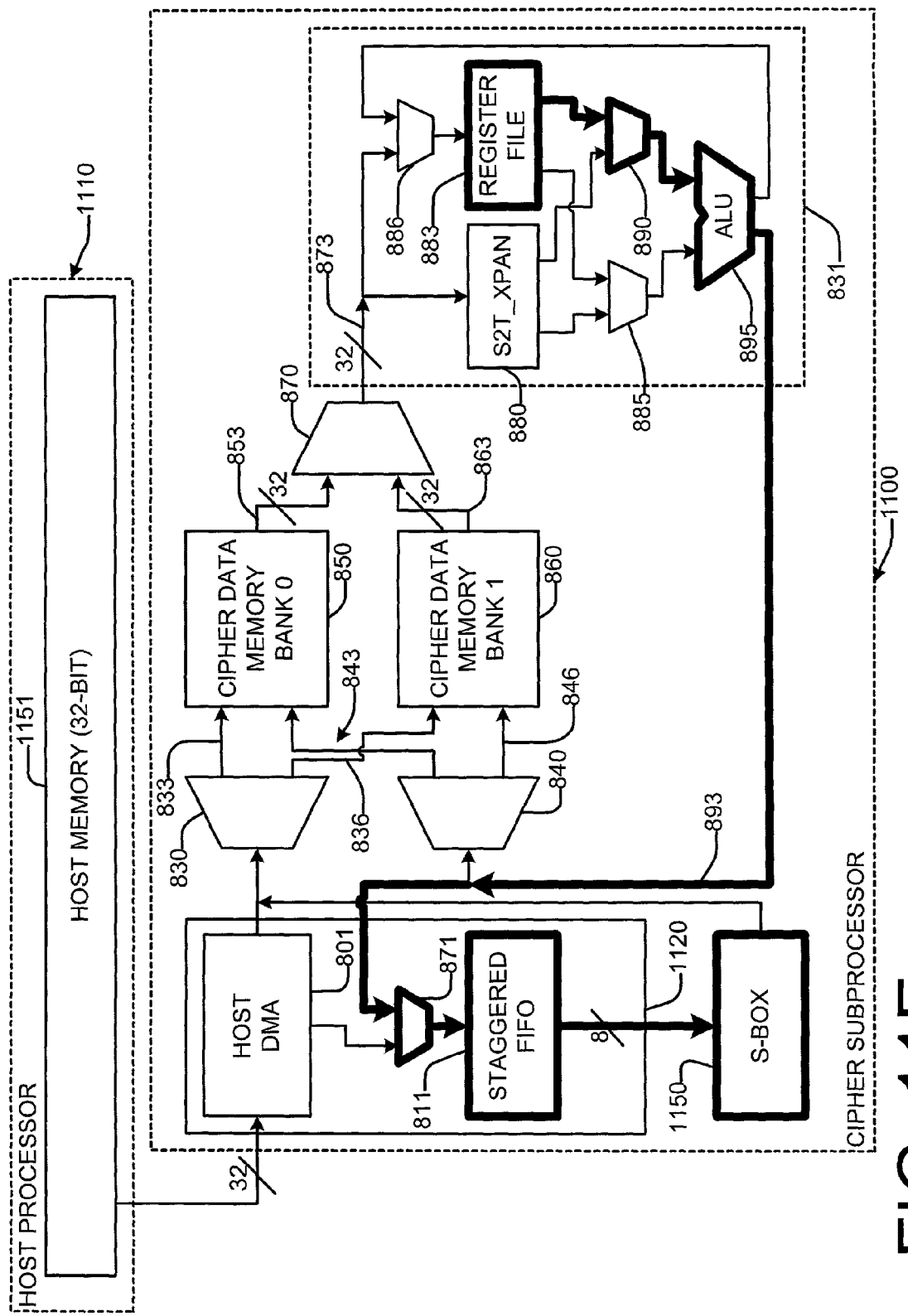
Figure 11F:
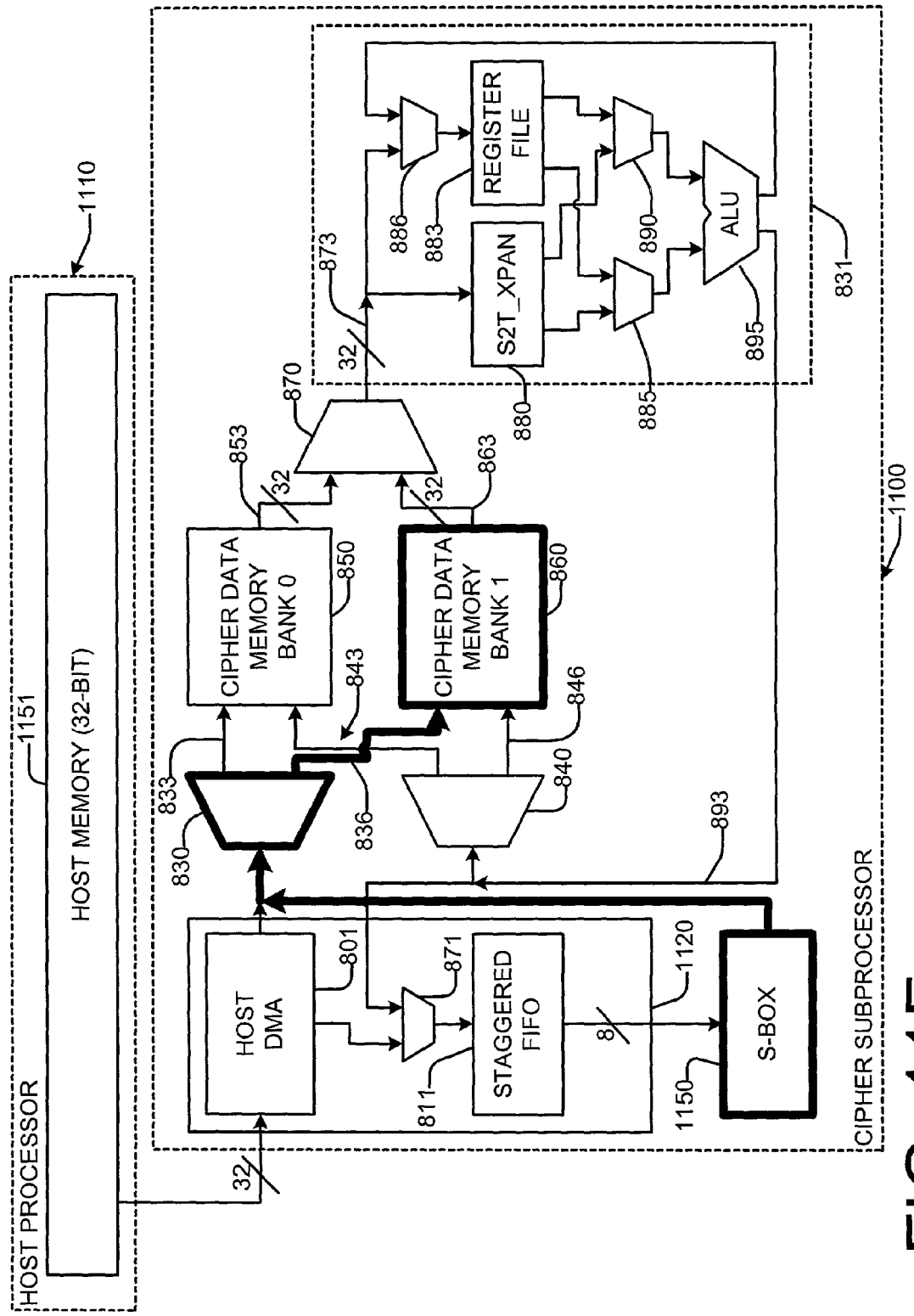
Figure 11G:
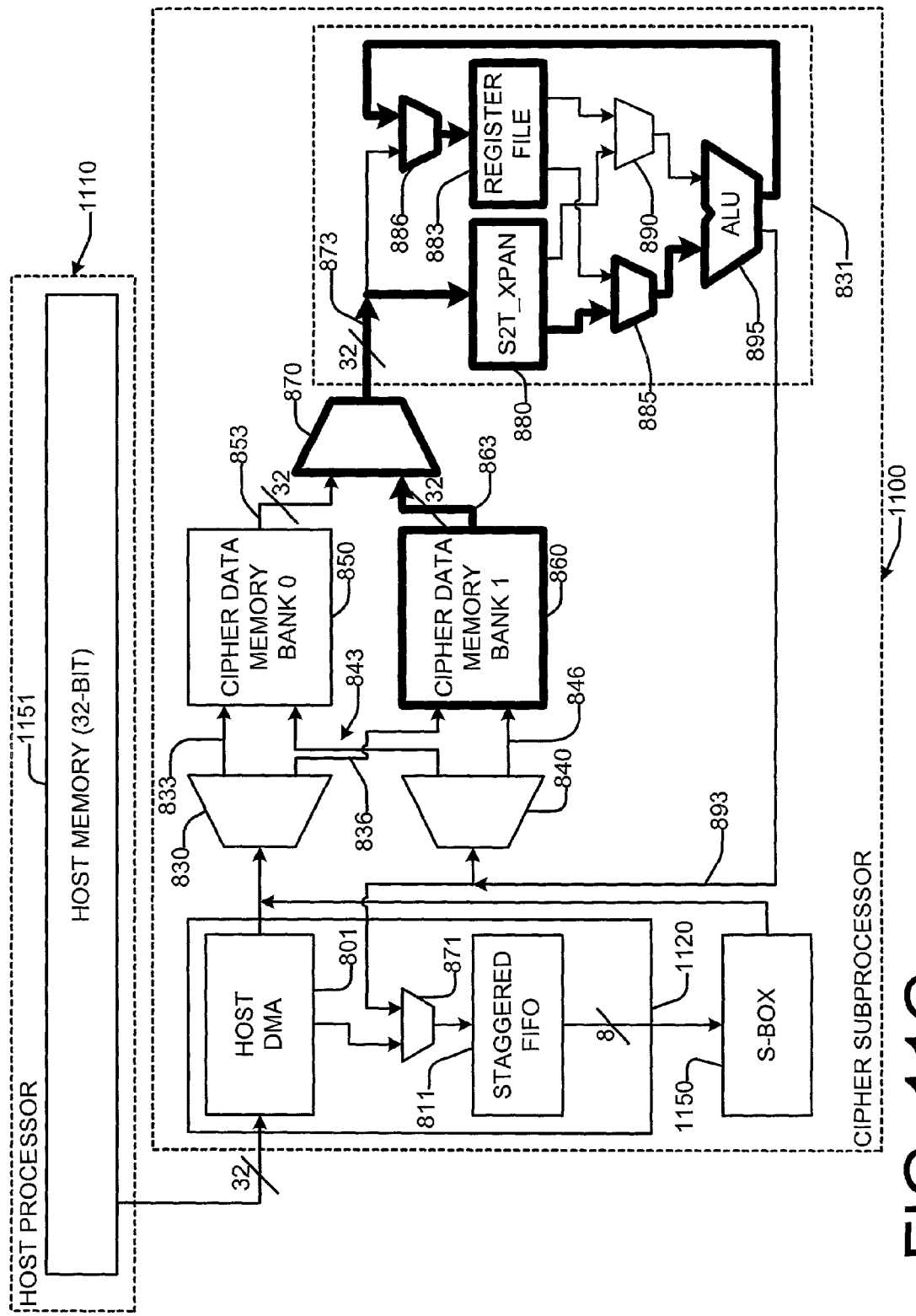
Figure 11H:
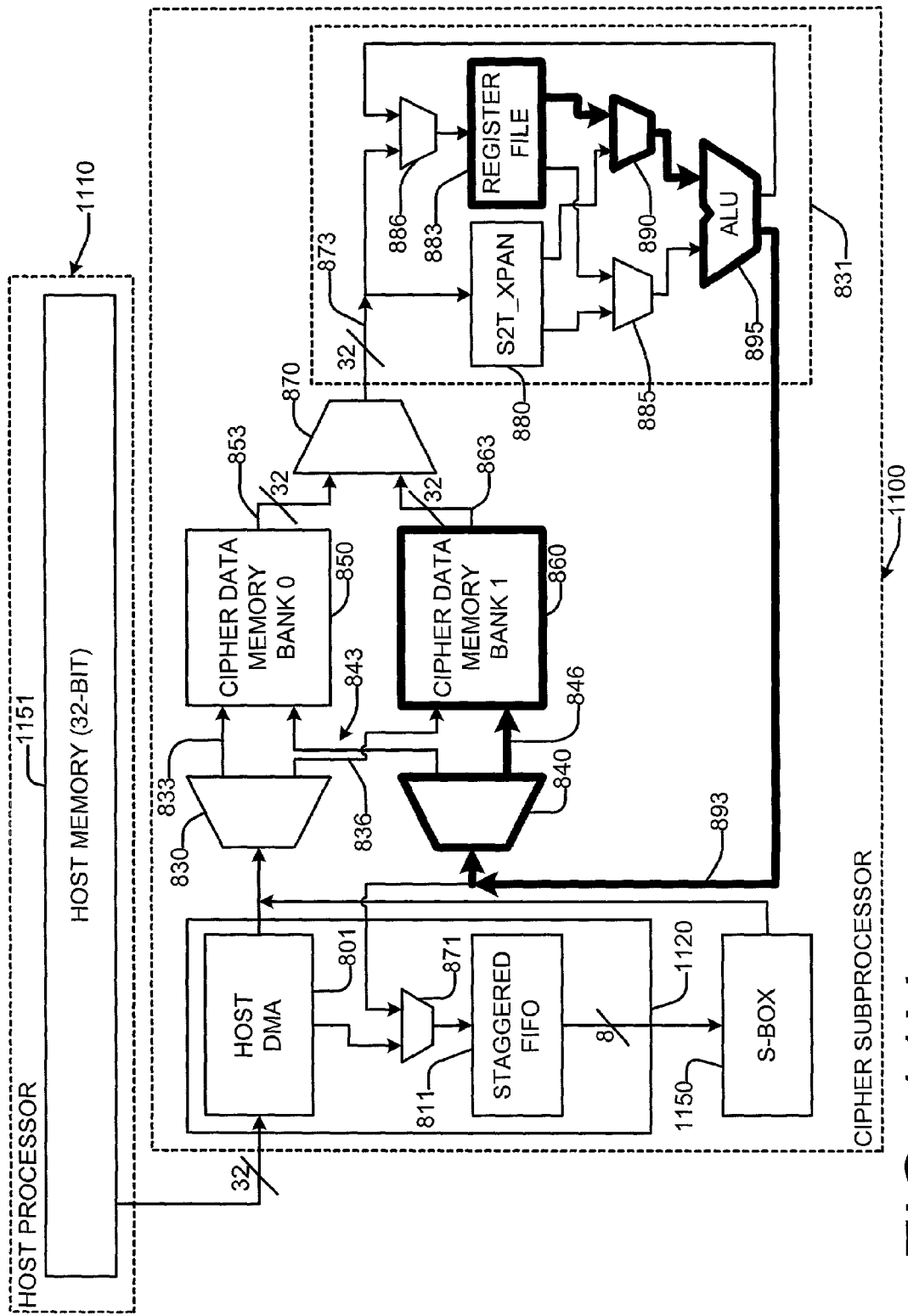

As shown in FIG. 11B, the host DMA 801 is configured to retrieve plain text from the host processor 1110. The retrieved plain text is cascaded through the staggered FIFO 811, which is configured to perform the ShiftRow step of the AES algorithm. Since details of the staggered FIFO 811 have been discussed in reference to FIGS. 9A through 9O, no further discussion of the staggered FIFO 811 is presented here. The row-shifted data is output on a byte-by-byte basis from the staggered FIFO 811, and each byte is sent directly to the hardwired S-box 1150, which is configured to perform the S-box lookup of the AES algorithm. Turning now to FIG. 11C, the S-box 1150, after performing the S-box lookup, then relays the data to the first MUX 830, which subsequently stores the row-shifted and byte-substituted data into a cipher data memory bank 850, 860 (specifically, bank 0 850 for the example of FIG. 11C). As shown in FIG. 11D, the stored data is then retrieved through the second MUX 870 by S2T_XPAN 880, which performs the T-table expansion as shown with reference to FIG. 10. This data is then relayed through MUX 885 to ALU 895 for execution of the MixColumn step and the AddRoundKey step of the AES algorithm, as shown in FIG. 11D. This resulting state data is then sent to the staggered FIFO 811, as shown in FIG. 11E. The staggered FIFO 811 performs the ShiftRow step of the AES algorithm and relays each row-shifted byte to the hardwired S-box 1150 for S-box lookup. This information is then relayed, as shown in FIG. 11F, by the S-box 1150 to one of the cipher data memory banks 850, 860 (specifically, bank 1 860 in the example of FIG. 11F). The byte-substituted and row-shifted data is then retrieved, as shown in FIG. 11G, through MUX 870 by S2T_XPAN 880, which performs the T-table expansion operation of the AES algorithm. The MixColumn step and the AddRoundKey step are completed on the resulting data by MUXs 885, 890, 886, the register file 883, and the ALU 895. The resulting state data is then stored in one of the cipher data memory banks (specifically, bank 1 for the example of FIG. 11H) for subsequent rounds of the AES algorithm. This process is repeated until the AES algorithm has been fully executed on the data set.

Again, similar to the example of FIGS. 8A through 8I, by having two memory banks 850, 860, the process described in FIGS. 11D through 11H for a given state data may take place concurrently with the process described in FIGS. 11B and 11C for a subsequent state data. In other words, while the subprocessor 1100 performs the MixColumn step and the AddRoundKey step on one set of data, the subprocessor 1100 may simultaneously perform the ByteSub step and the ShiftRow step on a subsequent set of data FIG. 12A is a diagram showing yet another embodiment of the system of the invention having an S-box 1250 located in a designated portion of memory 841 in the cipher subprocessor 1200 of FIG. 7C. In the embodiment of FIG. 12A, the cipher subprocessor 1200 comprises a memory access unit 1120 having a host direct memory access (DMA) unit 801 and a staggered FIFO 811. Since the detailed structure and operation of the staggered FIFO 811 have been discussed above with reference to FIGS. 9A through 9H, they will not be discussed here. It is, however, worthwhile to note again that the staggered FIFO 811 allows the cipher subprocessor 1200 to perform the ShiftRow step of the AES algorithm on a given data set as the data set is being loaded into memory. In addition to the memory access unit 1120, the cipher subprocessor 1200 further comprises a memory location 841 having the S-box 1250, and a RAM access unit 1275 configured to retrieve the S-box 1250 from the cipher subprocessor memory. In all other respects, the cipher subprocessor of FIG. 12A comprises the same hardware components as FIG. 8A. Thus, the hardware components will be further discussed with reference to FIGS. 12B through 12I, which show their operation.

Figure 12B:
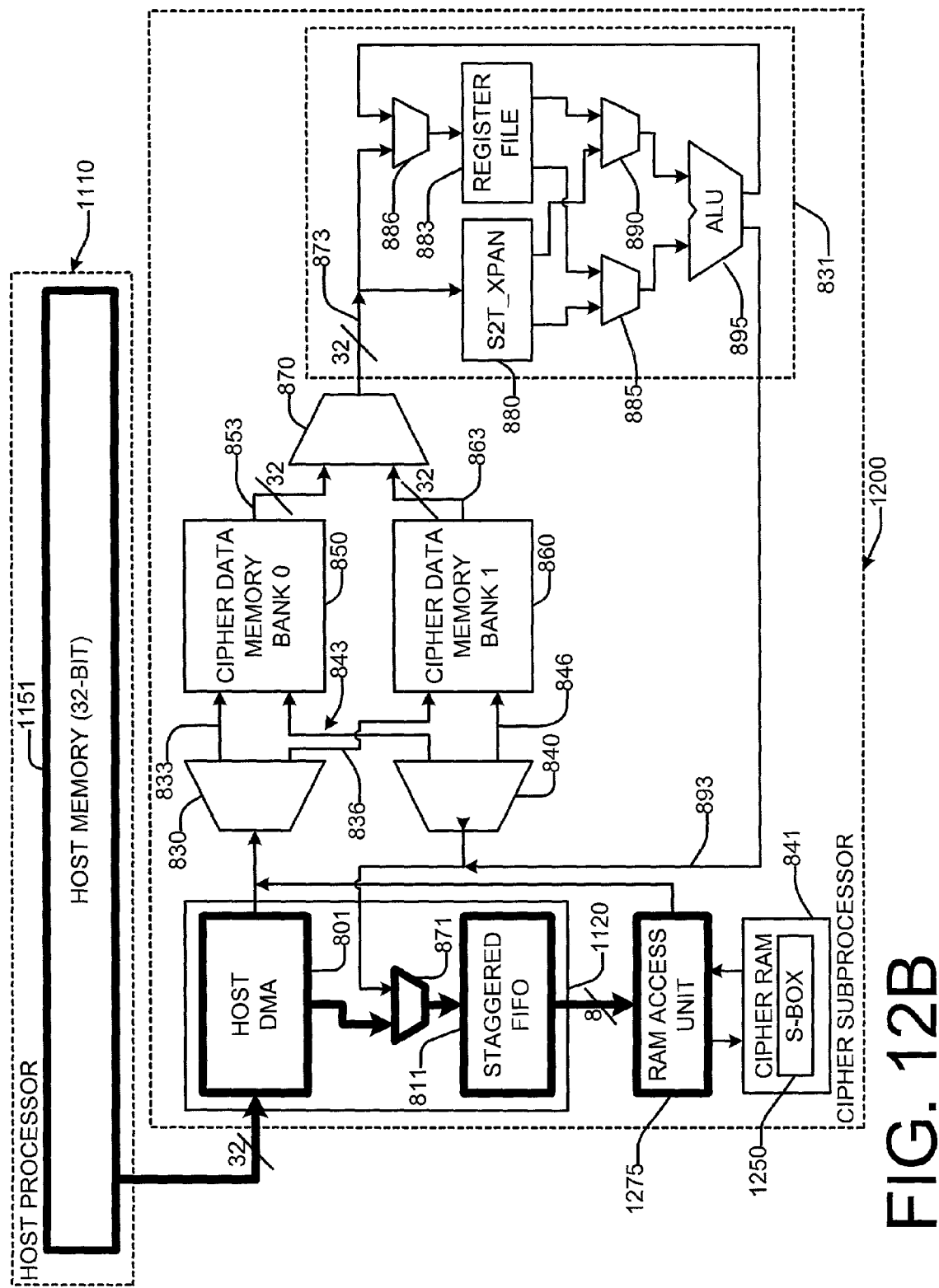
FIGS. 12B through 12I are diagrams showing the relevant components and data flow as the AES algorithm is executed in the cipher subprocessor of FIG. 12A.
Figure 12C:
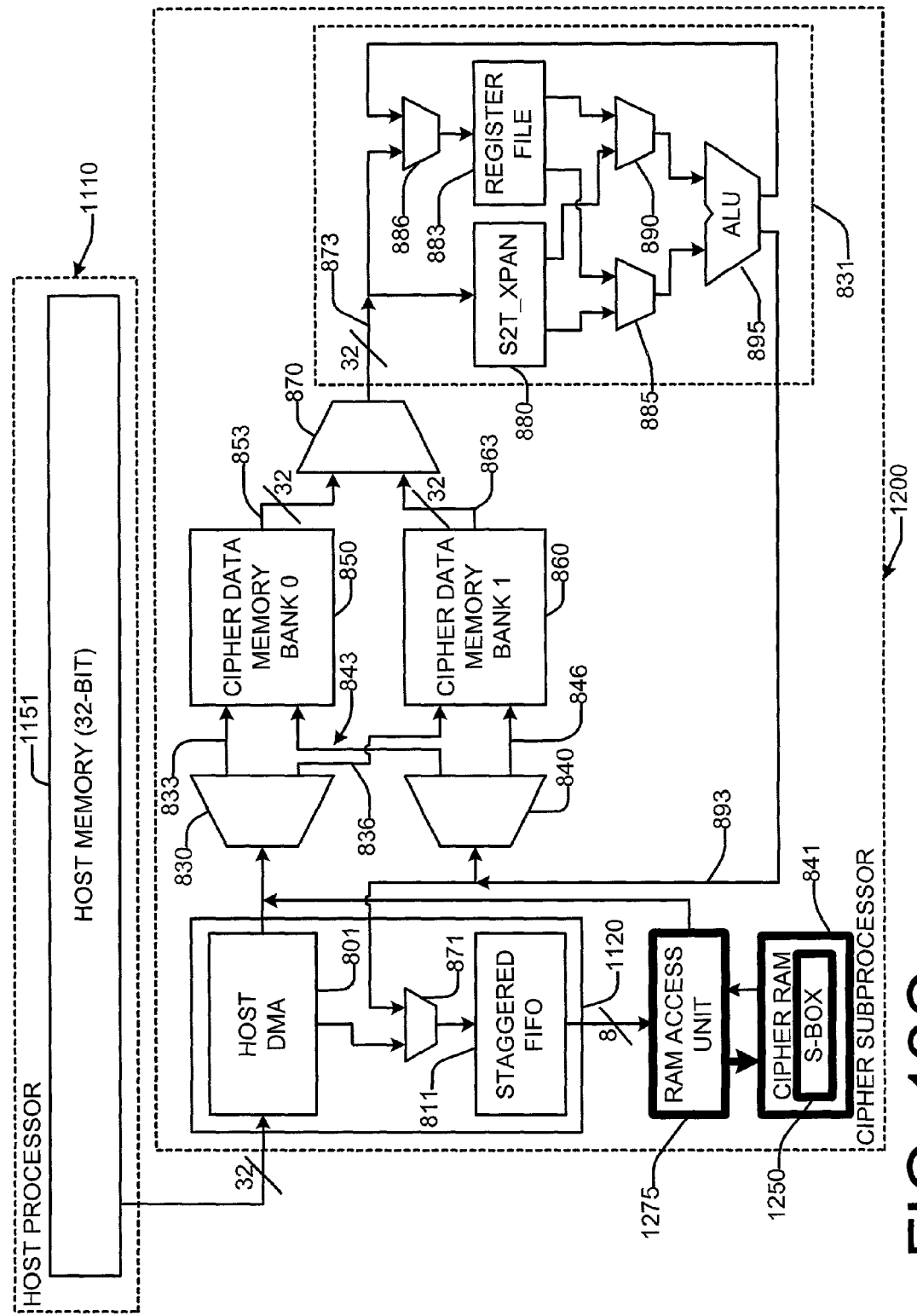
Figure 12D:
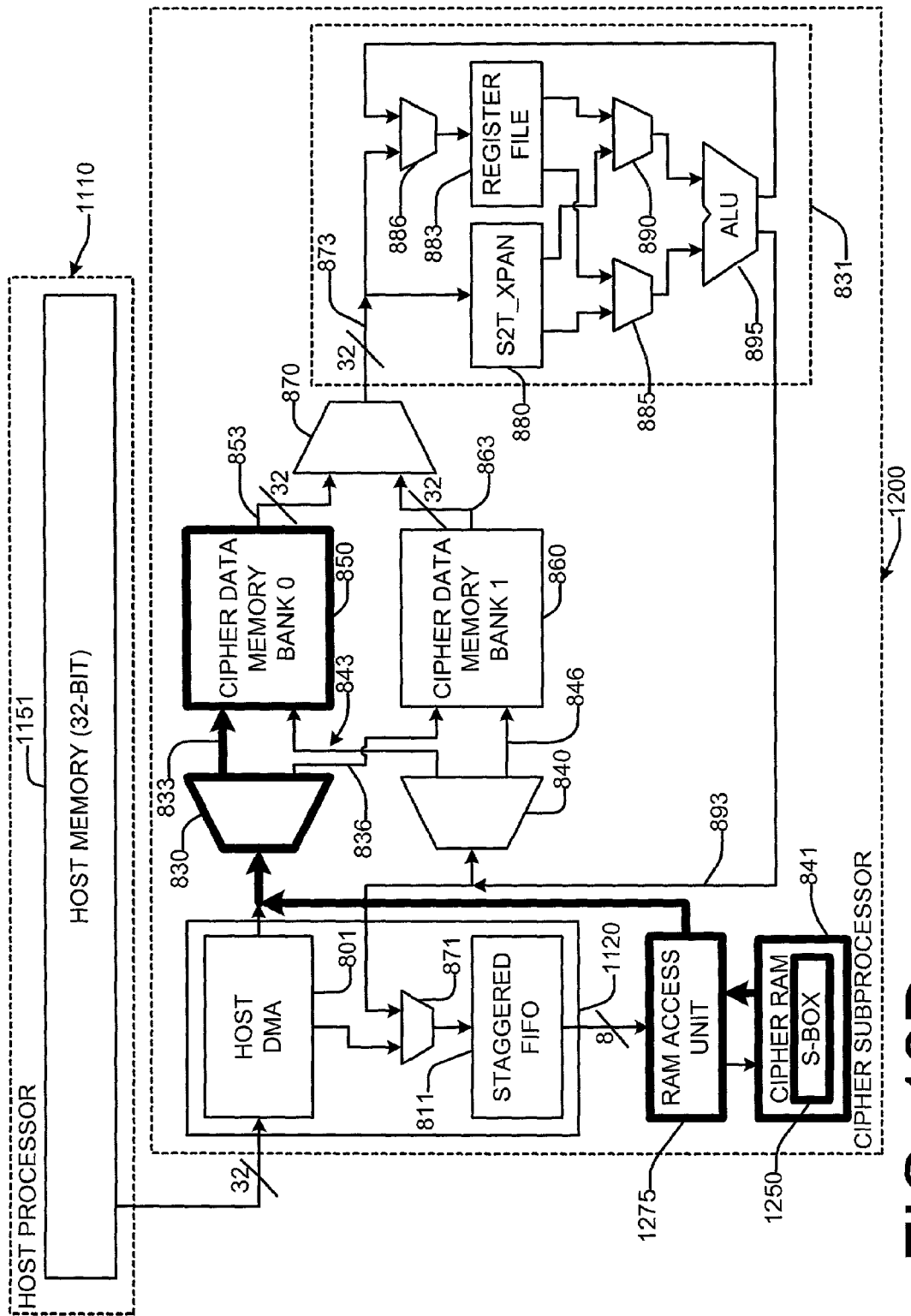
Figure 12E:
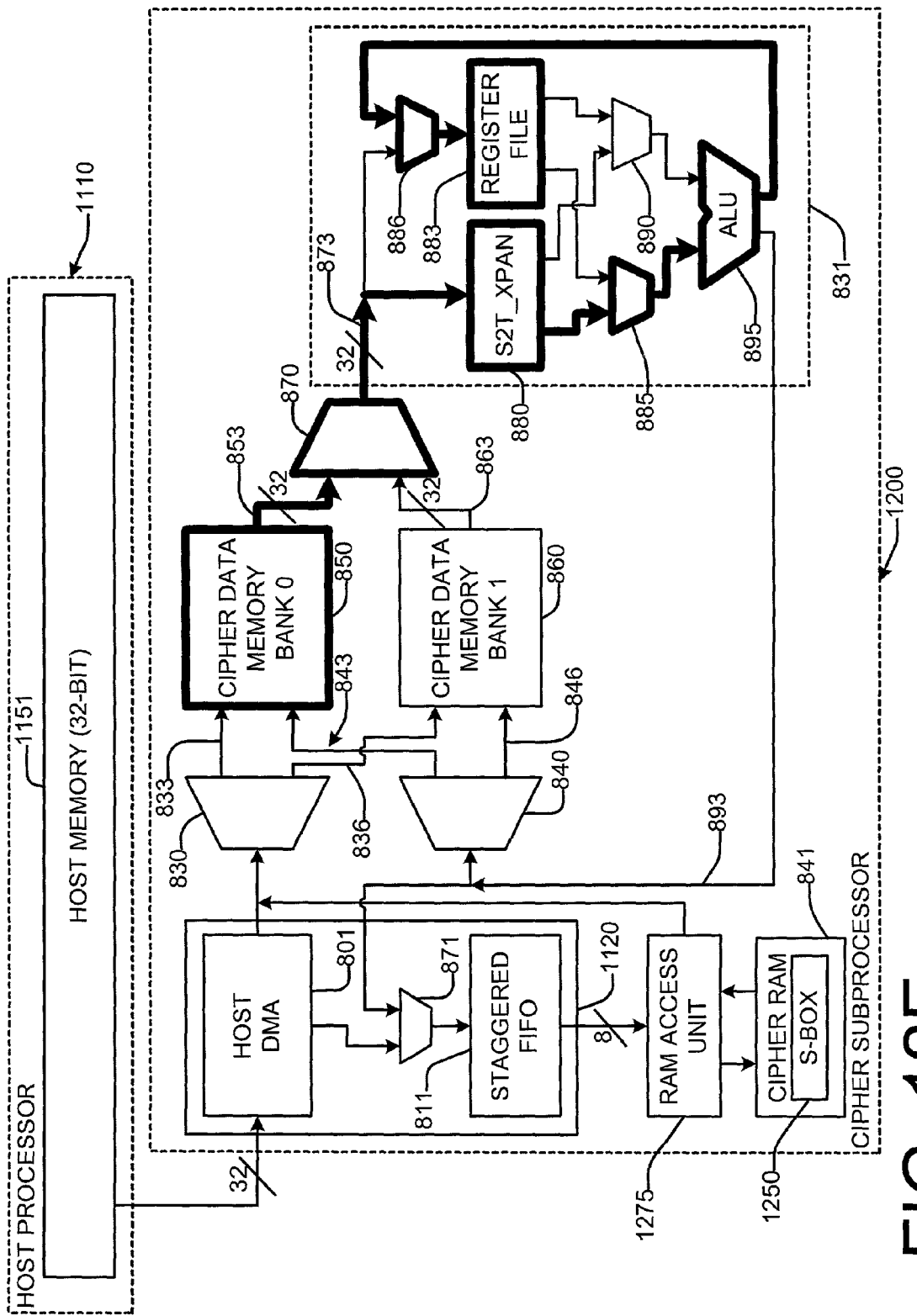
Figure 12F:
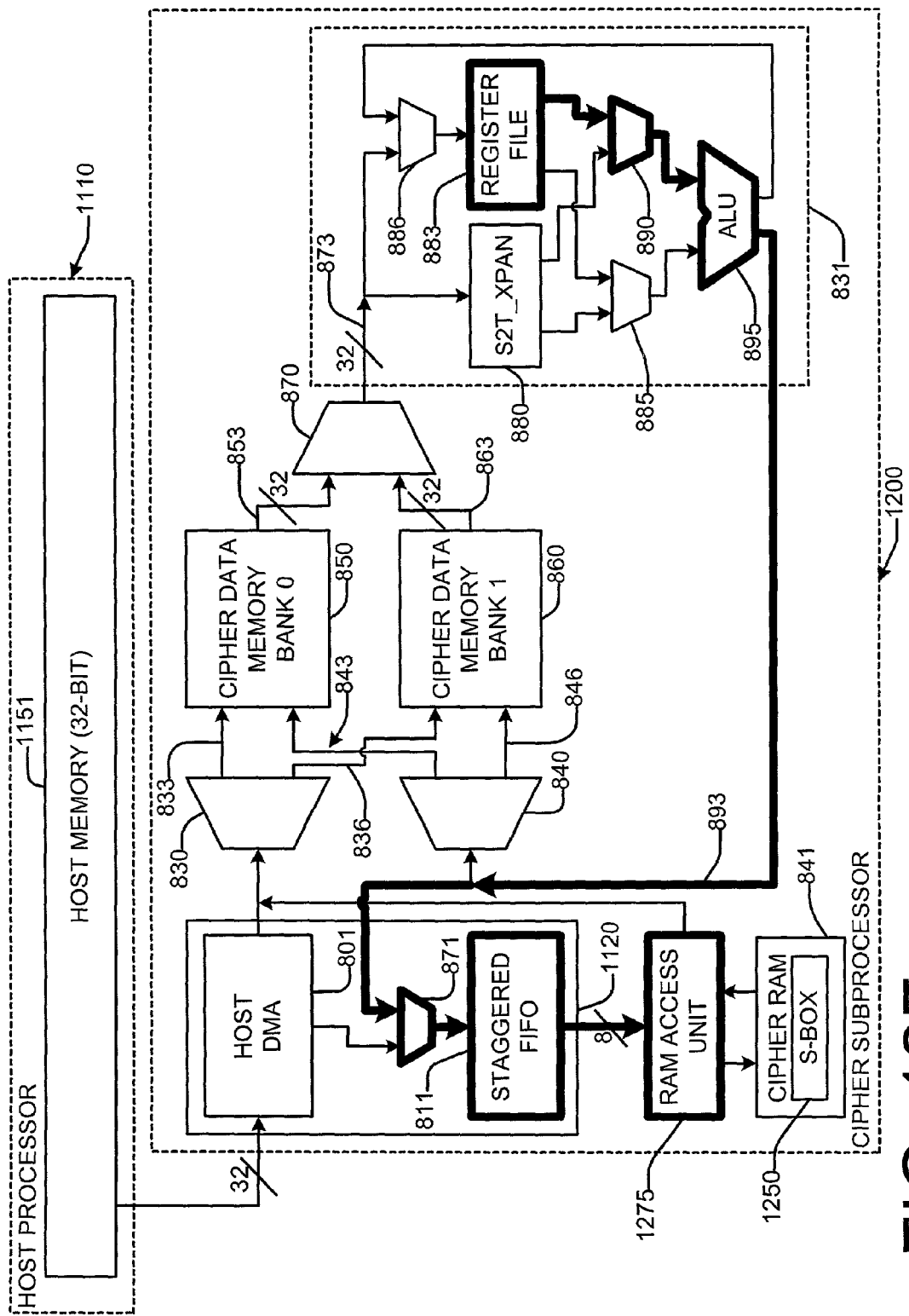
Figure 12G:
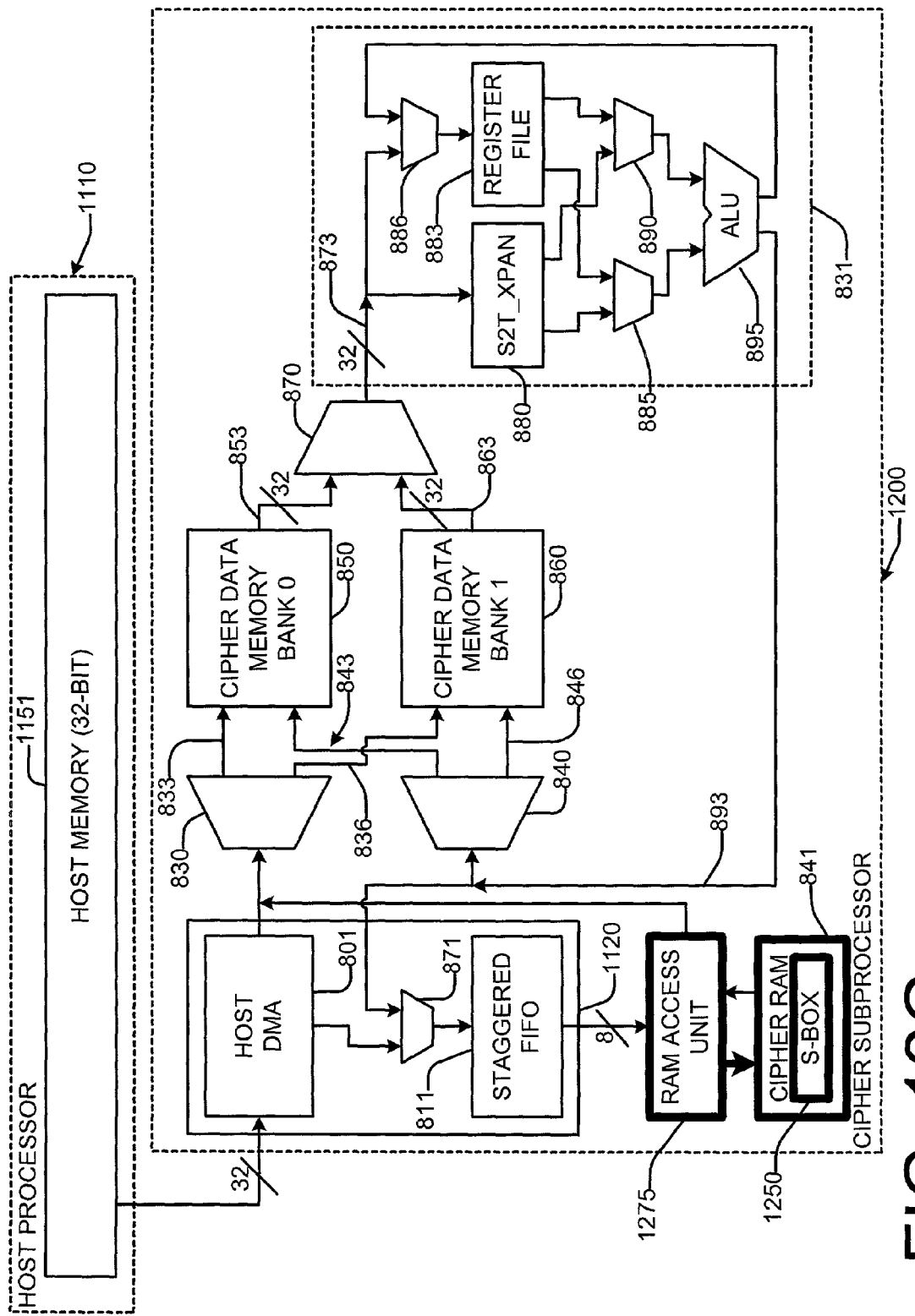
Figure 12H:
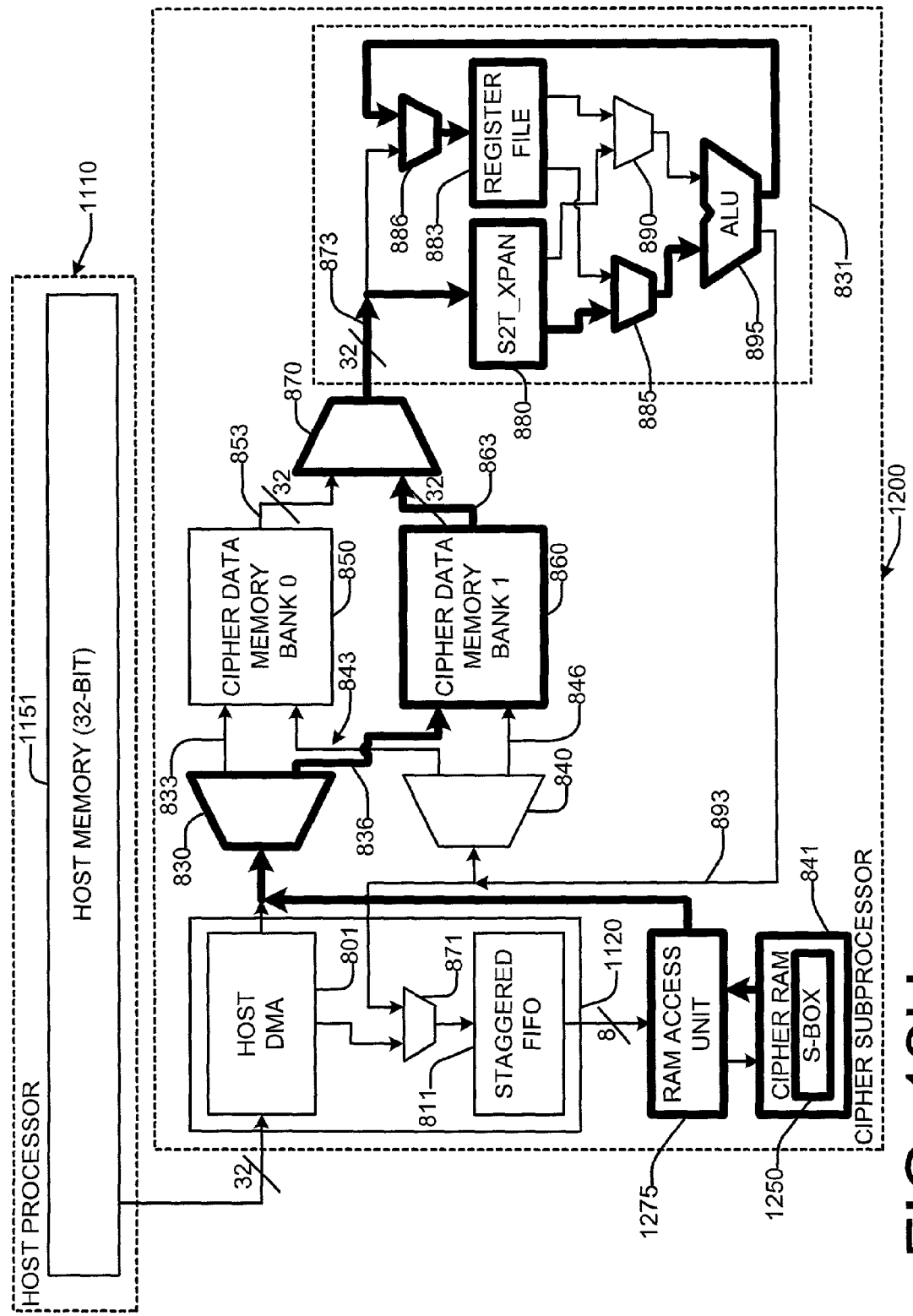
Figure 12I:
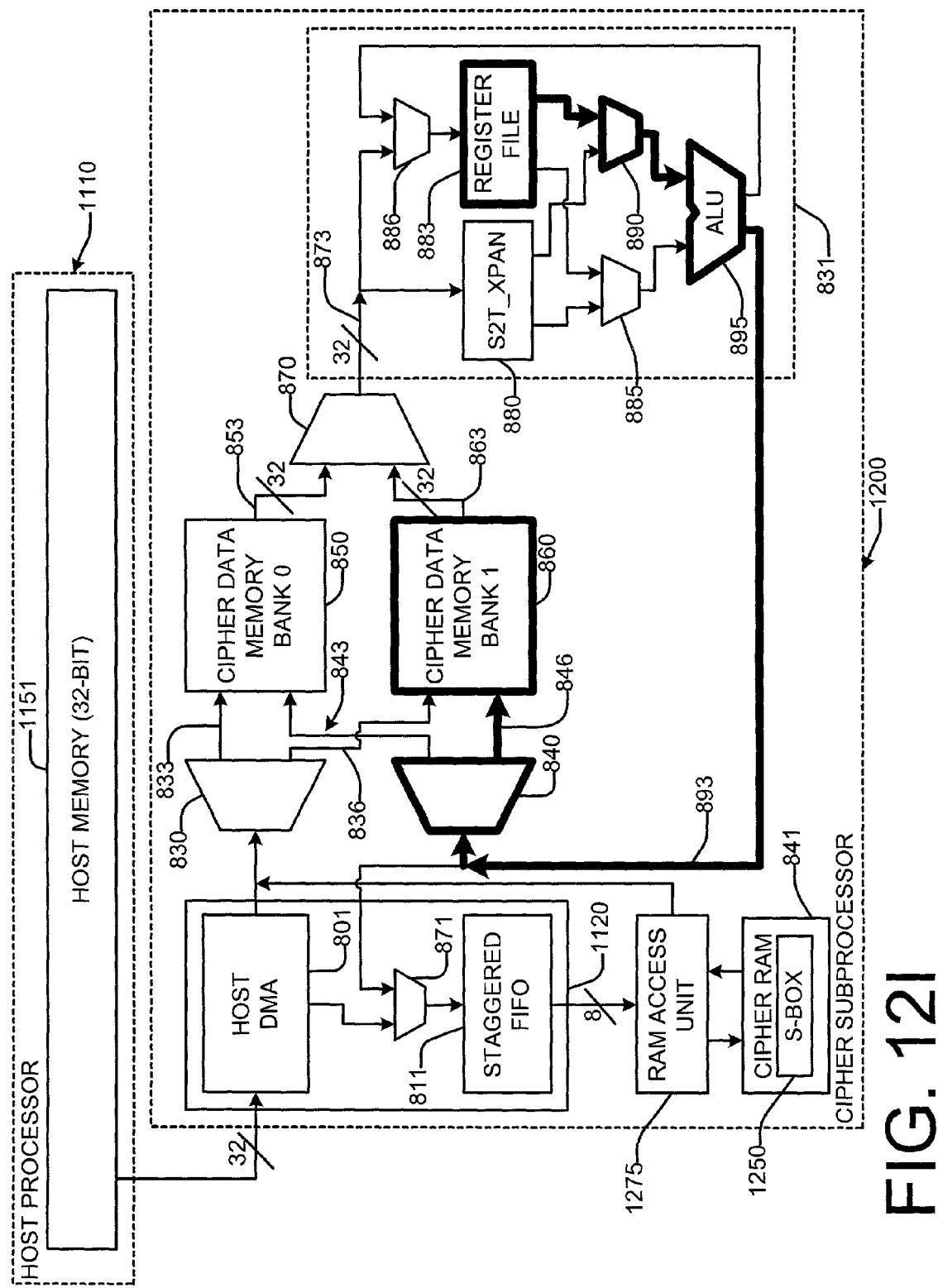
Figure 13:
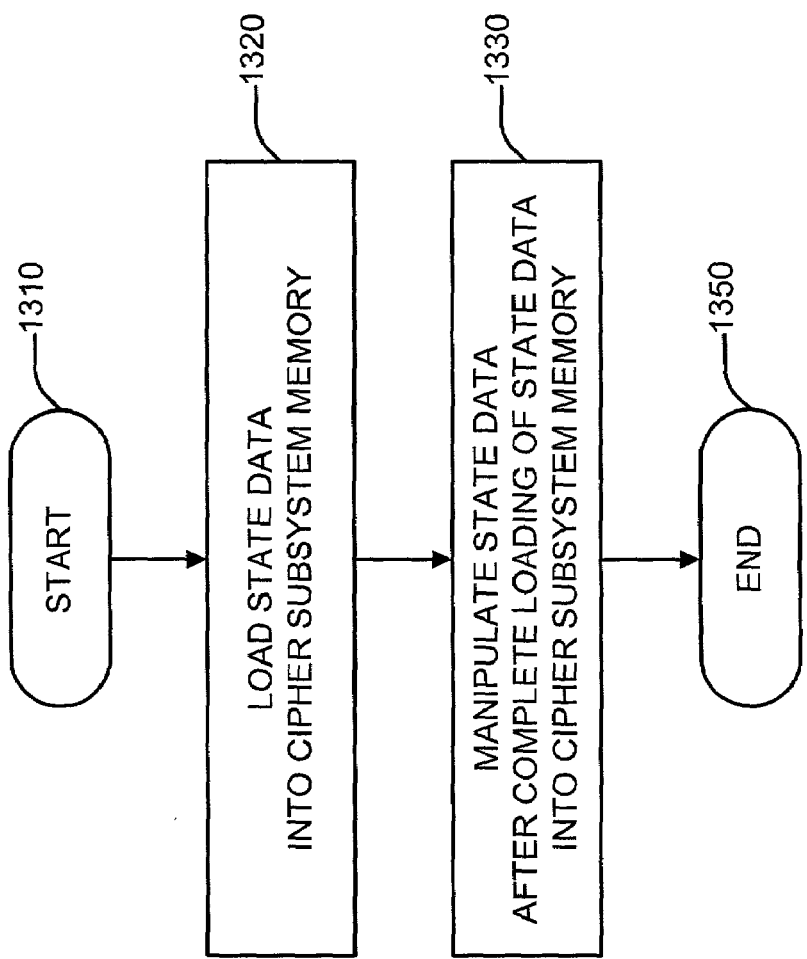
FIG. 13 is a flow chart illustrating the method steps as performed by a subprocessor in the prior art.

As shown in FIG. 12B, the host DMA 801 is configured to retrieve plain text from the host processor 1110. The retrieved plain text is cascaded through the staggered FIFO 811, which is configured to perform the ShiftRow step of the AES algorithm. Since details of the staggered FIFO 811 have been discussed in reference to FIGS. 9A through 9O, no further discussion of the staggered FIFO 811 is presented here. The row-shifted data is output on a byte-by-byte basis from the staggered FIFO 811 to the RAM access unit 1275. As shown in FIG. 12C, each byte is used to perform the S-box lookup operation of the AES algorithm, wherein the S-box 1250 is stored in cipher RAM 841. This information is then sent, as shown in FIG. 12D, from cipher RAM 841 to the a cipher data memory bank (specifically, bank 0 in the example of FIG. 12D) through MUX 830. The stored data is then retrieved, as shown in FIG. 12E, through MUX 870 by S2T_XPAN 880 so the cipher subprocessor 1200 may perform the T-table expansion using this information. The expanded data is then directed through MUX 885 to ALU 895, MUX 886, and register file 883, which perform the MixColumn step and the AddRoundKey step. The resulting state data is then sent through MUX 871 to staggered FIFO 811 for row-shifting, as shown in FIG. 12F. This row-shifted data is then sent to the RAM access unit 1275. As shown in FIG. 12G, the RAM access unit 1275 accesses the cipher RAM 841, which has the S-box 1250, in order to perform the ByteSub step of the AES algorithm. This data is then directed to one of the cipher data memory banks (specifically, bank 1 860 for the example of FIG. 12H) through MUX 830, as shown in FIG. 12H. The MixColumn step and the AddRoundKey step are then performed on the data using S2T_XPAN 880, MUXs 885, 886, 890, and ALU 895. This state data is then stored in one of the cipher data memory banks (specifically, bank 1 860 for the example of FIG. 12I).

As one can see, the cipher subprocessor 1200 manipulates the data as it is being loaded into cipher RAM 841, thereby reducing memory access as compared to the prior art. However, unlike the embodiments of FIGS. 8A and 11A, the cipher RAM 841 is actually accessed here during the S-box lookup operation because the S-box 1250 is stored in the cipher RAM 841.

Again, similar to the example of FIGS. 8A through 8I and 11A through 11H, by having two memory banks 850, 860, the process described in FIGS. 12E through 12I for a given state data may take place concurrently with the process described in FIGS. 12B through 12D for a subsequent state data. In other words, while the subprocessor 1200 performs the MixColumn step and the AddRoundKey step on one set of data, the subprocessor 1200 may simultaneously perform the ByteSub step and the ShiftRow step on a subsequent set of data. Also, by the time that the data is stored in cipher RAM 841, both the ShiftRow step and the ByteSub step of the AES algorithm have been executed on the state data, albeit with one additional access of the cipher RAM 841 due to the S-box 1250 residing in cipher RAM 841. The process, as described in FIGS. 12A through 12I, is repeated until the AES algorithm has been fully executed on the data set.

FIG. 14 is a flowchart illustrating the method steps as performed in one embodiment of the invention. While the steps associated with the detailed operation of the cipher subprocessor 700 (FIG. 8A), 1100 (FIG. 11A), 1200 (FIG. 12A) have been shown with reference to FIGS. 7 through 12I, FIG. 14 provides an overview of one embodiment of the invention in order to more clearly show the method steps associated with the invention. As shown in FIG. 14, the system, in step 1420, retrieves state data for processing. In the first iteration of the AES algorithm, the state data is the plain text that is retrieved from the host processor memory. In subsequent iterations, the state data is the intermediate cipher text that has undergone at least one round of the AES algorithm, which is stored in the cipher subprocessor memory 841 (FIG. 8A). The system, in step 1430, then concurrently manipulates the retrieved state data as the data is being loaded into the cipher subprocessor memory 841 (FIG. 8A). Thus, the data is manipulated prior to complete loading into cipher subprocessor memory 841 (FIG. 8A). The manipulated data is then loaded, in step 1440, into the cipher subprocessor memory 841 (FIG. 8A), and, in step 1450, the remaining steps of the AES algorithm (i.e., the MixColumn step and the AddRoundKey step) are executed on the stored data. As seen from FIG. 14, the invention allows for data manipulation as the data is being loaded into memory, rather than waiting for all of the data to be completely loaded into memory prior to execution of the AES algorithm. This allows for better throughput and avoids potential bottlenecks in memory that may be present in the prior art.

Figure 15A:
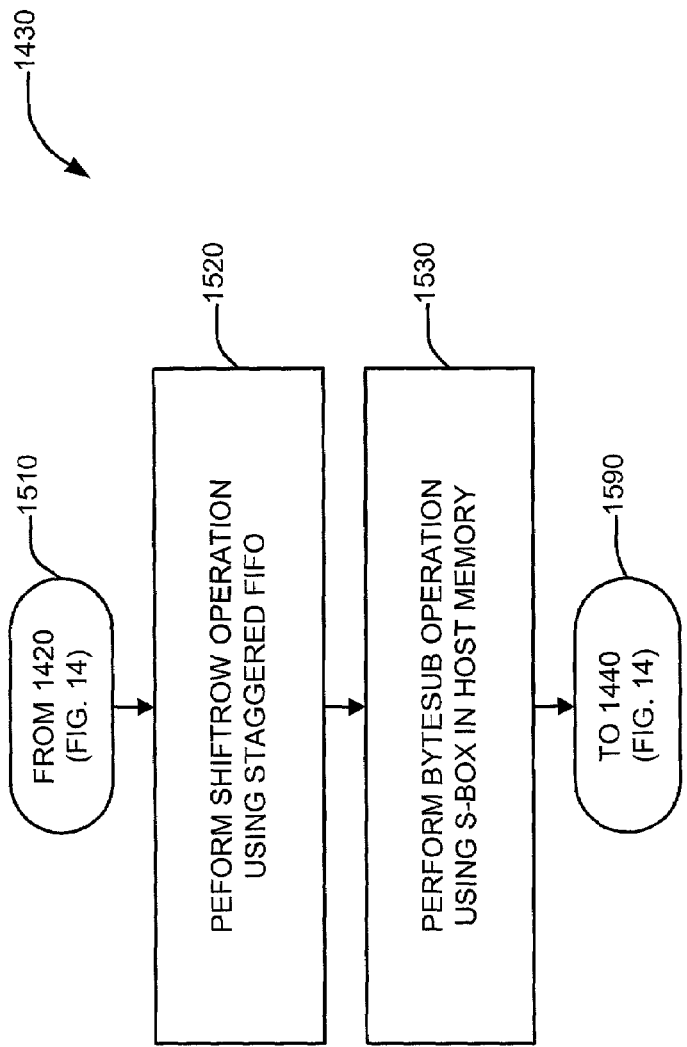
FIGS. 15A through 15C are flowcharts showing the data manipulation step of FIG. 14 for several different embodiments of the invention.
Figure 15B:
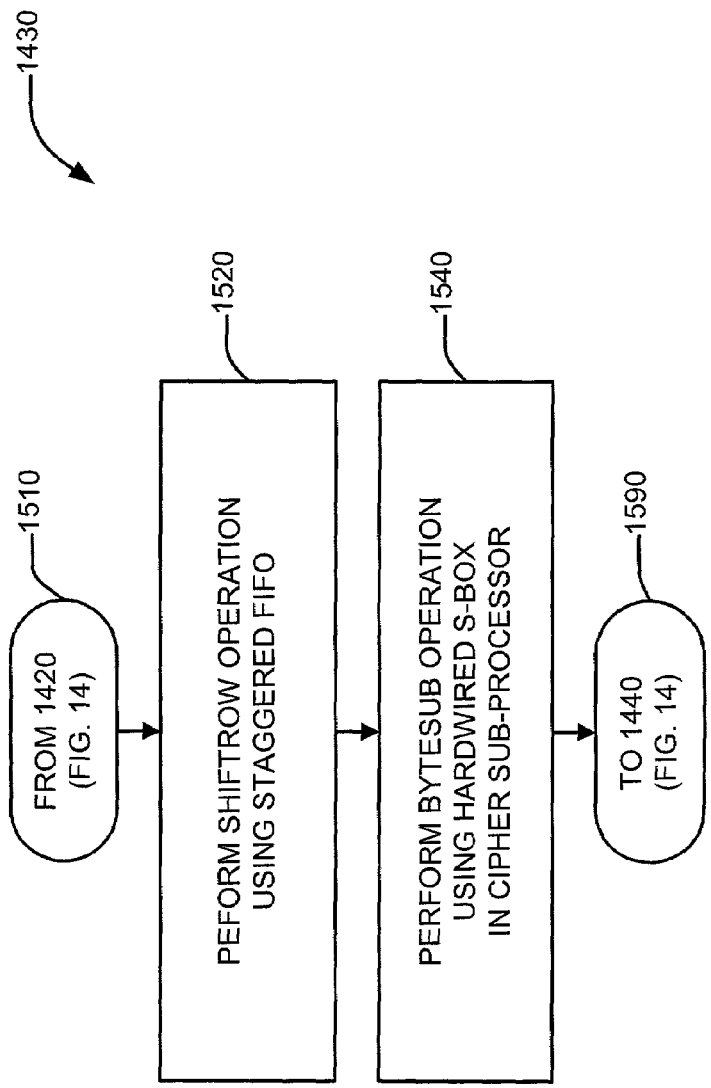
Figure 15C:
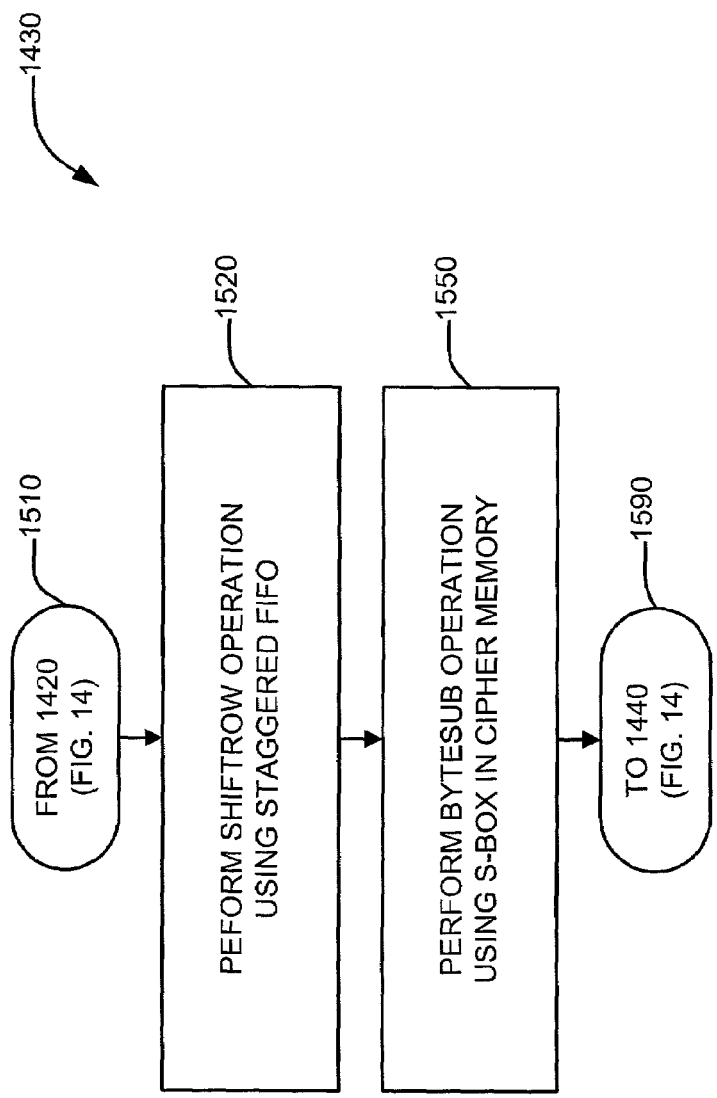

FIGS. 15A through 15C are flowcharts showing the data manipulation step of FIG. 14 for several different embodiments of the invention. In FIG. 15A, the data manipulation comprises a two-step process having the ShiftRow step of the AES algorithm, in step 1520, and the ByteSub step of the AES algorithm, in step 1530. The ByteSub 1530 step is done by using an S-box that is located in the host processor memory. In this sense, FIG. 15A shows method steps that are associated with the hardware configuration of FIGS. 8A through 8I.

FIG. 15B shows the data manipulation as comprising the steps of performing the ShiftRow step, in step 1520, and the performing the ByteSub step, in step 1540, using a hardwired S-box that is located within the cipher subprocessor. In this sense, FIG. 15B shows method steps that are associated with the hardware configuration in FIGS. 11A through 11I.

FIG. 15C shows the data manipulation as comprising the step of performing the ShiftRow step, in step 1520, and performing the ByteSub step, in step 1550, using an S-box that is located in the cipher subprocessor memory. In this sense, FIG. 15C shows method steps that are associated with the hardware configuration of FIGS. 12A through 12I.

Figure 16B:
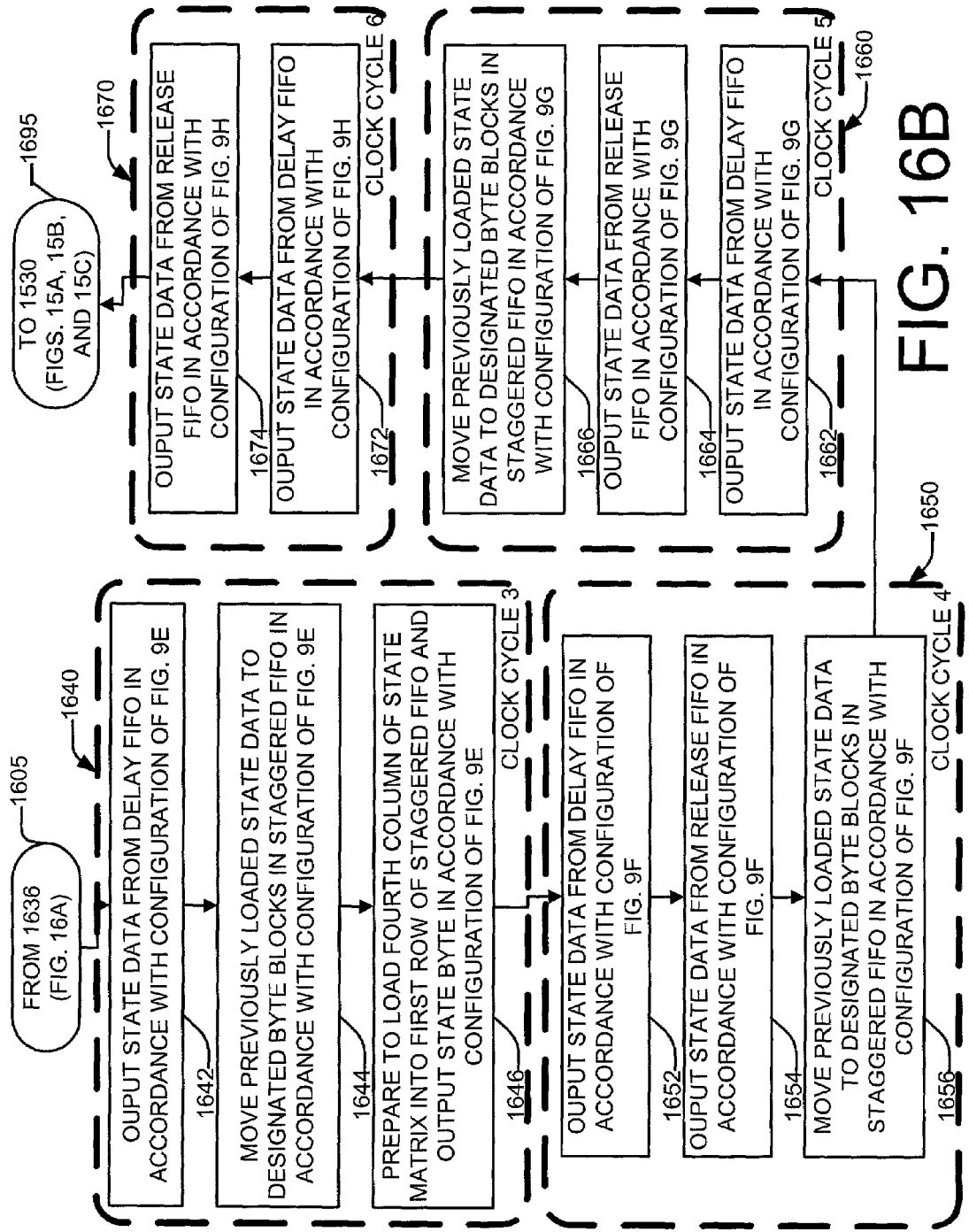
Figure 17B:
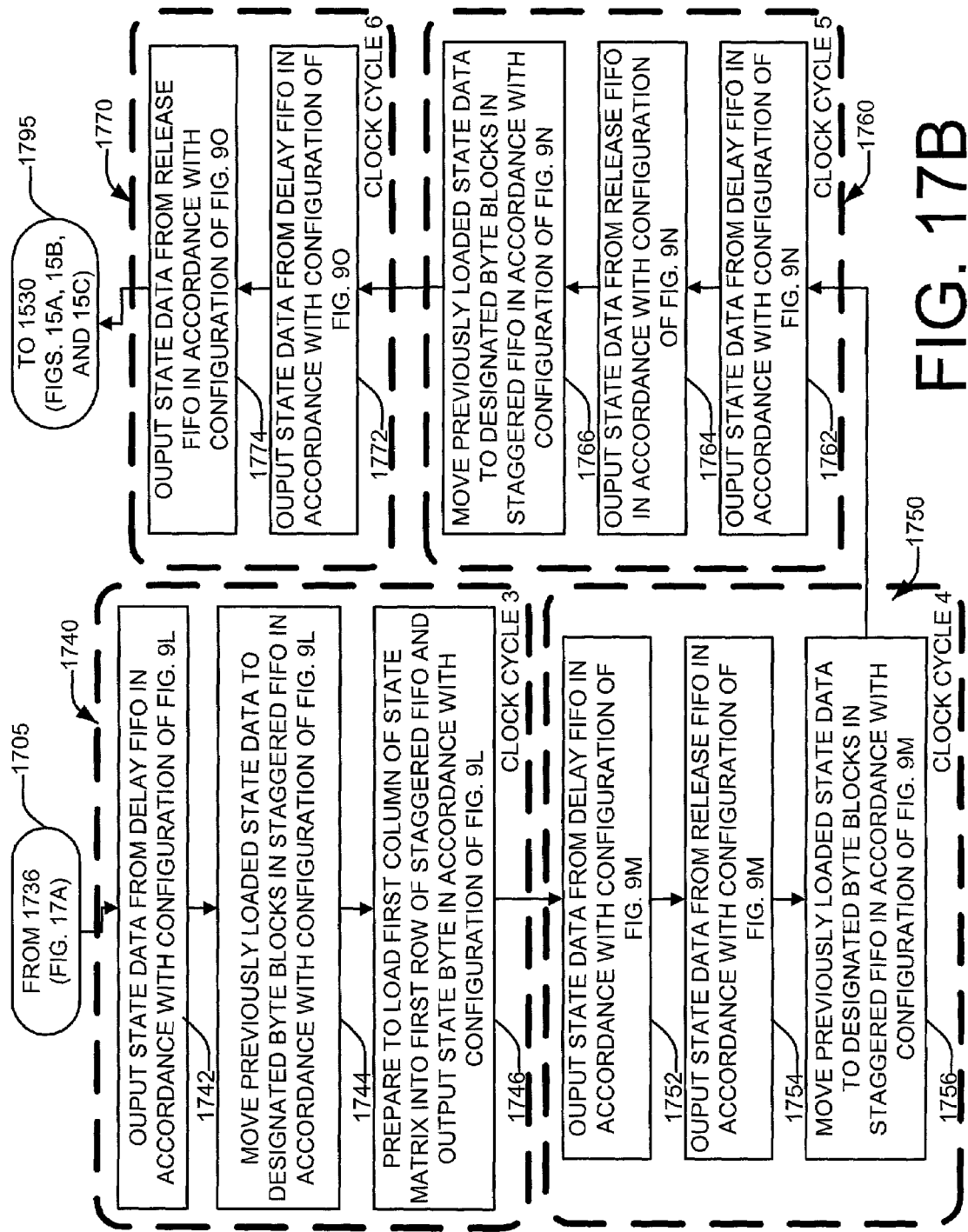

FIGS. 16A and 16B are flowcharts showing the ShiftRow step during enciphering as performed in one embodiment of the invention, while FIGS. 17A and 17B are flowcharts showing the ShiftRow step during deciphering as performed in one embodiment of the invention. As shown in FIGS. 16A and 16B, the method may be seen as being performed in seven clock cycles (i.e., clock cycles 0 through 7) 1851, 1620, 1630, 1640, 1650, 1660, 1670. In clock cycle 0 1851, the system prepares, in step 1612, to load the first column of the state matrix 230 (FIG. 3) to the first row of the staggered FIFO 811 (FIG. 9B) in accordance with the configuration of FIG. 9B.

In clock cycle 1 1620, the system performs two steps. In step 1622, the system loads the previously prepared 1612 first column of the state matrix 230 (FIG. 3) into the first row of the staggered FIFO 811 (FIG. 9C) in accordance with the configuration of FIG. 9C. In step 1624, the system prepares to load the second column of the state matrix 230 (FIG. 3) into the first row of the staggered FIFO 811 (FIG. 9C) in accordance with the configuration of FIG. 9C. While two discrete steps are shown in clock cycle 1 1620, in a preferred embodiment, the two steps 1622, 1624 are performed substantially simultaneously. Alternatively, these steps in clock cycle 1 1620 may be performed non-concurrently.

In clock cycle 2 1630, the system performs three steps. In step 1632, the system moves the previously loaded state data to designated byte blocks in the staggered FIFO 811 (FIG. 9D) in accordance with the configuration of FIG. 9D. Additionally, in step 1634, the system loads the second column of the state matrix 230 (FIG. 3) into the first row of the staggered FIFO 811 (FIG. 9D) in accordance with the configuration in FIG. 9D. Furthermore, in step 1636, the system prepares to load the third column of the state matrix 230 (FIG. 3) into the first row of the staggered FIFO 811 (FIG. 9D) in accordance with the configuration of FIG. 9D. Again, while three discrete steps are shown in clock cycle 2 1630, in the preferred embodiment, the three steps 1632, 1634, 1636 are performed substantially simultaneously. Alternatively, these steps in clock cycle 2 1630 may be performed non-concurrently.

In clock cycle 3 1640, the system performs three steps. In step 1642, the system outputs the state data from the delay FIFO 940 (FIG. 9E) in accordance with the configuration of FIG. 9E. Additionally, in step 1644, the system moves the previously loaded state data to designated byte blocks in the staggered FIFO 811 (FIG. 9E) in accordance with the configuration of FIG. 9E. Furthermore, in step 1646, the system prepares to load the fourth column of the state data matrix 230 (FIG. 3) to the staggered FIFO 811 (FIG. 9E) as well as output one of the bytes of the last column of the state matrix 230 (FIG. 3) in accordance with the configuration of FIG. 9E. Again, while three discrete steps are shown in clock cycle 3 1640, in the preferred embodiment, the three steps 1642, 1644, 1646 are performed substantially simultaneously. Alternatively, these steps in clock cycle 3 1640 may be performed non-concurrently.

In clock cycle 4 1650, the system performs three steps. In step 1652, the system outputs state data from the delay FIFO 940 (FIG. 9F) in accordance with FIG. 9F, and, in step 1654, the system outputs state data from the release FIFO 950 (FIG. 9F) in accordance with FIG. 9F. Additionally, the system moves, in step 1656, the previously loaded state data to designated byte blocks within the staggered FIFO 811 (FIG. 9F) in accordance with the configuration of FIG. 9F. Again, these steps may occur simultaneously or non-concurrently within the same clock cycle, depending on the desired implementation.

In clock cycle 5 1660, the system performs three steps. In step 1662, the system outputs data from the delay FIFO 940 (FIG. 9G) in accordance with the configuration of FIG. 9G; in step 1664, the system outputs data from the release FIFO 950 (FIG. 9G) in accordance with the configuration of FIG. 9G; and, in step 1666, the system moves the previously loaded state data to designated byte blocks within the staggered FIFO 811 (FIG. 9G) in accordance with the configuration of FIG. 9G. Again, these steps may occur simultaneously or non-concurrently within the same clock cycle, depending on the desired implementation.

In clock cycle 6 1670, the system performs a two-step process. In step 1672, the system outputs the state data from the delay FIFO 940 (FIG. 9H), and, in step 1674, the system outputs the state data from the release FIFO 950 (FIG. 9H), both steps in accordance with the configuration of FIG. 9H. Again, these steps may occur simultaneously or non-concurrently within the same clock cycle, depending on the desired implementation.

FIGS. 17A and 17B are flowcharts showing the ShiftRow step during deciphering as performed in one embodiment of the invention. Similar to the flowchart in FIGS. 16A and 16B, FIGS. 17A and 17B may be seen as being performed in seven clock cycles (i.e., clock cycles 0 through 7) 1710, 1720, 1730, 1740, 1750, 1760, 1770. The ShiftRow step for deciphering, as shown in FIGS. 17A and 17B, is identical to the ShiftRow step for enciphering, as shown in FIGS. 16A and 16B, except for the fact that the data matrix 230 (FIG. 3) is sequentially input in order of last column, third column, second column, and then the first column. This is due to the functioning of the ALU 895 (FIG. 8A) during the deciphering process, which is unrelated to this invention. Since there is much similarity in the deciphering operation as there is in the enciphering operation, the details relating to FIGS. 17A and 17B are not discussed herein, and the reader is referred to FIGS. 17A and 17B to discern how the bytes are cascaded through the staggered FIFO 811 (FIG. 9A) during deciphering. It is, however, worthwhile to note that by changing the input order of the byte-columns in the data matrix 230 (FIG.

3), it is possible to either "left-shift" or "right-shift" the rows of data, depending on the desired application.

While the flowchart of FIGS. 16A, 16B, 17A, and 17B show discrete steps associated with the ShiftRow step in the enciphering and deciphering process, it will be clear to one of ordinary skill in the art that several of these steps may be performed concurrently. For example, all of the steps that are located within clock cycle 2 1630 are intended, in the preferred embodiment, to take place substantially simultaneously. Similarly, all of the steps that are grouped together in the various clock cycles may be performed concurrently within that clock cycle. Alternatively, depending on the particular implementation, several of the steps that are portrayed in a single clock cycle may be divided into discrete steps occurring at non-concurrent points in time. It is not intended that the illustrated embodiments be limiting, but, rather, used solely for the purposes of illustrating the invention to better enable one of ordinary skill in the art to make and practice the invention. Thus, it is the intent that the scope of the invention be determined by the appended claims and their equivalents, and not by the detailed description above.

Although an exemplary embodiment of the present invention has been shown and described, it will be apparent to those of ordinary skill in the art that a number of changes, modifications, or alterations to the invention as described may be made, none of which depart from the spirit of the present invention. For example, while the preferred embodiment of the invention shows the AES cipher subsystem as being implemented in a programmable processor, it will be clear to one of ordinary skill in the art that the system may be implemented using discrete logic circuits having logic gates for implementing logic functions upon data signals, an application specific integrated circuit (ASIC) having appropriate combinational logic gates, programmable gate arrays (PGA), field programmable gate arrays (FPGA), etc. Additionally, while much of the description focuses on the encryption operation, since the decryption process is similar (as explained in the AES proposal), all descriptions related to the encryption process may be translated to the decryption process, and vice versa. Thus, the above-described system and method may also be implemented for both the encryption and decryption processes.

All such changes, modifications, and alterations should therefore be seen as within the scope of the present invention.

We claim:

1. A system for enciphering information, comprising:
    a first memory access unit configured to retrieve data from a host memory;
    a staggered FIFO unit configured as a hardware logic component to receive the retrieved data from the host memory, the staggered FIFO unit further configured to perform a ShiftRow step of an Advanced Encryption Standard (AES) algorithm on the data to produce row-shifted data;
    a second memory access unit configured to receive the produced row-shifted data and perform a byte substitution using the row-shifted data to produce byte-substituted data;
    logic configured to receive the byte-substituted data and expand the byte-substituted data to produce manipulated data using a designated expansion algorithm; and
    a subprocessor memory configured to receive and store the manipulated data.

2. A system for enciphering information, comprising:
    a host processor comprising a host memory, the host memory having data;
    a subprocessor having a subprocessor memory, the subprocessor configured to retrieve the data from the host memory and manipulate the data as the data is being loaded into the subprocessor memory, the subprocessor further comprising a staggered FIFO unit configured as a hardware logic component to receive the retrieved data from the host memory, the staggered FIFO unit further configured to perform a ShiftRow step of the AES algorithm on the data to produce row-shifted data.

3. The system of claim 2, wherein the subprocessor is configured to execute an Advanced Encryption Standard (AES) algorithm using the data.

4. The system of claim 3, wherein the subprocessor comprises a first memory access unit configured to retrieve the data from a host memory.

5. The system of claim 2, wherein the subprocessor further comprises a second memory access unit configured to receive the produced row-shifted data and perform a byte substitution operation on the row-shifted data using a substitution table to produce byte-substituted data.

6. The system of claim 5, wherein the subprocessor further comprises a data expansion unit configured to receive the byte-substituted data and expand the byte-substituted data to produce manipulated data using a designated expansion algorithm.

7. The system of claim 6, wherein the subprocessor further comprises a subprocessor memory configured to receive and store the manipulated data.

8. The system of claim 7, wherein the subprocessor further comprises a subprocessor memory access unit configured to retrieve the stored data.

9. The system of claim 5, wherein the substitution table is located in the host memory.

10. The system of claim 5, wherein the substitution table is configured as a hardware logic component within the subprocessor.

11. The system of claim 5, wherein the substitution table is located in the subprocessor memory.

12. The system of claim 2, wherein the staggered FIFO unit comprises:
    a first set of variable-layer FIFOs having a plurality of FIFO layers, the first set of variable-layer FIFOs configured to receive a first portion of the data in response to a designated clock signal, the first set of variable-layer FIFOs further configured to cascade the received first portion of the data through the plurality of FIFO layers in response to consecutive clock signals after the designated clock signal, the variable-layer FIFOs further configured to release the cascaded first portion of the data; and
    a second set of variable-layer FIFOs having a plurality of FIFO layers, the second set of variable-layer FIFOs configured to receive a second portion of the data in response to the designated clock signal, the second set of variable-layer FIFOs further configured to cascade the received second portion of the data through the plurality of FIFO layers in response to the consecutive clock signals after the designated clock signal, the second set of variable-layer FIFOs fewer configured to buffer the cascaded second portion of the data for one clock cycle, the variable-layer FIFOs further configured to release the buffered second portion of the data.

13. The system of claim 12, wherein the data comprises a matrix having four rows of data, each of the four rows of data having four bytes of data.

14. The system of claim 13, wherein the first set of variable-layer FIFOs comprises a first release-FIFO layer configured to receive a first set of three bytes of the data matrix in response to a designated clock signal, the first release-FIFO layer further configured to release the first set of three bytes of the data matrix in response to a first clock signal, the first clock signal immediately following the designated clock signal, the first release-FIFO layer further configured to receive a second set of three bytes of the data matrix in response to the first clock signal, the first release-FIFO layer further configured to release the second set of three bytes of the data matrix in response to a second clock signal, the second clock signal immediately following the first clock signal, the first release-FIFO layer further configured to receive a third set of three bytes in response to the second clock signal, the first release-FIFO layer further configured to release the third set of three bytes in response to a third clock signal, the third clock signal immediately following the second clock signal, the first release-FIFO layer further configured to receive a fourth set of three bytes in response to the third clock signal, the first release-FIFO layer further configured to release the fourth set of three bytes in response to a fourth clock signal, the fourth clock signal immediately following the third clock signal.

15. The system of claim 14, wherein the first set of variable-layer FIFOs further comprises a second release-FIFO layer configured to receive two bytes of the first set of three bytes in response to the first clock signal, the second release-FIFO layer further configured to release the two bytes of the first set of three bytes in response to the second clock signal, the second release-FIFO layer further configured to receive two bytes of the second set of three bytes in response to the second clock signal, the second release-FIFO layer further configured to release the two bytes of the second set of three bytes in response to the third clock signal, the second release-FIFO layer further configured to receive two bytes of the third set of three bytes in response to the third clock signal, the second release-FIFO layer further configured to release the two bytes of the third set of three bytes in response to the fourth clock signal, the second release-FIFO layer further configured to receive two bytes of the fourth set of three bytes in response to the fourth clock signal, the second release-FIFO layer further configured to release the two bytes of the fourth set of three bytes in response to a fifth clock signal, the fifth clock signal immediately following the fourth clock signal.

16. The system of claim 11, wherein the first set of variable-layer FIFOs further comprises a third release-FIFO layer configured to receive one byte of the two bytes of the first set of three bytes in response to the second clock signal, the third release-FIFO layer further configured to release the one byte of the two bytes of the first set of three bytes in response to the third clock signal, the third release-FIFO layer further configured to receive one byte of the two bytes of the second set of three bytes in response to the third clock signal, the third release-FIFO layer further configured to release the one byte of the two bytes of the second set of three bytes in response to the fourth clock signal, the third release-FIFO layer further configured to receive one byte of the two bytes of the third set of three bytes in response to the fourth clock signal, the third release-FIFO layer further configured to release the one byte of the two bytes of the third set of three bytes in response to the fifth clock signal, the third release-FIFO layer further configured to receive one byte of the two bytes of the fourth set of three bytes in response to the fifth clock signal, the third release-FIFO layer further configured to release the one byte of the two bytes of the fourth set of three bytes in response to a sixth clock signal, the sixth clock signal immediately following the fifth clock signal.

17. The system of claim 16, wherein the second set of variable-layer FIFOs comprises a first delay-FIFO layer configured to receive a second set of one byte of the data matrix in response to the first clock signal, the first delay-FIFO layer further configured to release the second set of one byte of the data matrix in response to the second clock signal, the first delay-FIFO layer further configured to receive a third set of one byte of the data matrix in response to the second clock signal, the first delay-FIFO layer further configured to release the third set of one byte of the data matrix in response to the third clock signal, the first delay-FIFO layer further configured to receive a fourth set of one byte in response to the third clock signal, the first delay-FIFO layer further configured to hold the fourth set of one byte in response to a fourth clock signal, the first delay-FIFO layer further configured to release the fourth set of one byte in response to the fifth clock signal.

18. The system of claim 17, wherein the second set of variable-layer FIFOs further comprises a second delay-FIFO layer configured to receive, in response to the second clock signal, the second set of one byte of the data matrix and one byte of the first set of three bytes from the first release-FIFO layer, the second delay-FIFO layer further configured to release, in response to the third clock signal, the second set of one byte of the data matrix and the one byte of the first set of three bytes from the first release-FIFO layer, the second delay-FIFO layer further configured to receive, in response to the third clock signal, the third set of one byte of the data matrix and one byte of the second set of three bytes from the first release-FIFO layer, the second delay-FIFO layer further configured to hold, in response to the fourth clock signal, the third set of one byte of the data matrix and the one byte of the second set of three bytes from the first release-FIFO layer, the second delay-FIFO layer further configured to release, in response to the fifth clock signal, the third set of one byte of the data matrix and the one byte of the second set of three bytes from the first release-FIFO layer, the second delay-FIFO layer further configured to receive, in response to the fifth clock signal, the fourth set of one byte of the data matrix and one byte of the third set of three bytes from the first release-FIFO layer, the second delay-FIFO layer further configured to release, in response to the sixth clock signal, the fourth set of one byte of the data matrix and the one byte of the third set of three bytes from the first release-FIFO layer.

19. The system of claim 18, wherein the second set of variable-layer FIFOs further comprises a third delay-FIFO layer configured to receive, in response to the third clock signal, the second set of one byte of the data matrix and two bytes of the first set of three bytes from the first release-FIFO layer, the third delay-FIFO layer further configured to hold, in response to the fourth clock signal, the second set of one byte of the data matrix and the two bytes of the first set of three bytes from the first release-FIFO layer, the third delay-FIFO layer further configured to release, in response to the fifth clock signal, the second set of one byte of the data matrix and the two bytes of the first set of three bytes from the first release-FIFO layer, the third delay-FIFO layer further configured to receive, in response to the fifth clock signal, the third set of one byte of the data matrix and two bytes of the second set of three bytes from the first release- FIFO layer, the third delay-FIFO layer further configured to release, in response to the sixth clock signal, the third set of one byte of the data matrix and the two bytes of the second set of three bytes from the first release-FIFO layer, the third delay-FIFO layer further configured to output, in response to the sixth clock signal, the fourth set of one byte of the data matrix and the two bytes of the third set of three bytes from the first release-FIFO layer.

20. A system for enciphering information, comprising:
means for retrieving data from a host memory;
means for performing a byte substitution using the row-shifted data to produce byte-substituted data;
means for expanding the byte-substituted data to produce manipulated data using a designated expansion algorithm;
means for storing the manipulated data; and
means for performing a ShiftRow step of an Advanced Encryption Standard (AES) algorithm on the data to produce row-shifted data, the means for performing a ShiftRow step of the AES algorithm further comprising:
means for receiving a portion of the data in response to a designated clock signal;
means for cascading the received portion of the data through a first set of FIFOs in response to consecutive clock signals after the designated clock signal;
means for releasing the cascaded portion of the data;
means for receiving a remaining portion of the data in response to the designated clock signal;
means for cascading the received remaining portion of the data through a second set of FIFOs in response to the consecutive clock signals after the designated clock signal;
means for buffering the cascaded remaining portion of the data for one clock cycle; and
means for releasing the buffered remaining portion of the data.

21. A system for enciphering information, comprising:
means for retrieving data from a host memory; and
means for manipulating the data as the data is being loaded into a subprocessor memory further comprising means for executing an Advanced Encryption Standard (AES) algorithm using the data;
means for performing a ShiftRow step of the AES algorithm on the data to produce row-shifted data, the means for performing a ShiftRow step of the AES algorithm further comprising:
means for receiving a portion of the data in response to a designated clock signal;
means for cascading the received portion of the data through a first set of FIFOs in response to consecutive clock signals after the designated clock signal;
means for releasing the cascaded portion of the data;
means for receiving a remaining portion of the data in response to the designated clock signal;
means for cascading the received remaining portion of the data through a second set of FIFOs in response to the consecutive clock signals after the designated clock signal;
means for buffering the cascaded remaining portion of the data for one clock cycle; and
means for releasing the buffered remaining portion of the data.

22. The system of claim 21, wherein the means for executing the AES algorithm further comprises means for retrieving data from a host memory.

23. The system of claim 21, further comprising means for performing a byte substitution operation on the row-shifted data using a substitution table to produce byte-substituted data.

24. The system of claim 23, further comprising means for expanding the byte-substituted data to produce manipulated data using a designated expansion algorithm.

25. The system of claim 24, further comprising means for storing the manipulated data.

26. The system of claim 25, further comprising means for retrieving the stored data.

27. A method for enciphering information, comprising the steps of:
retrieving data from a host memory; and
manipulating the data as the data is being loaded into a subprocessor memory, further comprising executing the Advanced Encryption Standard (AES) algorithm using the data, wherein the step of executing the AES algorithm further comprises the step of performing a ShiftRow step of the AES algorithm on the data produce row-shifted data; wherein
the step of performing a ShiftRow step further comprises:
receiving a first portion of the data in response to a designated clock signal;
cascading the received first portion of the data through a first set of FIFOs in response to consecutive clock signals after the designated clock signal;
releasing the cascaded first portion of the data;
receiving a second portion of the data in response to the designated clock signal;
cascading the received second portion of the data through a second set of FIFOs in response to the consecutive clock signals after the designated clock signal;
buffering the cascaded second portion of the data for one clock cycle; and
releasing the buffered second portion of the data.

28. The method of claim 27, further comprising the step of performing a byte substitution operation on the row-shifted data using a substitution table to produce byte-substituted data.

29. The method of claim 28, further comprising the step of expanding the byte-substituted data to produce manipulated data using a designated expansion algorithm.

30. The method of claim 29, further comprising the step of storing the manipulated data in subprocessor memory.

31. The method of claim 30, further comprising the step of retrieving the data stored in subprocessor memory.

32. The method of claim 28, wherein the step of performing the byte substitution operation further comprises the step of accessing a substitution table located in the host memory.

33. The method of claim 28, wherein the step of performing the byte substitution operation further comprises the step of accessing a substitution table configured as a hardware logic component within the subprocessor.

34. The method of claim 28, wherein the step of performing the byte substitution operation further comprises the step of accessing a substitution table located in the subprocessor memory.

35. The method of claim 27, further comprising the step of arranging the data into a matrix having four rows, each of the four rows having four bytes.

36. The method of claim 35, wherein the step of cascading the received first portion of the data through the first set of FIFOs comprises the steps of:
receiving a first set of three bytes of the data matrix in response to a designated clock signal;

releasing the first set of three bytes of the data matrix in response to a first clock signal, the first clock signal immediately following the designated clock signal;

receiving a second set of three bytes of the data matrix in response to the first clock signal;

releasing the second set of three bytes of the data matrix in response to a second clock signal, the second clock signal immediately following the first clock signal;

receiving a third set of three bytes in response to the second clock signal;

releasing the third set of three bytes in response to a third clock signal, the third clock signal immediately following the second clock signal;

receiving a fourth set of three bytes in response to the third clock signal; and releasing the fourth set of three bytes in response to a fourth clock signal, the fourth clock signal immediately following the third clock signal.

37. The method of claim 36, wherein the step of cascading the received first portion of the data through the first set of FIFOs further comprises the steps of:

receiving two bytes of the first set of three bytes in response to the first clock signal;

releasing the two bytes of the first set of three bytes in response to the second clock signal;

receiving two bytes of the second set of three bytes in response to the second clock signal;

releasing the two bytes of the second set of three bytes in response to the third clock signal;

receiving two bytes of the third set of three bytes in response to the third clock signal;

releasing the two bytes of the third set of three bytes in response to the fourth clock signal;

receiving two bytes of the fourth set of three bytes in response to the fourth clock signal; and releasing the two bytes of the fourth set of three bytes in response to a fifth clock signal, the fifth clock signal immediately following the fourth clock signal.

38. The method of claim 37, wherein the step of cascading the received first portion of the data through the first set of FIFOs further comprises the steps of:

receiving one byte of the two bytes of the first set of three bytes in response to the second clock signal;

releasing the one byte of the two bytes of the first set of three bytes in response to the third clock signal;

receiving one byte of the two bytes of the second set of three bytes in response to the third clock signal;

releasing the one byte of the two bytes of the second set of three bytes in response to the fourth clock signal;

receiving one byte of the two bytes of the third set of three bytes in response to the fourth clock signal;

releasing the one byte of the two bytes of the third set of three bytes in response to the fifth clock signal;

receiving one byte of the two bytes of the fourth set of three bytes in response to the fifth clock signal; and releasing the one byte of the two bytes of the fourth set of three bytes in response to a sixth clock signal, the sixth clock signal immediately following the fifth clock signal.

39. The method of claim 38, wherein the step of cascading the received second portion of the data through the second set of FIFOs comprises the steps of:

receiving a second set of one byte of the data matrix in response to the first clock signal;

releasing the second set of one byte of the data matrix in response to the second clock signal;

receiving a third set of one byte of the data matrix in response to the second clock signal;

releasing the third set of one byte of the data matrix in response to the third clock signal;

receiving a fourth set of one byte in response to the third clock signal;

holding the fourth set of one byte in response to the fourth clock signal; and releasing the fourth set of one byte in response to the fifth clock signal.

40. The method of claim 39, wherein the step of cascading the received second portion of the data through the second set of FIFOs further comprises the steps of:

receiving, in response to the second clock signal, the second set of one byte of the data matrix and one byte of the first set of three bytes;

releasing, in response to the third clock signal, the second set of one byte of the data matrix and the one byte of the first set of three bytes;

receiving, in response to the third clock signal, the third set of one byte of the data matrix and one byte of the second set of three bytes;

holding, in response to the fourth clock signal, the third set of one byte of the data matrix and the one byte of the second set of three bytes;

releasing, in response to the fifth clock signal, the third set of one byte of the data matrix and the one byte of the second set of three bytes;

receiving, in response to the fifth clock signal, the fourth set of one byte of the data matrix and one byte of the third set of three bytes; and releasing, in response to the sixth clock signal, the fourth set of one byte of the data matrix and the one byte of the third set of three bytes.

41. The method of claim 40, wherein the step of cascading the received second portion of the data through the second set of FIFOs further comprises the steps of:

receiving, in response to the third clock signal, the second set of one byte of the data matrix and two bytes of the first set of three bytes;

holding, in response to the fourth clock signal, the second set of one byte of the data matrix and two bytes of the first set of three bytes;

releasing, in response to the fifth clock signal, the second set of one byte of the data matrix and two bytes of the first set of three bytes;

receiving, in response to the fifth clock signal, the third set of one byte of the data matrix and two bytes of the second set of three bytes;

releasing, in response to the sixth clock signal, the third set of one byte of the data matrix and two bytes of the second set of three bytes; and output, in response to the sixth clock signal, the fourth set of one byte of the data matrix and two bytes of the third set of three bytes.

* * * * *